United States Patent
Akcasu

(10) Patent No.: US 12,172,774 B1
(45) Date of Patent: Dec. 24, 2024

(54) EFFICIENT METHOD FOR ORBITAL LAUNCH TRAJECTORIES

(71) Applicant: Akcasu Hypersonics, LLC, Cardiff-by-the-Sea, CA (US)

(72) Inventor: Osman Ersed Akcasu, Cardiff-by-the-Sea, CA (US)

(73) Assignee: Akcasa hypersonics, LLC, Cardiff-by-the-Sea, CA (US)

( * ) Notice: Subject to any disclaimer, the term of this patent is extended or adjusted under 35 U.S.C. 154(b) by 0 days.

(21) Appl. No.: 18/443,863

(22) Filed: Feb. 16, 2024

Related U.S. Application Data

(63) Continuation-in-part of application No. 18/507,452, filed on Nov. 13, 2023.

(51) Int. Cl.
 *B64G 1/00* (2006.01)
 *B64G 1/24* (2006.01)

(52) U.S. Cl.
 CPC ............. *B64G 1/002* (2013.01); *B64G 1/245* (2023.08)

(58) Field of Classification Search
 CPC ......... B64G 1/002; B64G 1/245; B64G 1/005
 USPC ........................................................ 701/13
 See application file for complete search history.

(56) References Cited

U.S. PATENT DOCUMENTS

| | | | | |
|---|---|---|---|---|
| 5,848,377 A * | 12/1998 | Wong | .................. | G01S 5/02 |
| | | | | 342/450 |
| 8,781,741 B2 * | 7/2014 | Cheetham | ................ | B64G 1/10 |
| | | | | 701/531 |
| 11,821,980 B2 * | 11/2023 | Yang | .................... | G01S 13/9011 |
| 2002/0036766 A1 * | 3/2002 | Krawczyk | ................. | B64G 1/66 |
| | | | | 356/28.5 |
| 2002/0130222 A1 * | 9/2002 | Anderman | ........... | B64G 1/2427 |
| | | | | 244/172.5 |
| 2004/0144921 A1 * | 7/2004 | Kuninaka | ................. | B64G 1/10 |
| | | | | 250/251 |
| 2006/0187115 A1 * | 8/2006 | Terashima | .............. | G01S 19/48 |
| | | | | 342/357.42 |

(Continued)

FOREIGN PATENT DOCUMENTS

| | | | | |
|---|---|---|---|---|
| GB | 2388578 A | * | 11/2003 | ............. B64G 1/002 |
| WO | WO-2009051907 A1 | * | 4/2009 | ......... H04B 7/18584 |

OTHER PUBLICATIONS

Yan et al., "Rocket Trajectory Real-time Generation System," 2018, Publisher: IEEE.*

*Primary Examiner* — Tuan C To
(74) *Attorney, Agent, or Firm* — Law Office of Gerald Maliszewski; Gerald Maliszewski

(57) ABSTRACT

A method is provided for efficient orbital launch trajectories. A payload (e.g., satellite) is launched as high as a first radius with respect to the center of the Earth. The method decreases the payload altitude in response to a gravitational pull of the Earth, and ultimately the payload attains a stable orbit around the Earth at a second radius with respect to the center of the Earth. If the first radius is twice the second radius, the payload acquires a gravitational first potential energy at the first radius, and in the stable orbit the payload has a second (potential and kinetic) energy equal to the gravitational first potential energy, with the second kinetic energy being equal to the energy required to maintain a stable orbital velocity. Advantageously, the stable orbit can potentially be at any orbital inclination angle in the range between 0 and 360 degrees.

19 Claims, 35 Drawing Sheets

(56) References Cited

U.S. PATENT DOCUMENTS

| | | | |
|---|---|---|---|
| 2009/0299553 A1* | 12/2009 | Hope | F02K 9/88 |
| | | | 701/13 |
| 2014/0367201 A1* | 12/2014 | Ellman | B64G 1/409 |
| | | | 185/27 |
| 2016/0105806 A1* | 4/2016 | Noerpel | H04B 7/2041 |
| | | | 455/12.1 |
| 2017/0073088 A1* | 3/2017 | Jeon | B64G 1/244 |
| 2018/0290767 A1* | 10/2018 | Lopez-Urdiales | B64G 1/402 |
| 2020/0031500 A1* | 1/2020 | Russell | F02K 9/14 |
| 2020/0239163 A1* | 7/2020 | Kobayakawa | B64G 1/1071 |
| 2022/0135255 A1* | 5/2022 | Langill | B64G 1/1085 |
| | | | 244/158.4 |
| 2022/0306322 A1* | 9/2022 | Gulde | B64G 1/1021 |
| 2022/0353742 A1* | 11/2022 | Sheng | H04W 28/0864 |
| 2023/0286671 A1* | 9/2023 | Yunitski | B64G 1/64 |

\* cited by examiner

EFFICIENT METHOD FOR ORBITAL LAUNCH TRAJECTORIES

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

Field of the Invention

FIG. 1A depicts the orbital speed in [m/s] (meter per second) versus radius measured with respect to the stationary coordinate system where its origin is in the center of Earth and altitude measured from sea level. FIG. 1B depicts the orbital speed in Mach number, versus radius measured with respect to the stationary coordinate system where its origin is in the center of Earth and altitude measured from sea level, where 1 Mach is speed of sound at sea level (1 Mach=340 [m/s]) and the numbers 1, 5, and 10 correspond to the row numbers in Table 2. Since the first satellite launch of Sputnik, on $4^{th}$ of October 1957, all satellites, of which 7,702 of them still in orbit and 6,718 of them operational, have been launched with the same launch strategy. The final goal for any orbital launch is to put the spacecraft or satellite to its desired orbit. For the spacecraft or satellite to stay in that orbit with no thrust, the magnitude of its velocity must satisfy the orbital speed related to its desired orbital height or radius as shown in FIGS. 1A and 1B. As can be seen these orbital speeds are highly hypersonic, many times higher than the speed of sound and are obtainable only by employing rocket propulsion given by the "Tsiolkovsky's Rocket Equation" [1-3]. Besides this, the direction of the velocity vector should also be tangent to the desired orbital trajectory.

FIG. 14 depicts a rocket being launched into orbit using a conventional pitchover or gravity turn maneuver (prior art). To accomplish the goals of obtaining orbit the rocket carrying the satellite or spacecraft is launched from the launch pad with trust-to-weight ratio (T2W) greater than 1, typically 1.5-2 during lift-off, allowing the rocket to accelerate vertically [6-8]. After a safe altitude is reached, the rocket rotates around its vertical axes aligning its directional reference point towards to the true north and aligns its azimuth to match its desired inclination. As part of a "gravity turn" or "zero-lift turn", a "roll" or "pitchover" maneuver is executed to minimize the exertion of energy. However, the rocket still expends a great deal of energy after the gravity turn to obtain the orbital velocity needed to maintain a stable orbit. The roll maneuver can be difficult to observe for cylindrical launches such as the Titan II, Falcon, or Delta, but are more easily observable for the space shuttle, Falcon Heavy, and Ariane 5 due to their asymmetrical geometry. As can be seen, to put anything in orbit successfully, a choreographed sequence of events must be done in a timely manner, which puts time pressure on every event and mission planners take many factors into consideration in this critical planning stage [8-10]. An excellent explanation of each maneuver along with very impressive three-dimensional graphical material related to this sequence of events is given in [6, 8, 10]. Material presented in the podcast [8] by Alfanso Gonzales also gives excellent computer-generated visuals based on the solutions of equation of motion using publicly available Python [34] codes related to the problems. The inclination angle i of a satellite orbit is one of the five orbital parameters defining its orbit. It is the angle between the orbital plane and a reference plane, typically Earth's equatorial plane [8]. As an example, the International Space Station (ISS) has an inclination of 51.6°. Due to certain safety limitations, all the launch sites are only permitted a limited range of azimuth angle (angle from the true north) launches. There are several reasons for launch azimuth limitations for a launch site, mainly it is to avoid damage from falling debris in case of an accident or avoiding damage from the falling initial booster stages. Generally preferred permitted launch azimuths are towards to the ocean or uninhabited areas. Inclination angle i, is related to the latitude of the launch site θ and the launch azimuth A with a simple formula given as, $$\mathrm{Cos}(i) = \mathrm{Sin}(A) \cdot \mathrm{Cos}(\theta)$$

This relation puts limits on the inclination angle for the satellite orbit launched from any site. As an example, all launches from Cape Canaveral in central Florida (latitude θ=28.4° North) are only permitted the launch azimuth angle limits of 35°-120°, giving the corresponding inclination angle limits of 57°-39°. Similarly, all launches from Vandenberg Air Force Base in California (latitude θ=34.7° North) are only permitted the launch azimuth angle limits of 140°-201°, giving the corresponding inclination angle limits of 56°-104°.

Geosynchronous orbit, (GSO) is an orbit which the satellite orbital period matches the Earth's rotational period and can be at any orbital inclination and its orbital altitude is 35,786 [km]. Most communication satellites are in a geostationary orbit, abbreviated as GEO, which is a special case of the geosynchronous orbit having zero inclination and eccentricity, in other words their orbits are circular equatorial orbits. A satellite at geosynchronous orbit remains at a fixed location for an observer on the Earth giving a great advantage in communication and any kind of satellite broadcasting.

Another orbital inclination limitation arising from the orbital inclination angle formula above is that orbital inclination angles lower than the latitude of the launch site are not possible and require inclination angle change also known as orbital plane change. This maneuver requires a change in the orbital velocity vector at the orbital nodes at the expense of additional propellant. Therefore, a "direct" launch to an orbital inclination of zero degrees or in other words launching a communication satellite "directly" from any site listed in Table 1 is not possible. There are 580 GEO satellites in orbit and all 580 of them needed energy hungry orbital inclination angle change to put them in geostationary orbit.

It would be advantageous if rockets could be launched to any inclination angle independent of launch site.

It would be advantageous if the strain on rocket engines needed to attain stable orbits could be reduced.

It would be advantageous if rocket engines required less propellant to put their payloads into stable orbits.

It would be advantageous if rockets could be launched having no inclination angle restrictions at any launch site latitude.

SUMMARY OF THE INVENTION

This invention is related to launching satellites into orbit with less propellant, as compared to the standard launch methods, permitting the use of rocket engines with a smaller power output, leading to less demand on rocket engines, and achieving higher reliability with less wear for equivalent mass and orbits. This improved safety due to a lesser stress imposed on the rocket naturally results in a longer life to the launch vehicle, especially if it is intended for multiple launches. In addition to this advantage, the method described herein permits the use of any launch site on Earth to achieve any orbital inclination angle.

The efficient orbital launch method described herein is based on converting inverse square law gravitational potential energy [21] to kinetic energy through the conservation of energy principle [9, 23]. Let the desired circular orbital radius of the satellite or spacecraft be $r_{ORBIT}$. A payload (satellite or spacecraft) is launched to a radius $r_0$, which is greater than $r_{ORBIT}$, and the orbital speeds necessary to stay in that orbit are generated by converting its total energy at $r_0$ to kinetic energy during the descent back to $r_{ORBIT}$. The radiuses mentioned here are measured from the center of the Earth and gravitational potential energy is defined as a function of radius. On the other hand, altitude from sea level is the terminology used in satellite or spacecraft business like orbital altitude. Any given altitude h can be simply calculated from a given radius r as $h=r-r_{EARTH}$, and radius r can be calculated from altitude h as; $r=r_{EARTH}+h$.

It is shown that the total energy of a stationary object with a mass m at a distance of $r_0$ away from the center of a stationary spherical body with a mass M is equal to the total energy of the same object with the mass m when rotating in a circular orbit around the mass M at a radius of $r_{ORBIT}$ satisfying the relation, $$r_0 = 2 \cdot r_{ORBIT} \tag{1.1}$$

This proof is the key to the launch strategy of the disclosed method and has very interesting computational applications.

FIG. 3A depicts the gravitational potential energy as a function of radius $r_{ORBIT}$ with respect to Earth's center, along with the kinetic energy when in orbit at the radius $r_{ORBIT}$, and its total energy. Also shown is the gravitational potential energy at $2 \cdot r_{ORBIT}$ with the calculated total energy when in orbit at the radius $r_{ORBIT}$ along with markings of the orbital altitudes given in Table 2. FIG. 3A appears to show three curves, but there are four curves, two of which are on top of each other. The four curves plotted in FIG. 3A are the gravitational potential energies at radiuses at $r_{ORBIT}$ and $2r_{ORBIT}$ marked as $PE(r_{ORBIT})$ and $PE(2 \cdot r_{ORBIT})$, kinetic energy $KE(r_{ORBIT})$ and total energy $TE(r_{ORBIT})$ of the mass m at a circular orbit at a radius of $r_{ORBIT}$ from the center of the earth. The marked points on the total energy curve $TE(r_{ORBIT})$ are the total energies of a mass of m at a circular orbit, at orbital altitudes given in Table 2 following the same numbering on the plots just to show that $TE(r_{ORBIT})$ and $PE(2r_{ORBIT})$ exactly match, which is the numerical verification of the proof given in Section 3.0 and 3.1 in detail.

FIG. 3B depicts the same plots in FIG. 3A, where x axes plotted in logarithmic scale. This view provides a clearer view of the tight spacings between the markings for the Table 2 orbital altitudes.

Relation (1.1) means that if an object at rest is allowed to fall from a radius of $r_0$ towards the stationary body with a mass M, it will acquire a velocity equal to the orbital velocity when rotating in a circular orbit around the mass M at the radius of $r_{ORBIT}$, when it reaches $r_{ORBIT}$, as shown in FIG. 3C.

FIG. 3C depicts the orbital velocity as a function of the orbital altitude $v_{ORBIT}(h_{ORBIT})$ as shown in FIG. 1A with the velocities gained by dropping from $r_0=2 \cdot r_{ORBIT}$ to $r_{ORBIT}$ for the orbital altitudes given in Table 2. As can be seen the markers are exactly on the $v_{ORBIT}(h_{ORBIT})$ curve. The orbital velocity is shown in Mach numbers as a function of altitude (h) with the matching markings showing the vertical velocity gained by falling from $2 \cdot r_{ORBIT}$ to $r_{ORBIT}$ as a result of the energy conservation principle.

The only problem is that the velocity vector of the falling object with the mass m is towards the center of the stationary spherical body with the mass M, not in the tangent direction to the desired orbital trajectory. Therefore, during the descent a rocket thrust may be needed to steer/divert the descending spacecraft or the satellite towards the desired orbital trajectory. But even with a need for this additional thrust during descent, the overall energy used is less than the thrust/energy/power of a conventional launch strategy. The descent stage rocket thrust is basically used to steer the spacecraft or the satellite towards the desired orbital trajectory, as described below in the explanation of FIG. 19, FIG. 20A, FIG. 20B, and FIG. 20C. Speed gain is achieved by converting the gravitational potential energy to kinetic energy. In fact, due to the descent stage rocket assist, the rocket typically gains more speed than needed when it descends from $r_0$ to $r_{ORBIT}$ and needs a retro thrust to attain in a permanent circular orbit with the desired radius of $r_{ORBIT}$. To optimize the rocket assisted descent the relation (1.1) is modified by, $$r_h = s_f \cdot r_{ORBIT} \text{ where } 1.1 < s_f < 2 \tag{1.2}$$

Where, $s_f$ is a scaling factor with the bounds as given in (1.2). Ideally, a satellite or spacecraft is launched to the calculated radius $r_h$ having no time pressure, or speed profile that needs to be maintained. In one aspect the satellite or spacecraft reaches the radius $r_h$ as given in (1.2) and becomes stationary, or in other words, at that instant it has zero velocity, resulting in zero kinetic energy. That is, its total energy is equal to its gravitational potential energy. Then, the spacecraft or satellite goes into rocket assisted descent maneuver and starts its rocket assisted fall to its desired orbital radius $r_{ORBIT}$. If $s_f$ is greater than optimum, the satellite needs to be slowed down by retro thrust, and if it is smaller than optimum, it needs to increase its speed with some additional thrust in the direction of travel. Finding an optimal $s_f$, which minimizes the total propellant mass to launch a given payload to $r_{ORBIT}$, requires an iterative process using Newton's method [27, 29-30] for solving many non-linear trajectory equations.

Accordingly, a method is provided for efficient orbital launch trajectories. The method launches a payload as high as a first radius (or first radial distance) $r_0$, with respect to the center of the Earth, which is associated with a first altitude $h_0$, defined with respect to sea level. Ideally, the payload can be launched at a zero angle with respect to the Earth's normal surface (vertical). Due to safety related restrictions at the launch site, the launch is performed with a minimum angle with respect to the Earth's normal surface and towards any allowed launch azimuth to reach the first radius altitude. As used herein, the term "payload" defines the object that eventually attains orbit, which may be spacecraft, a satellite, a rocket, or combinations thereof. The method then decreases the payload altitude in response to a gravitational pull of the Earth, and ultimately the payload attains a stable orbit around the Earth at a second radius ($r_{ORBIT}$), with respect to the center of the Earth, which is associated with a second altitude ($h_{ORBIT}$), defined with respect to sea level. If the first radius is equal to 2 times the second radius ($r_0 = 2 \cdot r_{ORBIT}$), then the payload in the stable orbit has a total energy that is the sum of its gravitational second potential energy and kinetic energy, with the payload total energy also being equal to the gravitational first potential energy. The second radius can also be expressed as $(h_{ORBIT}+r_{EARTH})$ giving:

$$h_0 = 2 \cdot r_{EARTH} + h_{ORBIT}) - r_{EARTH} - r_{EARTH} + 2 h_{ORBIT};$$

where $h_0$ is the altitude associated with the first radius, as defined with respect to the sea level of Earth;
where $r_{EARTH}$ is the Earth's radius; and,
where $h_{ORBIT}$ is the altitude associated with the second radius, defined with respect to sea level, see FIG. 3D.
The relation $$\eta(h_{ORBIT}) = \frac{h_0}{h_{ORBIT}}$$

is shown in FIG. 3E.

One advantage of the disclosed method is that the stable orbit can potentially be at any orbital inclination angle in the range between 0 and 360 degrees. Further, this advantage can be accrued by launching the payload from any latitude on a surface of the Earth in the range between 90 and –90 degrees.

More explicitly, the gravitational first potential energy can be expressed as:

$$-G\frac{mM}{r_0};$$

where G is Newton's gravitational constant;
where m is the mass of the payload; and,
where M is the mass of the Earth.
The second potential energy can be expressed as:

$$-\frac{GmM}{r_{ORBIT}}.$$

The total energy at the second radius $r_{ORBIT}$ can be expressed as follows:

$$-G\frac{mM}{r_0} = \frac{1}{2}mv_{ORBIT}^2 - \frac{GmM}{r_{ORBIT}},$$

where $v_{ORBIT}$ is payload velocity in the stable circular orbit.

Once the payload attains the first radius, it needs to be redirected during its fall towards the stationary mass M. So, subsequent to the payload attaining the first radius, the method initiates rocket or payload assisted descent maneuvers, which decreases the payload altitude. In a conventional gravity turn the rocket applies force, in the form of thrust, against the force of gravity (see FIG. 14). In contrast, in a rocket assisted descent maneuver, as defined herein, the payload applies no force to counter the force of gravity, but rather, relies upon the force of gravity to send the payload into a stable lower altitude orbit. The force is only used to steer the payload towards to the desired orbit at the second altitude. In one aspect the payload is launched to a third radius ($r_h$), which less than the first radius, but greater than the second radius, where:

$$r_h = s_f r_{ORBIT} \text{ where } 1.1 < s_f < 2;$$

Then, subsequent to the rocket assisted descent maneuver a velocity adjustment force may need to be supplied to the payload. The payload has a total energy equal to its gravitational potential energy at the third radius, and the decrease of the payload altitude is responsive to the applied velocity adjustment as well as the gravitation potential energy at the third radius.

FIG. 3G depicts the velocity that the payload gains, which was at rest at a radius of $r_h$ in terms of the orbital velocity $v_{ORBIT}$ for a circular orbit at the radius of $r_{ORBIT}$ as a function of $s_f$ when falling from $r_h$ to $r_{ORBIT}$ which can be represented with the relation, $$v_{RATIO} = \frac{v_{FALL}[(sf \cdot r_{ORBIT}) \to r_{ORBIT}]}{v_{ORBIT}(r_{ORBIT})}$$

As can be seen when $s_f=2$, which corresponds to a radius of ($r_0=2 \cdot r_{ORBIT}$), the vertical velocity of the payload reaches exactly $v_{ORBIT}$ ($r_{ORBIT}$) as proven with 2 different methods in later sections. If $s_f=3$, the $v_{RATIO}$ of the payload hardly reaches $1.16 \cdot v_{ORBIT}$ when falling from $3 \cdot r_{ORBIT}$ to $r_{ORBIT}$. At $s_f=1$, since $r_h=r_{ORBIT}$ there will no velocity gain and $v_{RATIO}$ becomes 0. When $s_f=1.5$, the $v_{RATIO}$ becomes $0.81 \cdot v_{ORBIT}$. When $s_f=1.2$, the $v_{RATIO}$ becomes $0.57 \cdot v_{ORBIT}$. Since it takes more propellant to go higher, finding the right $s_f$ value and deciding the optimal decent trajectory is one of the challenging mathematical parts of the invention. The explanation above assumes a "vertical descent", from the third radius or altitude along the radial direction towards to the center of the earth and assumes that the mass of the falling object remains the same. Since real maneuvers are three dimensional and since rocket propulsion by its definition is based on ejecting its mass, the real calculation can't be completely done analytically, it requires solution of equation of motion. In section 5.2 a more detailed analytical analysis is given for a vertical descent by modifying the rocket equation for constant gravitational acceleration.

Addition details of the method are provided below.

DETAILED DESCRIPTION

Figure 1A:
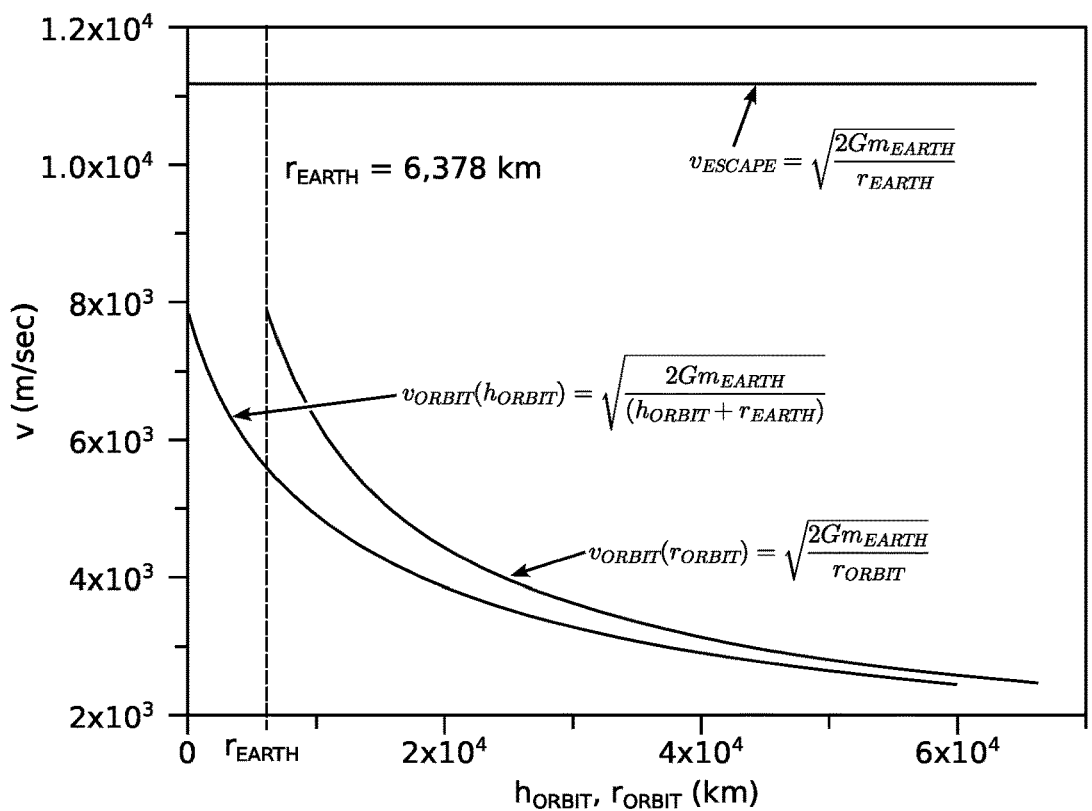
FIG. 1A depicts the orbital speed in [m/s] (meter per second) versus radius measured with respect to the stationary coordinate system where its origin is in the center of Earth and altitude measured from sea level.

The Problem to be Solved.

This invention is related to putting satellites into orbit with smaller rockets employing less propellant compared to the standard rockets with less demanding rocket engines for launching the same orbital mass into orbit. Therefore, an introduction to some very basic orbital mechanics is presented in Section 2 for a satellite having a circular orbit around the earth.

From the German rocket work, which goes back to 1930's, the importance of having a low mass rocket to reach a given altitude is a well-known fact and it became a key factor in any rocket design [7]. To reach the speeds and altitudes that are desired in rocket applications, the rocket equation enforces that most of the initial rocket mass must be propellant mass $m_{prop}$ [1-3]. Propellant is contained in the propellant tank and let $m_{tank}$ is the mass of the propellant tank and it also includes the mass of the overall volume of the rocket housing the propellant. Let the parameter k is the ratio of the propellant to the propellant tank given as, $$k = \frac{m_{tank}}{m_{prop}} \qquad (1.3)$$

Using the parameter k, mass of the rocket engine $m_{RE}$, and the payload mass $m_{PAY}$, the initial mass of the rocket $m_0$, can be given as, $$m_0 = m_{prop}(1+k) + m_{RE} + m_{PAY} \qquad (1.4)$$

For the rocket to be able to lift-off vertically from the pad its initial thrust-to-weight ratio T2W must be greater than 1, giving the following thrust equation, $$\frac{F_T}{g \cdot T2W} = m_{prop}(1+k) + m_{RE} + m_{PAY} \qquad (1.5)$$

Where $F_T$ is the thrust generated by the rocket engine and g is the gravitational acceleration at the launch pad. Thrust, $F_T$ obtained from the solution of the equation (1.5) must be a positive value. It is shown that once $m_{prop}$ satisfies the rocket equation, which enables it to reach the desired height, positive thrust value is only possible if the k parameter is less than a specific value defined as $k_{MAX}$. In its simplest form $k_{MAX}$ is given as, $$k_{MAX} < \frac{\mu_f}{(1-\mu_f)} \quad (1.6)$$

Where $\mu_f$ is the ratio between the final mass value of the rocket $m_f$ and its initial rocket mass $m_0$ given as, $$\mu_f = \frac{m_f}{m_0} \quad (1.7)$$

Which $\mu_f$ satisfies the non-linear rocket equation formulated including gravitational potential acting upon the rocket to reach a given height above sea level, $h_{GIVEN}$. Therefore, it is a "solved" quantity and determines the maximum value of k, noted as $k_{MAX}$ given in (1.7) in its simplest form. This mathematically relates the k value giving the maximum altitude that the rocket can reach and must be satisfied. If the physical construction of the rocket gives a k larger than $k_{MAX}$, for the given value of $\mu_f$, the rocket cannot reach the altitude corresponding to $\mu_f$.

It is also shown that the opposite is also true. A given k value which can be measured or calculated from some simple rocket geometry, propellant physical and chemical properties define the maximum altitude that the rocket can reach for a given payload, thrust-to-weight ratio at the launch, and rocket engine thrust-to-weight ratio. In its simplest form, the minimum value of $\mu_f$ that can be achieved with this given k value becomes, $$\mu_f > \frac{k}{(1+k)} \quad (1.8)$$

Most of the rocket propellant tank shapes determine the shape of the rocket and typically they are cylindrical. For cylindrical geometry, the k value is also a function of rocket radius, therefore rocket diameter can be related to the maximum altitude that it can reach for a given thrust-to-weight ratio at the launch, and rocket engine thrust-to-weight ratio. The detailed derivations on this subject are given in Sections 7 and 8 below.

Another advantage of the disclosed method is that it allows any launch site on earth to achieve any orbital inclination angle from any launch site [8]. The inclination angle of a satellite orbit is one of the five orbital parameters defining its orbit. It is the angle between the satellite orbital plane and the Earth's equatorial plane. As an example, the International Space Station (ISS) has an inclination of 51.6°. Due to certain safety limitations all the launch sites give only a limited range of azimuth angle (angle from the true north) launches. Inclination angle i, is related to the latitude of the launch site θ and the launch azimuth A with a simple formula given as, $$\text{COS}(i)=\text{Sin}(A)\cdot\text{Cos}(\theta) \quad (1.9)$$

This relation puts limits on the inclination angle for the satellite orbit launched from any site. As an example, for all launches from Cape Canaveral in central Florida (θ=28.4° North), the launch azimuth angle limits are 35°-120° giving the corresponding inclination angle limits of 57°-39°. Similarly, for all launches from Vandenberg Air Force Base in California (θ=34.7° North), the launch azimuth angle limits are 140°-201° giving the corresponding inclination angle limits of 56°-104°. Therefore, the most popular Polar orbital launches cannot be done from Cape Canaveral, but rather, must be done from Vandenberg Air Force. It is obvious that having no inclination angle restriction is a great advantage and has great commercial value by itself.

Table 1 gives the most popular launch site latitudes and dates on which they became operational. FIG. 1E gives the plot of relation (1.9) for all most popular launch sites with the Azimuthal Limitations shown on the plot for Cape Kennedy and Vandenberg.

TABLE 1

Most popular launch site latitudes and dates when they became operational.

| FIG. 1E reference | Launch Site | Latitude | Operational Since |
|---|---|---|---|
| 1 | Kennedy Space Center, FL, USA | 28.60N | 1962 |
| 2 | Vandenberg Space Force Base, CA, USA | 34.77N | 1958 |
| 3 | Baikonur Cosmodrome, Russian Federation-Kazakhstan | 45.95N | 1955 |
| 4 | ESA Space Center, Kourou, French Guiana | 5.16N | 1964 |
| 5 | SpaceX Star Base, Boca Chica, TX, USA | 25.99N | 2018 |

In the disclosed method the satellite is launched to a radius of $r_h$ which could be in any permitted azimuth from the launch site. From there a rocket assisted descent can be made to any direction to get to get to any inclination desired. It is obvious to see that by employing this launch strategy, satellites can be launched into most popular Polar orbits from even Cape Canaveral, French Guiana, or anywhere on Earth.

Anything related to space has always been a very popular subject in the public and the orbital launch of satellites is becoming a big and competitive industry where profitability is becoming an important part of it. Many published technical materials related to the subject exist in public domain, but unfortunately publications in this area, like in many other areas, take shortcuts in mathematics and derivations. This hides many of the facts and causes one to miss the key important details. As an example, without defining $m_{prop}$ in (1.4) the key results of (1.5) to (1.7) cannot be generated.

Another goal of this work is to present some of the orbital launch and rocket design related mathematics and mechanics by taking no short cuts. Therefore, in this work there are some chapters which are dedicated to the derivation of the basic principles.

Simple Orbital Mechanics

English mathematician and the founder of mechanics among many other earth-shaking discoveries, Sir Isaac Newton's (1642-1726) second law of mechanics allows anyone to calculate the tangential speed required to put a satellite into a circular or elliptical orbit around the earth. at an altitude h from sea level. All the information needed to perform these calculations is in "Philosophie Naturalis Principia Mathematica", which is the foundation of mechanics, integral and differential calculus. It was first published in 1687 with the financial help of Edmond Halley (1656-1742), another famous English astronomer and mathematician named with a comet named after him.

One cannot mention "differential calculus" without mentioning German mathematician Gottfried Wilhelm von Leibnitz (1646-1716). Leibnitz invented differential calculus independently from Newton with a more convenient notation than used by Newton. Everything mathematically presented in this work is entirely based on the inventions of these two giants of science 334 years after.

Newton's gravitational attraction force $F_G$ between 2 spherical masses m and M, having a distant d between their centers is given as, $$F_G = G\frac{mM}{d^2} \quad (2.1)$$

Where G is Newton's gravitational constant. This law is also known as the inverse square law of gravitational attraction force or field. This attraction force on the surface of the earth can be defined with the expression, $$F_G = Mg_0 \quad (2.2)$$

Where $g_0$ is the gravitational acceleration constant at the surface of the earth and it can be formulated as, $$g_0 = G\frac{M}{r_{EARTH}^2} \quad (2.3)$$

Where in (2.3) now M and $r_{EARTH}$ represent the mass and radius of the earth. For a satellite to stay in a circular orbit, the centrifugal force of the satellite at a radius of $r_{ORBIT}$ measured from the center of the earth, must be equal to the Earth's gravitational attraction force as given by (2.3) as, $$m\frac{v_{ORBIT}^2}{r_{ORBIT}} = G\frac{mM}{r_{ORBIT}^2} \quad (2.4)$$

Where m and $v_{ORBIT}$ are the mass of the satellite and tangential velocity of the satellite in the circular orbit around the earth at a radius of $r_{ORBIT}$ measured from the center of the earth, respectively.

Simplifying (2.4) gives the necessary tangential velocity to keep the satellite in orbit at a radius of $r_{ORBIT}$, measured from the center of the earth as, $$v_{ORBIT}^2 = \frac{GM}{r_{ORBIT}} \quad (2.5)$$

Getting the square root of both sides gives, $$v_{ORBIT} = \sqrt{\frac{GM}{r_{ORBIT}}} \quad (2.6)$$

In space terminology one usually specifies the orbital altitude h referenced from the sea level giving the relation between $r_{ORBIT}$ and h as, $$r_{ORBIT} = r_{EARTH} + h \quad (2.7)$$

Figure 1B:
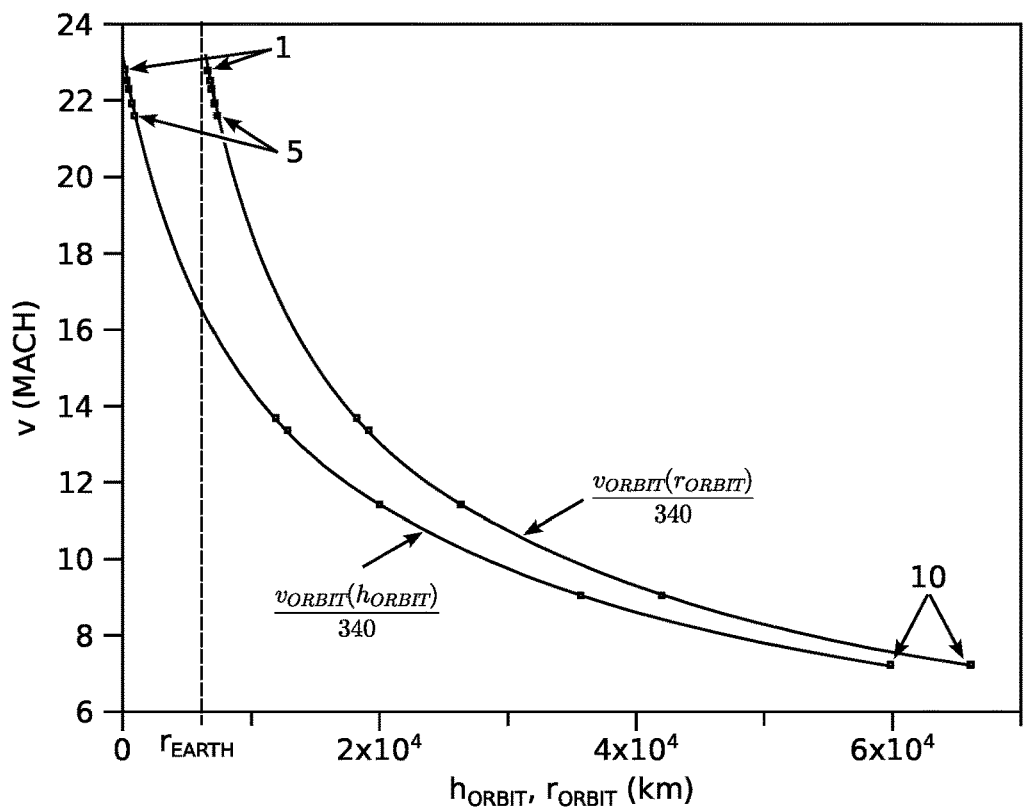
FIG. 1B depicts the orbital speed in Mach number, versus radius measured with respect to the stationary coordinate system where its origin is in the center of Earth and altitude measured from sea level, where 1 Mach is speed of sound at sea level, 1 Mach=340 [m/s] and the numbers 1, 5, and 10 correspond to the row numbers in Table 2.

FIG. 1A is the orbital velocity as a function of radius and altitude as given in (2.6) in [m/s] along with the escape velocity from the Earth. FIG. 1B is the orbital velocity as a function of radius and altitude as given in (2.6) in Mach numbers, which is a speed defined in terms of speed of sound at sea level which is 340 [m/s]. The markings on the curves are the orbital velocities of satellites in circular orbit at orbital altitudes given in Table 2. As can be seen, the speed of any satellite in any of the orbits given in Table 2 is hypersonic.

The numerical values of the constants in (2.3) are,

Universal Gravitational Constant $G=6.674\times10^{11}$ $[m^3 \cdot kg^{-1}]$ or $[N \cdot m^2 \cdot kg^{-2}]$ Mass of Earth $M=5.972\times10^{24} [kg]$ The Earth's Polar and Equatorial radiuses are slightly different and are, $r_{EPolar}=6,357$ [km] and $r_{EEqutorial}=6,378$ [km]

Since the radius of the orbit and the constant speed of the satellite is known, one can easily calculate the time T that it takes for the satellite to complete one revolution at the circular orbit as, $$T = \frac{2\pi r_{ORBIT}}{v_{ORBIT}} = \frac{2\pi r_{ORBIT}}{\sqrt{\frac{GM}{r_{ORBIT}}}} = \frac{2\pi (r_{ORBIT})^{\frac{3}{2}}}{\sqrt{GM}} \quad (2.8)$$

This is nothing more than Johannes Kepler's (1571-1630) third law applied for a circular orbit. Kepler, a German mathematician, used Tyco Brahe (1546-1601), a Danish astronomer known for the most accurate astronomical data to date collected from his observatory at Benatky nad Jizerou, near Prague of today's Czech Republic, for validating his three laws of planetary motion while he was Tyco's assistant.

Figure 1C:
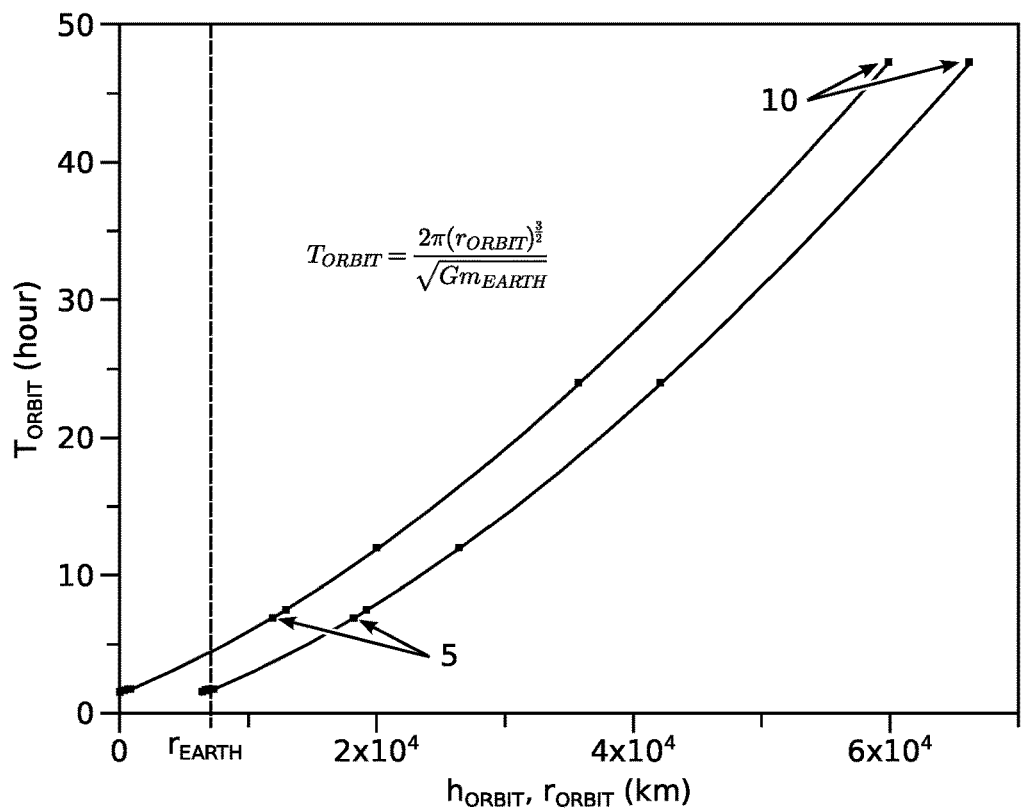
FIG. 1C depicts the orbital period in hours versus radius measured with respect to the stationary coordinate system where its origin is in the center of the Earth and altitude measured from sea level.

The orbital period as a function of radius as given in (2.8) and altitude is plotted in FIG. 1C. The markings on the curves are the orbital periods of the satellites in circular orbit at orbital altitudes given in Table 2.

Figure 1D:
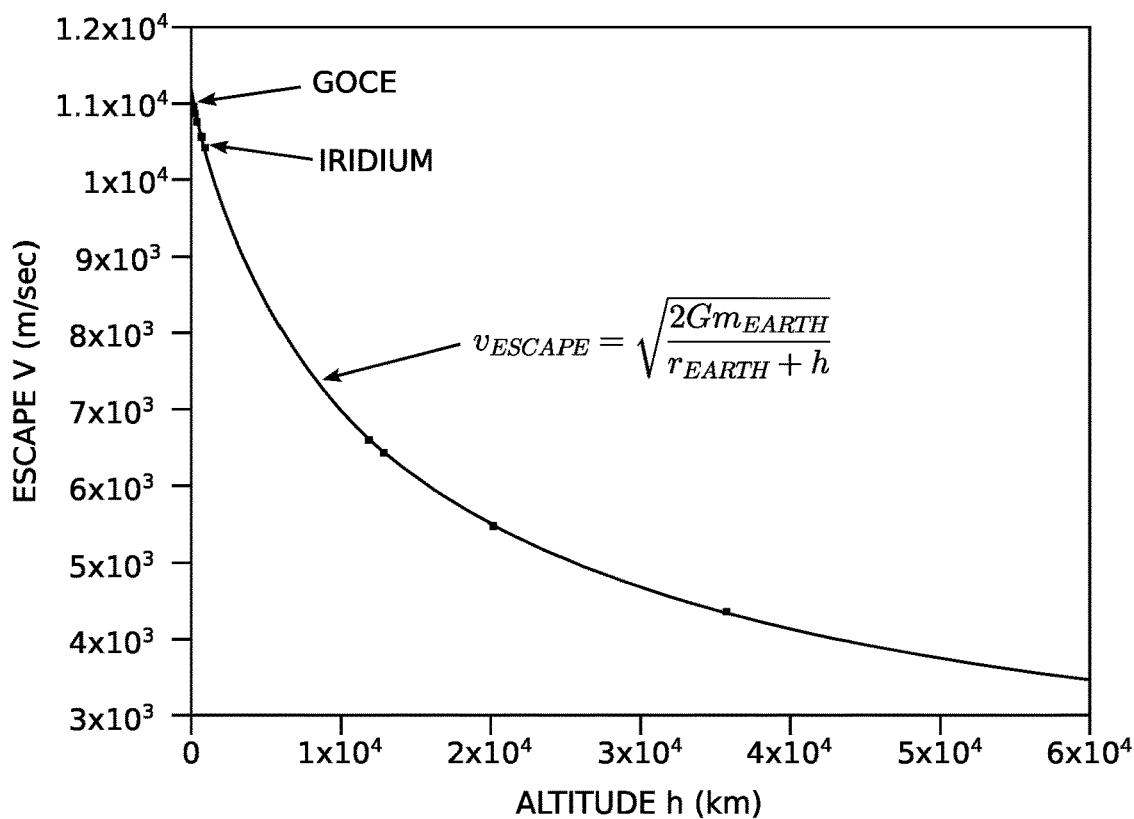
FIG. 1D depicts the escape velocity as a function of radius for the Earth along with markings of the orbital altitudes given in Table 2.
Figure 1E:
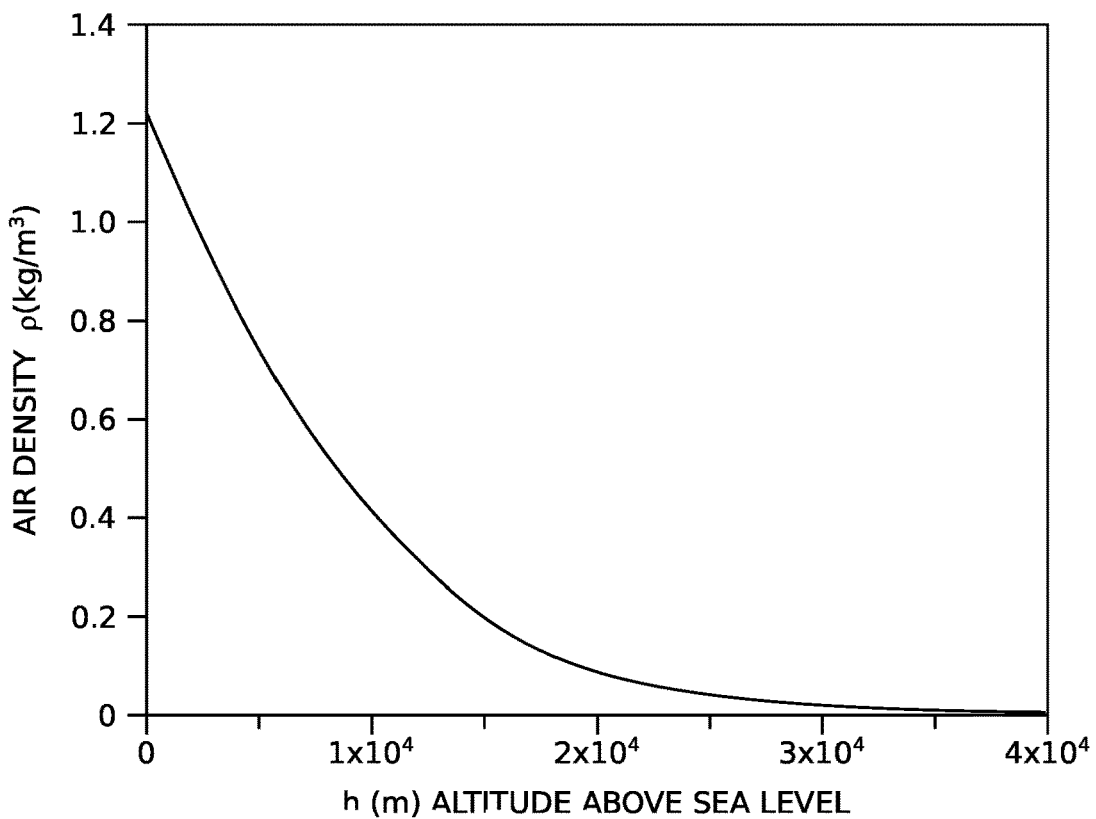
FIG. 1E depicts the density of air as a function of altitude.

FIG. 1D depicts the escape velocity as a function of radius for the Earth along with markings of the orbital altitudes given in Table 2.

FIG. 1E depicts the density of air as a function of altitude.

Figure 1F:
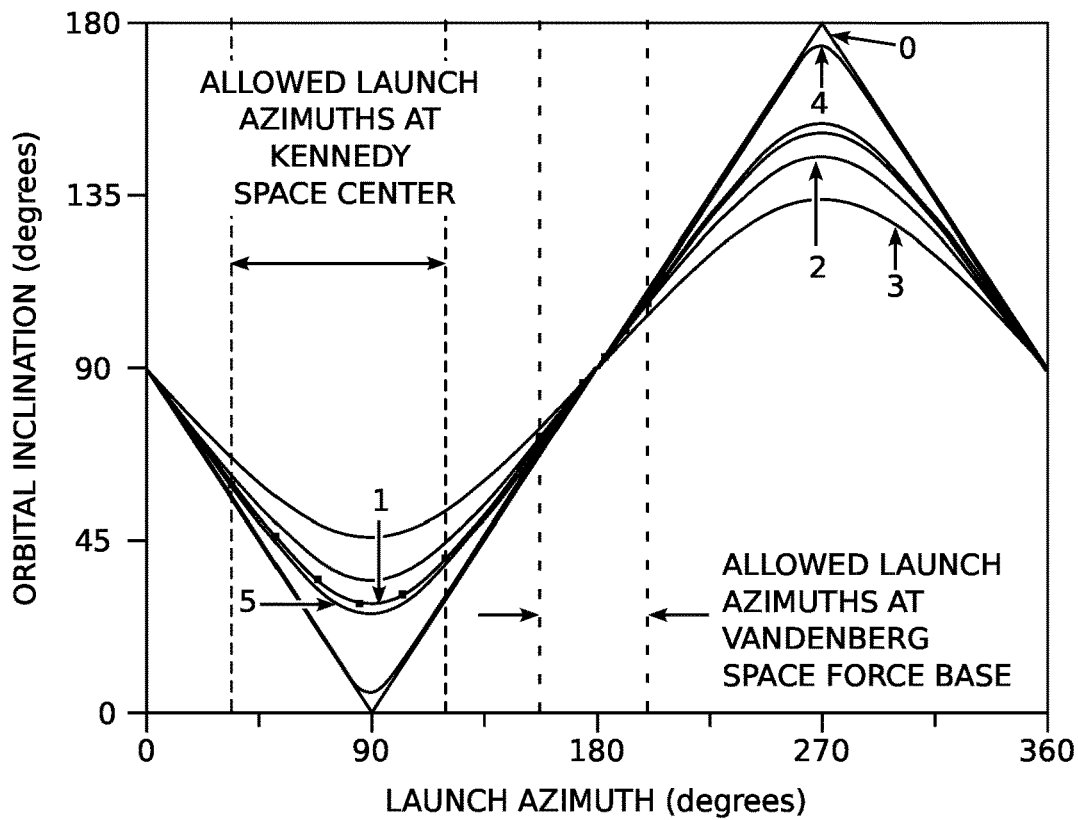
FIG. 1F depicts orbital inclination as a function of launch azimuth from 6 locations, representing launch from the Equator, along with the numberings corresponding with the launch latitudes shown in the first column of Table 2.

FIG. 1F depicts orbital inclination as a function of launch azimuth from 6 locations, representing launch from the Equator, along with the numberings corresponding with the launch latitudes shown in the first column of Table 1.

Regarding expressions (2.6) and (2.8), Aristarchus of Samos (310 BC-230 BC), an ancient Greek mathematician and astronomer, was the first to propose that the sun is the center of the Solar system, and the Earth is rotating around sun. Before him, Aristotle (384 BC-322 BC) another ancient Greek philosopher postulated that earth was round and was at the center of the universe, and everything rotated around it. Claudius Ptolemy (100-170), another ancient Greek mathematician supported the "geocentric earth" model. Copernicus (1473-1543), the Polish mathematician and astronomer, brought back the idea of the earth revolving around the sun.

All the debates related to the subject were settled after Halley asked Newton what the trajectory of the Halley Comet was, which changed the flow of history. To this question, Newton simply said, "(i)t is an Eclipse." and when Halley asked how he knew that Newton simply replied, "I calculated it", which was an unheard-of task then. Halley asked how it was calculated and after Newton showed how he calculated it, a completely surprised and impressed Halley told him that he must publish all this, which Newton said it is too expensive to publish and he couldn't afford it. Totally impressed, Halley decided to finance Newton's monumental work in "Philosophie Naturalis Principia Mathematica" which undoubtedly became the most important scientific publication in human history, which is the mathematics for explaining the entire mechanics of objects.

Another useful parameter related to the subject is escape velocity, which gives a good idea of the speeds required in the space launch business. Escape velocity $v_{ESCAPE}$ in its simplest form is derived between two spherical objects with masses m and M and radiuses for each are noted as $r_m$ and $r_M$ respectively. In the formulation it is also assumed that M»m and $r_M$»$r_m$ and the larger mass, M will also assumed to be stationary and both masses also non-rotating. If the initial center-to-center distances between these spherical masses is d, the escape velocity $v_{ESCAPE}$ is the initial velocity that needs to be provided to the smaller mass m in the opposite direction to the gravitational attraction force between these two masses, which will allow it to escape the gravitational attraction force of M and reaching center-to-center distance d→∞. For this condition escape velocity $v_{ESCAPE}$ is given as, $$v_{ESCAPE} = \sqrt{\frac{2GM}{d}} \tag{2.9}$$

As an example, for an object like a spaceship launched straight up from the surface of the earth, the escape velocity $v_{ESCAPE}$ relation given in (2.9) will become, $$v_{ESCAPE} = \sqrt{\frac{2Gm_{EARTH}}{r_{EARTH}}} \tag{2.10}$$

Where $r_{EARTH}$ and $m_{EARTH}$ are radius and the mass of the earth. The escape velocity $v_{ESCAPE}$ as given in (2.9) can be calculated by applying conservation of energy principle, and by equating the kinetic energy to the potential energy for the mass m for the two-mass system with properties explained as m and M above. Since the method disclosed herein is derived using the energy conservation law, it is useful to derive the escape velocity using this very important concept in detail.

Potential energy $PE(r_A)$ of the object with the mass m at a radius of $r_A$, measured from the center of the reference mass M, can be calculated with the work integral W applied to the inverse square law gravitational attraction force field from infinite to $r_A$ as [21,23], $$W = PE(r_A) = \int_{\infty}^{r_A} G\frac{mM}{r^2}dr = -G\frac{mM}{r_A} \tag{2.11}$$

In other words, relation (2.11) is the work done for bringing the mass m with zero initial speed from infinite to a distance of $r_A$ away from the stationary mass M. During this $v$ free-fall from infinite to $r_A$, the mass m will gain speed and will have a value of $v_A$. As a result, its kinetic energy $KE(r_A)$, becomes, $$KE(r_A) = \frac{1}{2}mv_A^2 \tag{2.12}$$

The energy conservation law states that the total energies at initial and final states must be equal, which can be expressed with an equation, $$PE(r_A)+KE(r_A)=PE(\infty)+KE(\infty) \tag{2.13}$$

Energy conservation equation (2.13) explicitly becomes, $$\frac{1}{2}mv_A^2 G\frac{mM}{r_A} = 0 + 0 \tag{2.14}$$

Solving $v_A$ from (2.14) gives, $$v_A = \sqrt{\frac{2GM}{r_A}} \tag{2.15}$$

Due to reciprocity, this is also the magnitude of the escape velocity $v_{ESCAPE}$, in the opposite direction. Escape velocity from earth then can be formulated by substituting $r_{EARTH}$ instead of $r_A$ giving the same expression as given in (2.10) as, $$v_{ESCAPE} = \sqrt{\frac{2GM}{r_{EARTH}}} \tag{2.16}$$

FIG. 1A shows the escape velocity from earth along with the orbital velocity as a function of radius and altitude. As can be seen, escape velocity is greater than any of the orbital velocities. Since escape velocity has the radius of the Earth in its formulation it should also be a function of altitude as well.

FIG. 1D depicts the escape velocity as a function of radius for Earth along with markings of the orbital altitudes given in Table 2.

At this point it is very interesting to note that if $v_{ESCAPE}$, as given by relation (2.10), is equated to speed of light C, it becomes the non-relativistic definition of a "Black Hole" which was first conceived by an English scientist John Mitchell (1724-1793) in 1783. The mass/radius calculations of his "Dark Star", derived from (2.15) is not very different than the relativistic calculations based on the solution of Einstein's field equations describing his general relativity work of 1915. Einstein's field equation describing general relativity, which was first solved by Karl Schwarzschild in 1915 gives the "Schwarzschild Radius" of the event horizon as, $$R_S = \frac{2GM}{c^2} \tag{2.17}$$

Where, C is the speed of light. Although John Mitchell's result is 122 years pre-special relativity, with no restrictions on the maximum velocity of anything, gives identical numerical value to (2.16) which is another remarkable coincidence in science.

FIG. 1A depicts the orbital speed in [m/s] (meter per second) versus radius measured with respect to the stationary coordinate system where its origin is in the center of Earth and altitude measured from sea level.

FIG. 1B depicts the orbital speed in Mach number, versus radius measured with respect to the stationary coordinate system where its origin is in the center of Earth and altitude measured from sea level, where 1 Mach is speed of sound at sea level (1 Mach=340 [m/s]) and the numbers 1, 5, and 10 correspond to the row numbers in Table 2. As is conventional, speed is represented herein as a Mach number. One of the early questions to be explored in rocketry was to determine if rocket propulsion could generate velocities sufficient to put an object into orbit, or sufficient to create an escape velocity $v_{ESCAPE}$ from the Earth. To illustrate, escape velocity $v_{ESCAPE}$ is shown superimposed in FIGS. 1A.

FIG. 1C depicts the orbital period in hours versus radius measured with respect to the stationary coordinate system where its origin is in the center of the Earth and altitude measured from sea level. This is a way of presenting the extreme hypersonic speeds needed for putting a satellite into orbit in terms of orbital periods. For low Earth orbits (LEOs) the orbital periods are on the order of 90 minutes, meaning that satellites in LEOs rotate around the Earth every hour or two. The orbital periods of some well-known satellites are given in Table 2, with related data.

A list of some orbital radiuses of well-known satellites and Van Allen Radiation Belts are presented in Table 2. These orbital radiuses between the Earth and the Moon, along with orbital periods, velocities, their orbital masses, and free fall times to the Earth surface, are calculated by the analytical formula given in [4-5] from the orbits that are presented in table. These orbitals are marked on the curves in FIG. 1B, FIG. 1C, and FIG. 2B.

Figure 2A:
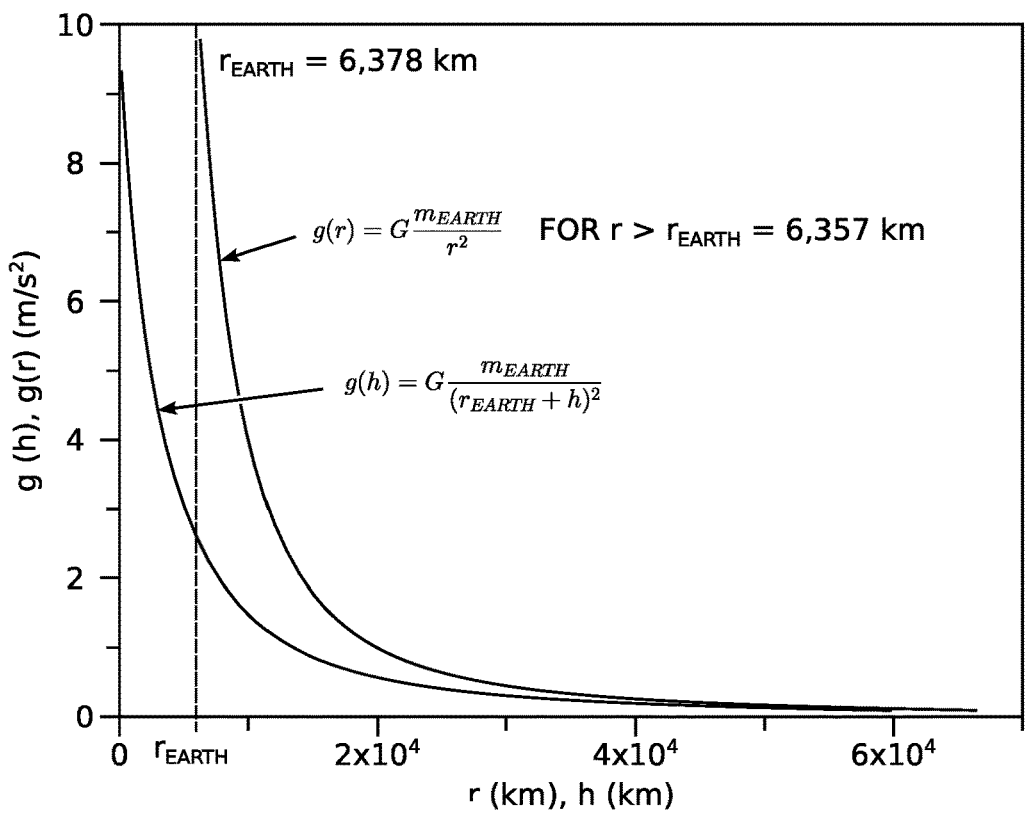
FIG. 2A depicts the gravitational acceleration g(h) as function of altitude h from sea level and distance from the earth's centered radius g(r), where $r=h+r_{EARTH}$.

FIG. 2A depicts the gravitational acceleration g(h) as function of altitude h from sea level and distance from the earth's centered radius g(r), where $r=h+r_{EARTH}$.

Figure 2B:
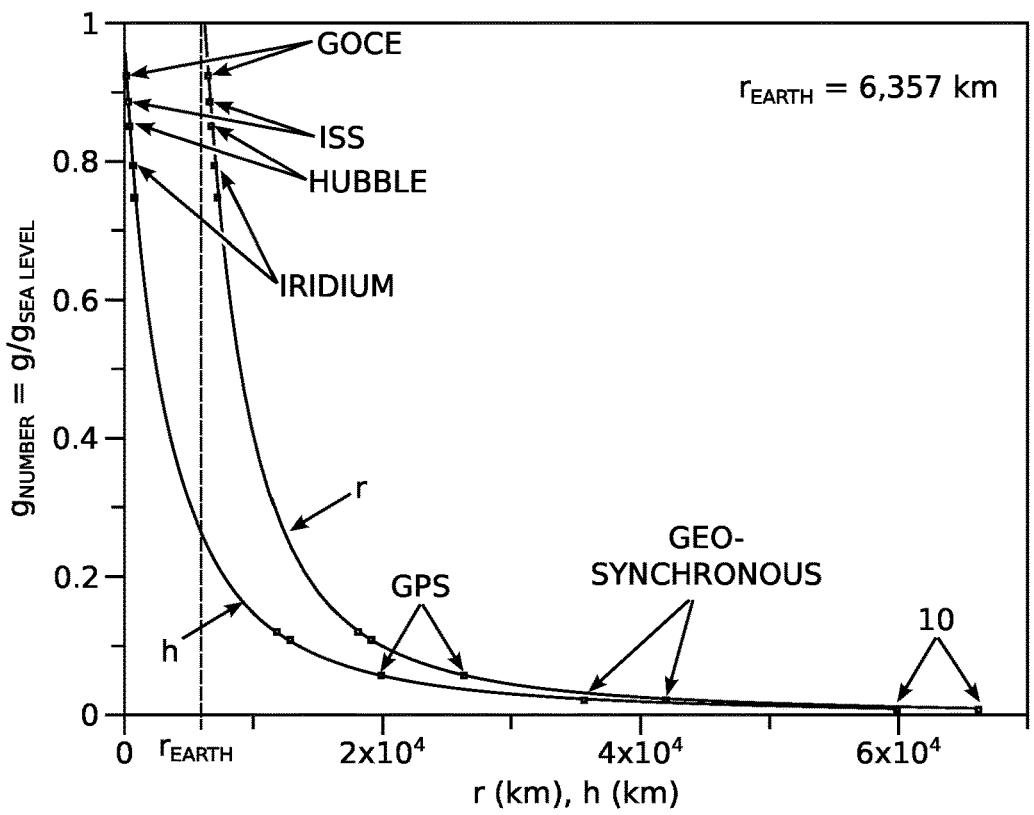
FIG. 2B depicts the gravitational acceleration normalized to its sea level value as a function of altitude g(h) and the distance from the Earth's centered radius r, g(r), with the radius of the Earth taken at the equatorial radius of $r_{EARTH}$=6,378 km.

FIG. 2B depicts the gravitational acceleration normalized to its sea level value as a function of altitude g(h) and the distance from the Earth's centered radius r, g (r), with the radius of the Earth taken at the equatorial radius of $r_{EARTH}=6,378$ km.

Figure 2C:
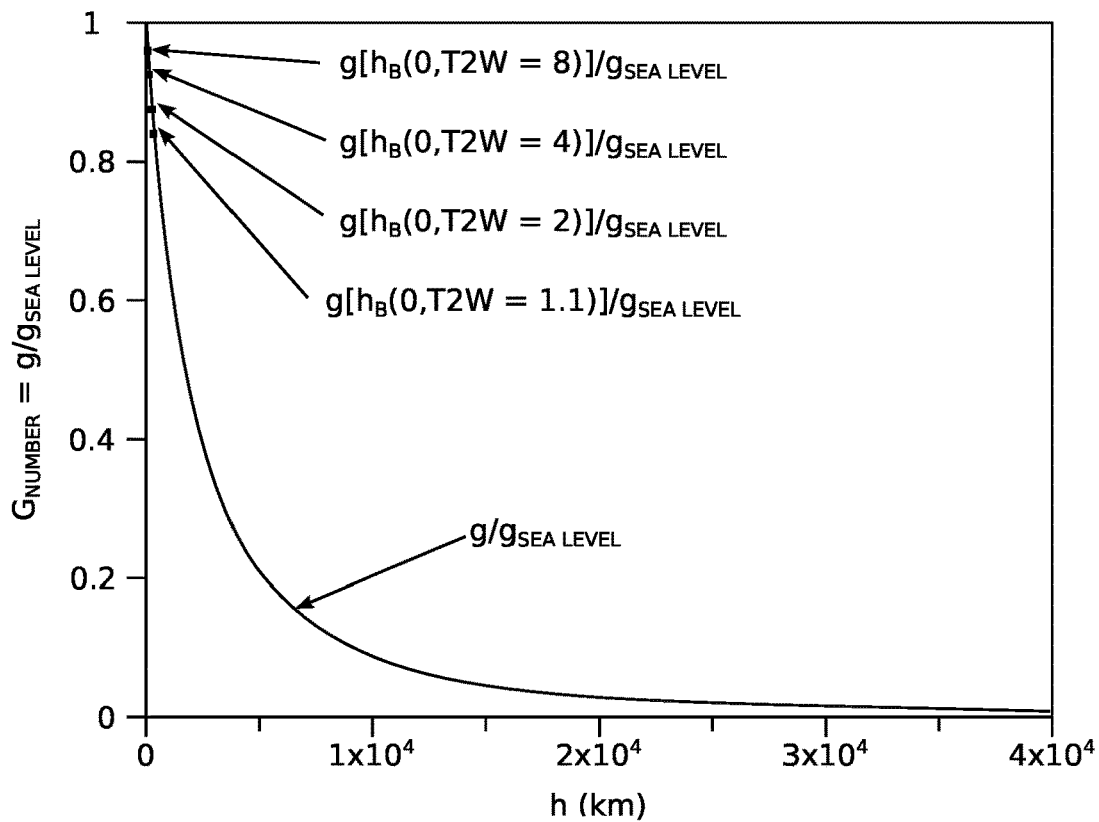
FIG. 2C depicts the gravitational acceleration normalized to its sea level value as a function of altitude g(h) with the maximum burn altitude $h_B(\mu_f=0)$ for T2W=1.1, 2, 4 and 8 marked on the curve.

FIG. 2C depicts the gravitational acceleration normalized to its sea level value as a function of altitude g(h) with the maximum burn altitude $h_B(\mu_f=0)$ for T2W=1.1, 2, 4 and 8 marked on the curve.

Included in the table with corresponding numbering in column 1 are:

GOCE 1,000 [kg], ESA Gravity Field and Steady-State Ocean Circulation Explorer,

ISS International Space Station

Hubble 11,110 [kg],

Iridium 689 [kg]

GPS Block 11F 1,630 [kg]

Latest Geo-Synchronous satellite 4,276 [kg]

Inner Van Allen (Min): Lower altitude of the Van Allen inner radiation belt, due to interaction between Earth's magnetic field and incoming high speed charged particles, mainly from the sun.

Inner Van Allen (Max): Higher altitude of the Van Allen inner radiation belt

Outer Van Allen (Min): Lower altitude of the Van Allen outer radiation belt

Outer Van Allen (Max): Higher altitude of the Van Allen outer radiation belt

Applying Energy Conservation Principle to the New Satellite Launch Method

All the space launch systems today are very large systems and have rocket motors with very large thrust values giving them large thrust to weight ratios, always much greater than 1 to achieve the orbital velocities only achievable with very large burn rates as can be seen in Tables 4A and 4B. The potential energy of a satellite with a mass m at a circular orbit with a radius of $r_{ORBIT}$, measured from the center of the earth can be calculated with the integral as done in (2.10) is [21-23], $$PE(r_{ORBIT}) = \int_{\infty}^{r_{ORBIT}} G\frac{mM}{r^2} dr = -G\frac{mM}{r_{ORBIT}} \tag{3.1}$$

The kinetic energy of the satellite at a circular orbit with a radius measured from the center of the earth $r_{ORBIT}$ is, $$KE(r_{ORBIT}) = \frac{1}{2}mv_{ORBIT}^2 \tag{3.2}$$

TABLE 2

Some Satellite altitudes and critical distances between the Earth and the Moon along with orbital periods, velocities, typical orbital masses, calculated fall times to Earth, and the ratio of the gravitational acceleration ratio to the $g_0$ at the Earth's surface.

| Satellite or critical Distances Between Earth and the Moon | Altitude[km]/mass[kg] | Free Fall time to Sea Level with no air resistance [minutes] and $g/g_0$ | Orbital Period [Hour] | Orbital Velocity [m/sec]/[Mach] |
|---|---|---|---|---|
| 1 | 255/1,000 | 37.23/0.9246 | 1.49 | 7,751/22.8 |
| 2 | 400/Multiple Launches | 38.75/0.8854 | 1.54 | 6,668/22.55 |
| 3 | 540/11,110 | 40.22/0.8499 | 1.59 | 7,590/22.32 |
| 4 | 781/689 | 42.78/0.7937 | 1.67 | 7,461/21.94 |
| 5 | 20,200/1,630 | 352.8/0.05758 | 11.98 | 3,872/11.39 |
| 6 | 35,786/4,276 | 711.6/0.02288 | 23.94 | 3,074/9.04 |
| 7 | 1,000 (~0.2 YEARTH)/NA | 45.17/0.7472 | 1.75 | 7,350/21.62 |
| 8 | 12,000 (~2 YEARTH)/NA | 200/0.12 | 6.89 | 4,657/13.70 |
| 9 | 13,000 (~3 YEARTH)/NA | 217/0.1083 | 7.46 | 4,535/13.34 |
| 10 | 60,000 (~10 EARTH)/NA | 1,412/0.00923 | 47.28 | 2,450/7.21 |

Since satellite is orbiting the earth at a circular orbit with a radius measured from the center of the earth $r_{ORBIT}$, it must satisfy the $v_{ORBIT}^2$ relation derived earlier in (2.5). Substituting (2.5) in (3.2) gives, $$KE(r_{ORBIT}) = \frac{1}{2} m \left( \frac{GM}{r_{ORBIT}} \right) \tag{3.3}$$

The total energy of the satellite $TE(r_{ORBIT})$ is the sum of its kinetic (3.3) and potential (3.1) energies giving, $$TE(r_{ORBIT}) = \frac{1}{2} G \frac{mM}{r_{ORBIT}} - G \frac{mM}{r_{ORBIT}} = -\frac{1}{2} G \frac{mM}{r_{ORBIT}} \tag{3.4}$$

Now, the question is to find what radius $r_0$, measured from the center of the Earth, will give the same total energy (3.4) to the satellite with the same mass m while it is stationary. Since we assume the satellite is stationary at radius $r_0$, its kinetic energy is zero, meaning that its total energy is equal to its potential energy, $$TE(r_0) = PE(r_0) = -G \frac{mM}{r_0} \tag{3.5}$$

Equating (3.4) to (3.5) $r_0$ can be calculated solving it from, $$-G \frac{mM}{r_0} = -\frac{1}{2} G \frac{mM}{r_{ORBIT}} \tag{3.6}$$

Solving $r_0$ from (3.6) gives surprisingly simple result of, $$r_0 = 2 \cdot r_{ORBIT} \tag{3.7}$$

Equation (3.7) means that the satellite in a circular orbit at a radius of $r_{ORBIT}$, measured from the center of the earth, will have the same total energy while it is stationary at a radius of $2 \cdot r_{ORBIT}$.

Figure 3A:
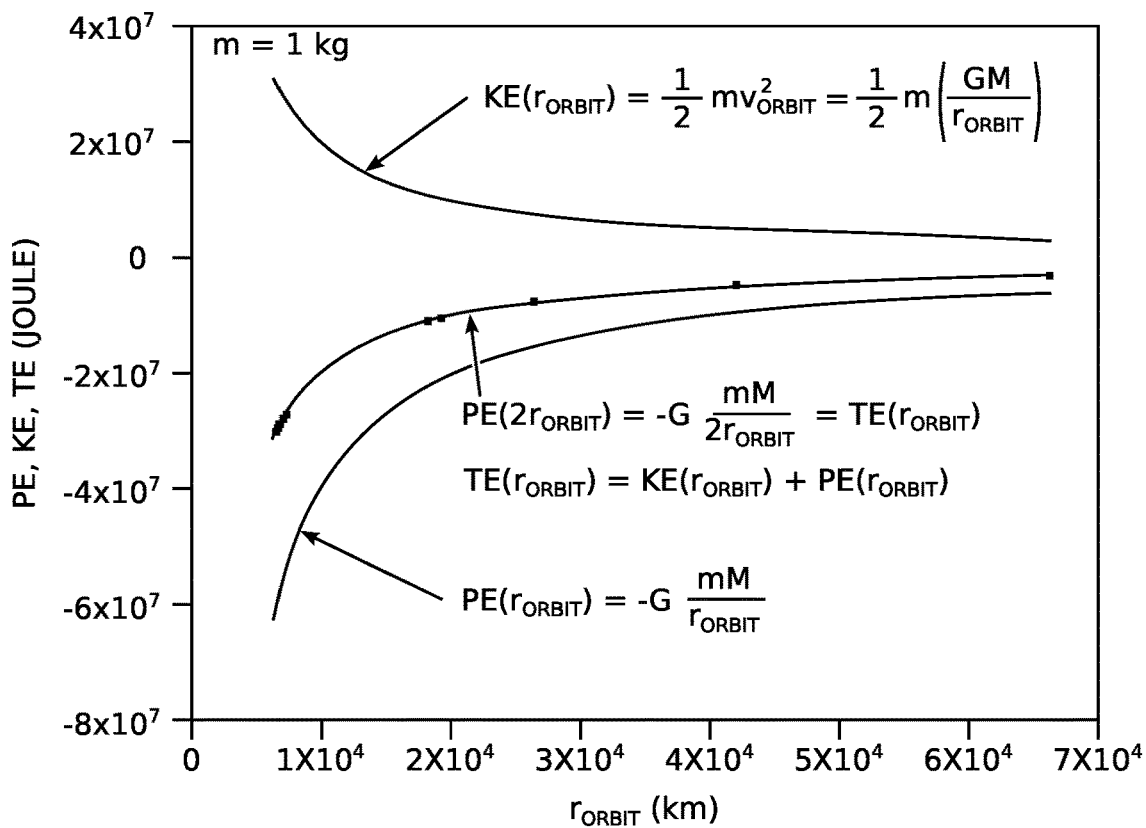
FIG. 3A depicts the gravitational potential energy as a function of radius $r_{ORBIT}$ with respect to Earth's center, along with the kinetic energy when in orbit at the radius $r_{ORBIT}$, and its total energy.
Figure 3B:
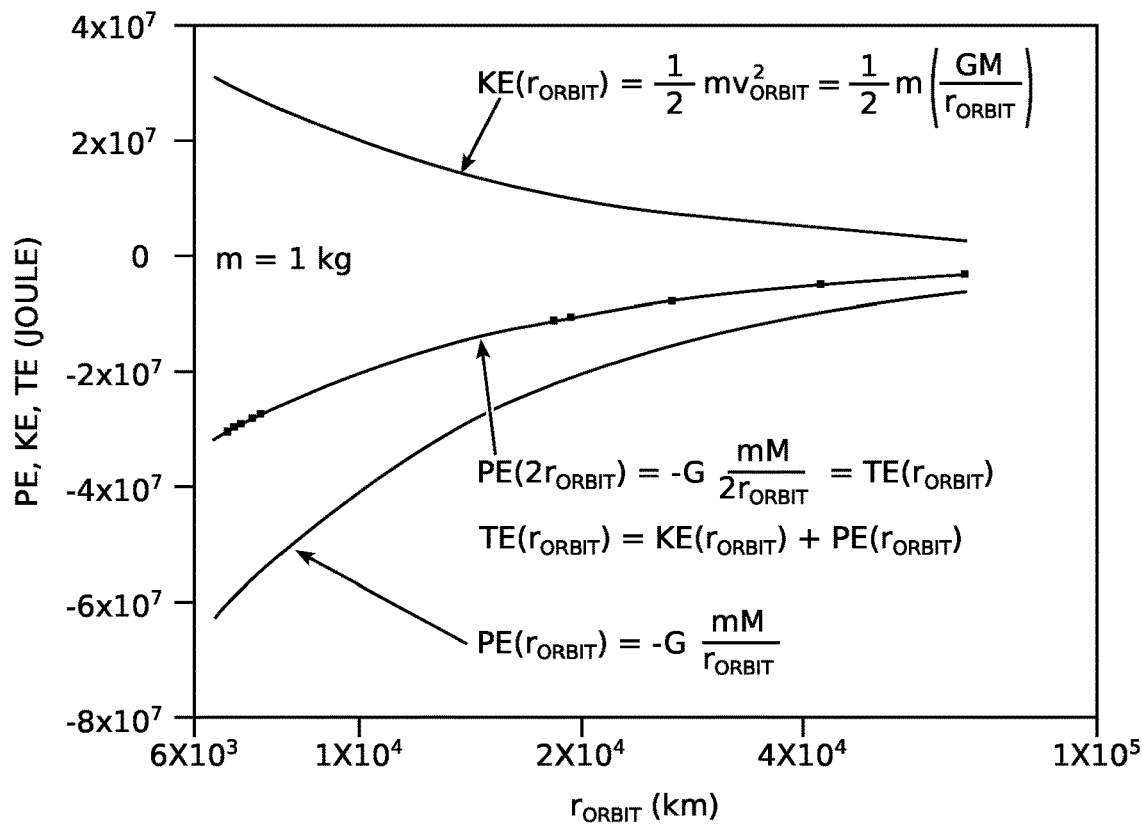
FIG. 3B depicts the same plots in FIG. 3A, where x axes plotted in logarithmic scale.

FIG. 3A shows "apparent" three curves, but there are four curves, which two of them are on top of each other. The four curves plotted in FIG. 3A are the gravitational potential energies for a mass m equal to 1 [kg] at radiuses at $r_{ORBIT}$ and $2r_{ORBIT}$ marked as $PE(r_{ORBIT})$ and $PE(2r_{ORBIT})$, kinetic energy $KE(r_{ORBIT})$ and total energy $TE(r_{ORBIT})$ of the mass m at a circular orbit at a radius of $r_{ORBIT}$ from the center of the earth. For convenience the mass m is taken as 1 [kg] in energy calculations. The marked points on the total energy curve $TE(r_{ORBIT})$ are the total energies of the satellite with a mass of m at a circular orbit at orbital altitudes given in Table 2 following the same numbering on the plots just to show that $TE(r_{ORBIT})$ and $PE(2r_{ORBIT})$ exactly match, which is the numerical verification of the proof given in Sections 3.0 and 3.1 in detail. To have a clearer view of the tight spacings between the markings for the Table 2 orbital altitudes, the FIG. 3A data is presented by having its x axes presented in the logarithmic scale in FIG. 3B.

Figure 3C:
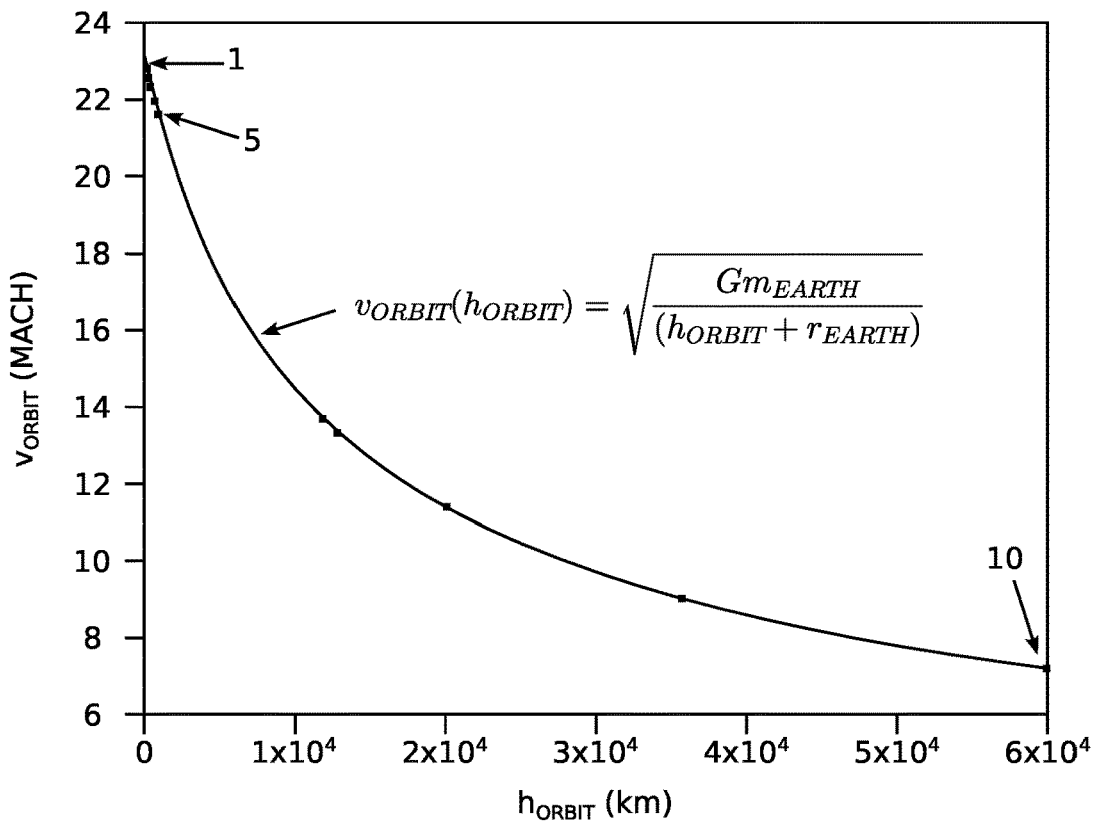
FIG. 3C depicts the orbital velocity as a function of orbital altitude with the velocity gained when dropping from $2 \cdot r_{ORBIT}$ to $r_{ORBIT}$ along with markings of the orbital altitudes given in Table 2 which matches the orbital velocity as a function of orbital altitude curve.

FIG. 3C depicts the orbital velocity as a function of the orbital altitude $v_{ORBIT}(h_{ORBIT})$ as shown in FIG. 1A with the velocities gained by dropping from $r_0 = 2r_{ORBIT}$ to $r_{ORBIT}$ for the orbital altitudes given in Table 2. As can be seen the markers are exactly on the $v_{ORBIT}(h_{ORBIT})$ curve.

The only problem is that the velocity vector of the falling object with a mass m is towards the center of the stationary spherical body with a mass M, not in the tangent direction to the desired orbital trajectory. Therefore, during the descent a rocket thrust may be needed to steer/divert the descending spacecraft or satellite into the desired orbital trajectory.

Substituting (2.7), which gives the relation between the orbital altitude h of the satellite and $r_{ORBIT}$ into (3.7) gives, $$r_0 = 2 \cdot (r_{EARTH} + h) \tag{3.8}$$

Typically, satellite orbits are given as their altitude from sea level instead of radius from the center of the earth. Therefore writing (3.8) as a function of the required altitude above sea level $h_0$ corresponding to $r_0$ gives, $$h_0 = 2 \cdot (r_{EARTH} + h) - r_{EARTH} = r_{EARTH} + 2h \tag{3.9}$$

Close examination of (3.9) shows that for small orbital altitudes compared to the radius of earth, like Low Earth Orbit (LEO) launches, the initial launch altitude is much larger than the orbital altitude h. In other words, for LEO launches the rocket must travel far longer distances compared to the conventional method of launching a satellite into orbit ($h_0 \gg h$).

Figure 3D:
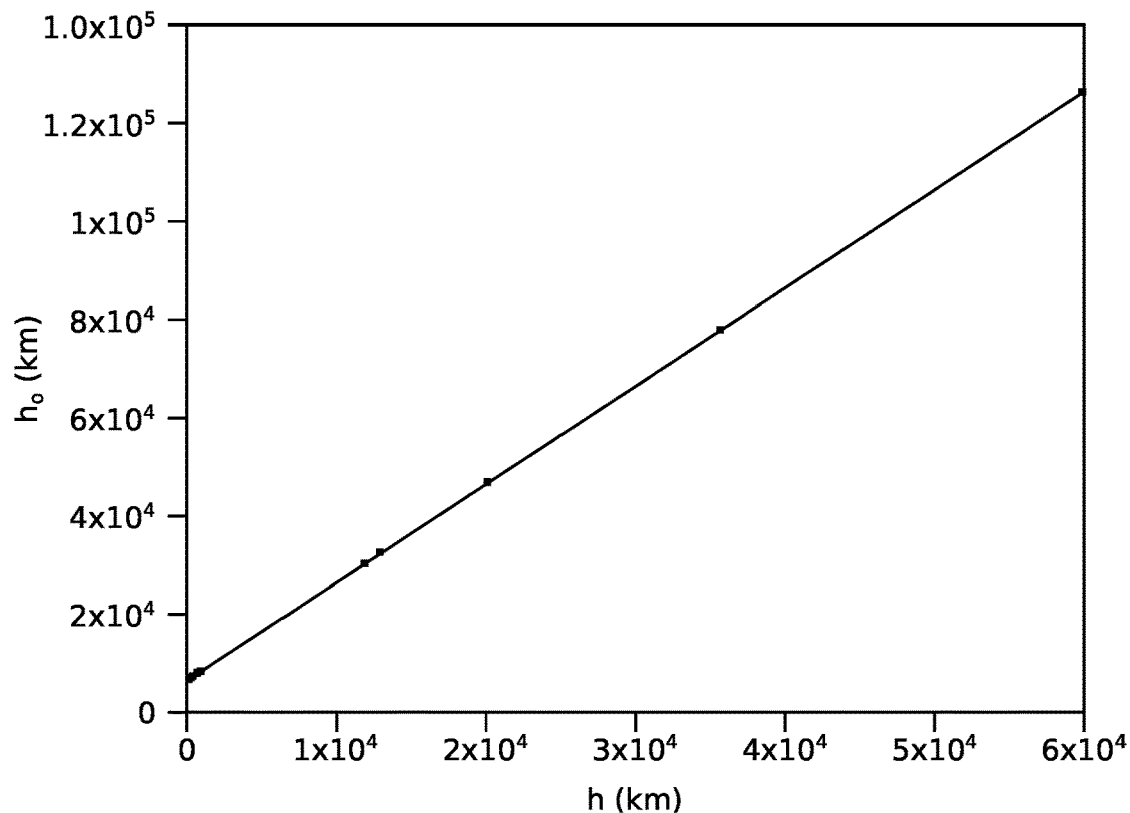
FIG. 3D depicts the launch altitude as a function of the orbital altitude along with markings of the orbital altitudes given in Table 2.

FIG. 3D depicts the launch altitude as a function of the orbital altitude along with markings of the orbital altitudes given in Table 2. FIG. 3D displays the relation (3.9), but not very clearly for LEO launches, as the marked orbital launch altitudes are very tightly spaced and difficult to distinguish from each other. Proposed first launch altitude $h_0$ to the desired orbital altitude h ratio $\eta$ displays this fact much clearly giving, $$\eta(h) = \frac{r_{EARTH} + 2h}{h} \tag{3.10}$$

Figure 3E:
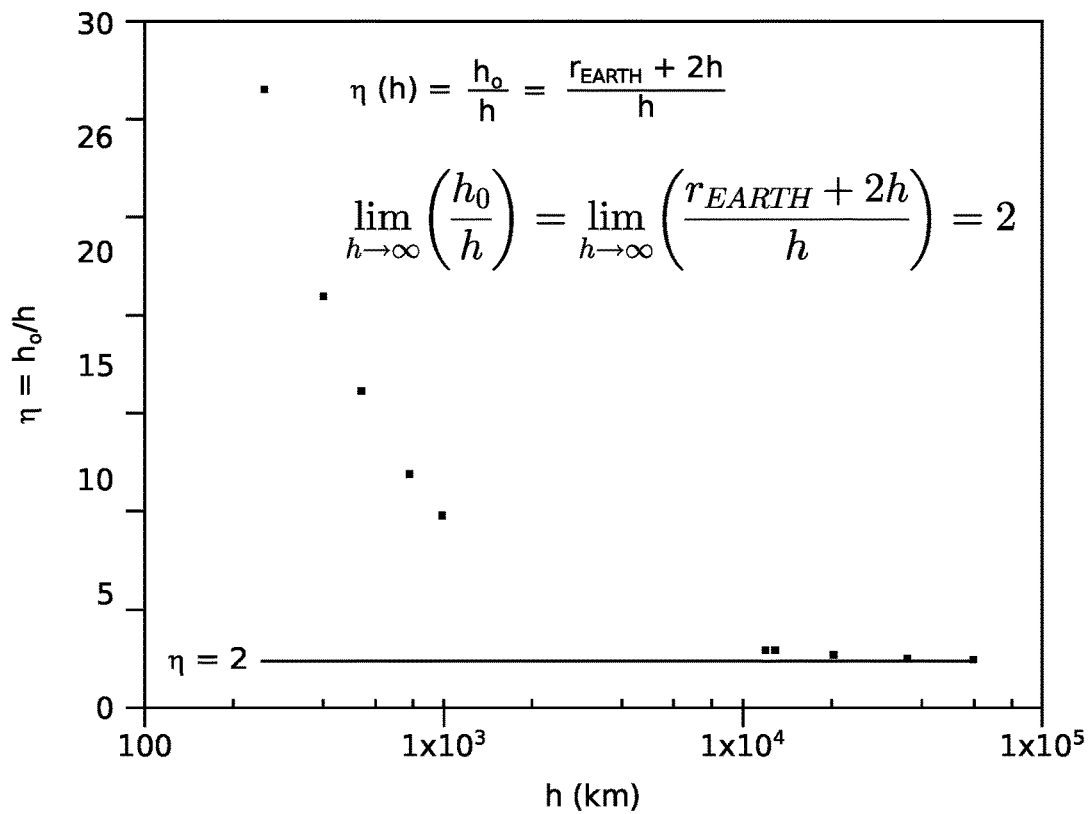
FIG. 3E depicts the launch altitude to the orbital altitude ratio along with markings of the orbital altitudes given in Table 2 where the x axis is plotted in logarithmic scale.

FIG. 3E depicts the launch altitude to the orbital altitude ratio along with markings of the orbital altitudes given in Table 2 where the x axis is plotted in logarithmic scale. FIG. 3E depicts $\eta(h)$ function where the x axis is drawn logarithmic to show the LEO ratios much clearly. As can be seen for LEO the ratios are above 25, even for large values of desired orbital altitudes h, the ratio $\eta$ approaches 2.

Figure 3F:
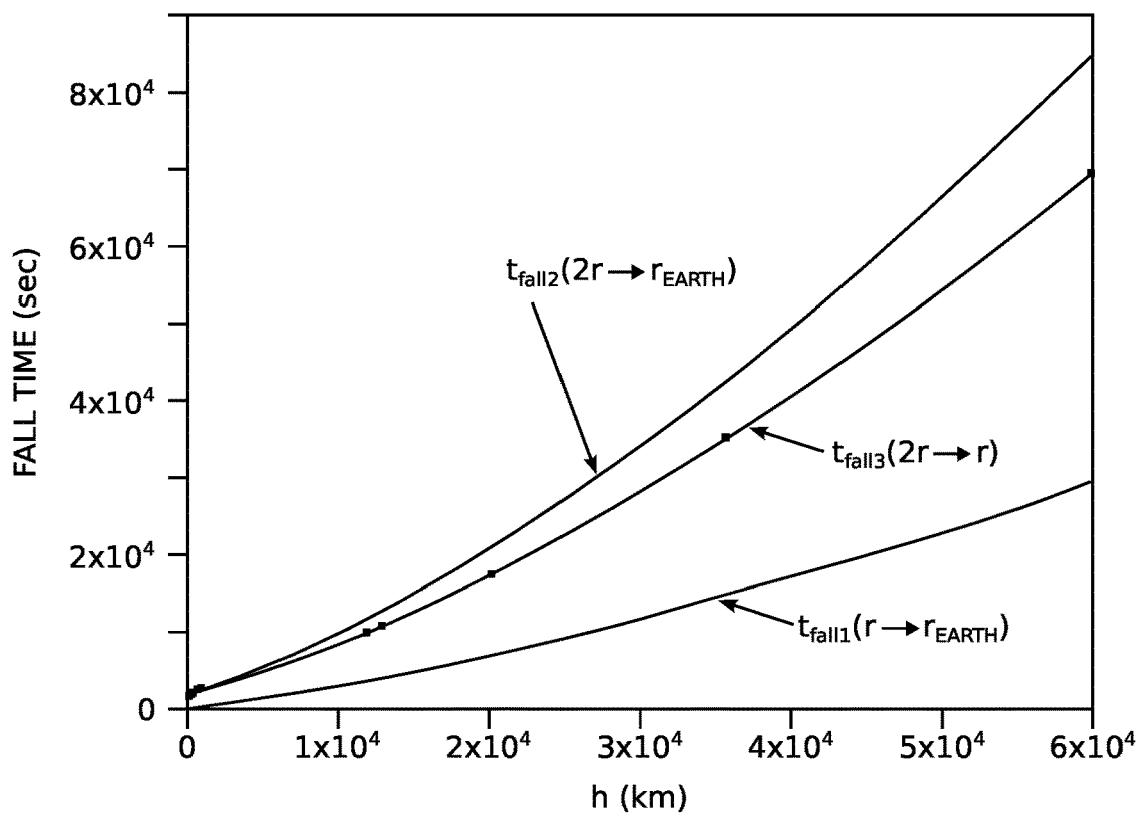
FIG. 3F depicts the fall times from ($2 \cdot r_{ORBIT}$ to $r_{ORBIT}$), ($2 \cdot r_{ORBIT}$ to $r_{EARTH}$) and ($r_{ORBIT}$ to $r_{EARTH}$).

FIG. 3F depicts the fall times from $(2 \cdot r_{ORBIT}$ to $r_{ORBIT})$, $(2 \cdot r_{ORBIT}$ to $r_{EARTH}$ and $(r_{ORBIT}$ to $r_{EARTH})$.

Figure 3G:
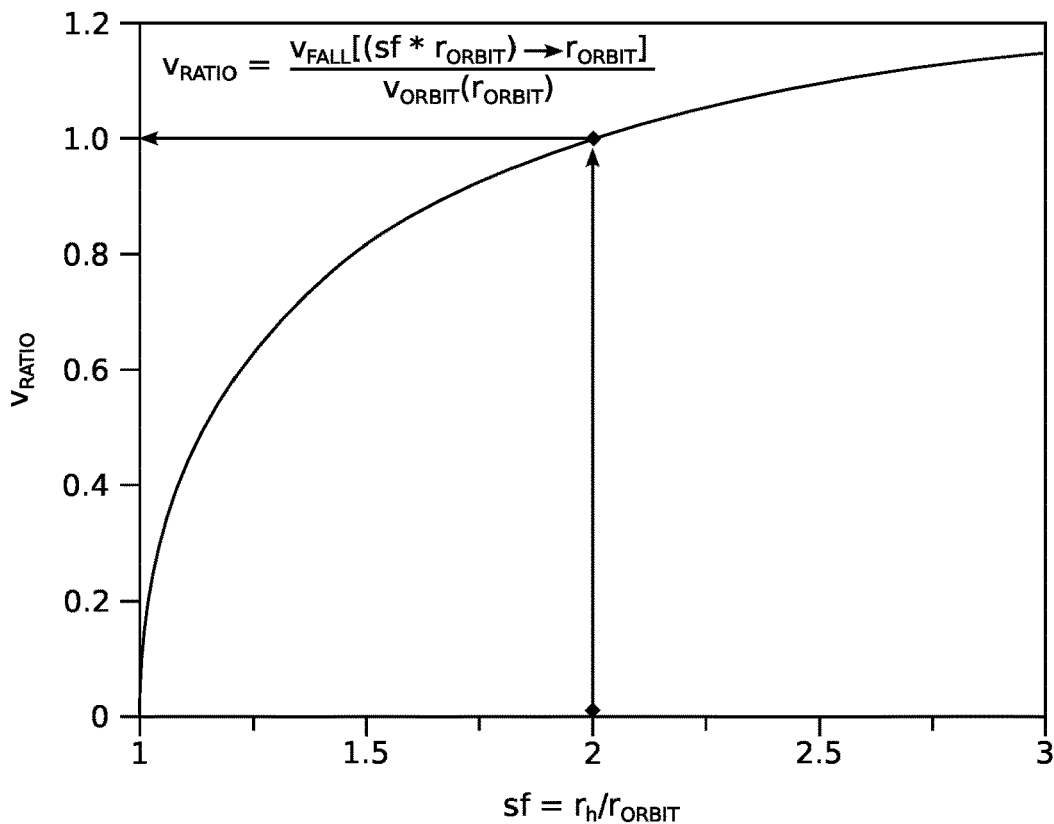
FIG. 3G depicts the velocity that the payload gains, which was at rest at a radius of $r_h$ in terms of the orbital velocity $v_{ORBIT}$ for a circular orbit at the radius of $r_{ORBIT}$ as a function of $s_f$ when falling from $r_h$ to $r_{ORBIT}$, $$sf = \frac{r_h}{r_{ORBIT}}.$$

FIG. 3G depicts the velocity that the payload gains, which was at rest at a radius of $r_h$ in terms of the orbital velocity $v_{ORBIT}$ for a circular orbit at the radius of $r_{ORBIT}$ as a function of $s_f$ when falling from $r_h$ to $r_{ORBIT}$, $$s_f = \frac{r_h}{r_{ORBIT}}$$

To demonstrate the derived mechanics for an orbital altitude h=400 [km] with a real numerical example will be useful.

a. Launch the satellite to an altitude $h_0$ from sea level, same altitude of International Space Station (ISS) as given by relation (3.9), $$h_0 = 6{,}378 + 400 \times 2 = 7{,}178 [km] \tag{3.11}$$

The rocket is launched from the surface of the earth such that it climbs to 7,178 [km] of altitude from sea level straight up, in radial direction opposite to the gravitational attraction force of the earth and when it reaches this altitude, it will become stationary, which means it has zero kinetic energy. At this point its potential energy is equal to the total energy, and it is equal to the total energy if it was in an orbit at 400

[km]. It can reach this altitude with any speed profile, and as long as it becomes stationary at the altitude $h_0$, it will have the same total energy as if it was in a circular orbit around the earth at an altitude 400 [km] above sea level.

ii) In this step the satellite falls back freely towards earth. During the descent, the satellite's speed will only have a radial component, towards to the center of the earth and when it falls to the desired orbital altitude of 400 [km], the magnitude of its speed will be equal to the speed needed to put it in the orbit at 400 [km] altitude from sea level, but its speed will be in a radial direction, not in a direction tangential to the desired orbital trajectory, and it will continue to fall towards the Earth.

iii) Since during the free fall explained above, the descent velocity vector direction is typically never tangential to the orbital trajectory to put the satellite into orbit. Therefore, during the descent some energy must be supplied to the satellite through a proper rocket thrust in the proper direction to provide the change in the descent trajectory.

This concept, even the math seems to be correct, is counter intuitive to conventional launch strategy. As opposed to conventional logic, a satellite can be put to an orbit of 400 [km] above the sea level (for example), without climbing to the same orbital altitude with a roll and a gravity turn as has been done since 1957, with an orbital velocity tangent to the orbit, by first climbing to an altitude of 7,178 [km] above sea level, which is 17.945 times higher than 400 [km], and attaining an energy equal to the total orbiting energy.

Figure 13A:
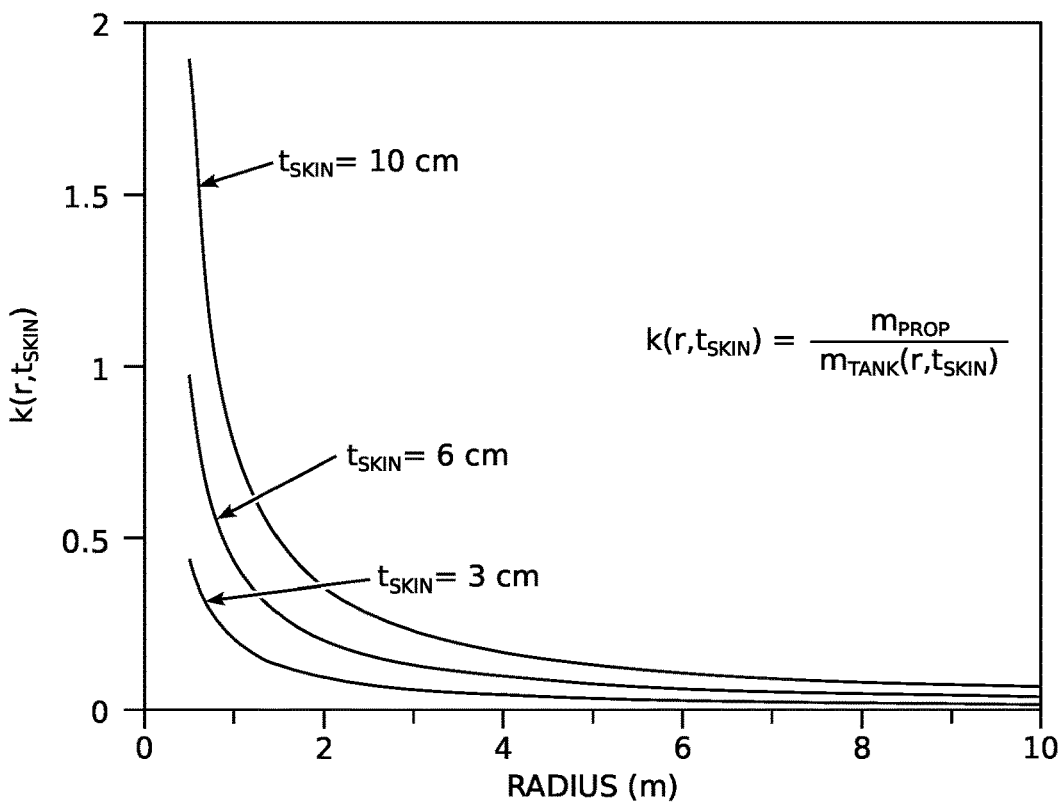
FIG. 13A depicts k=f (r, $t_{skin}$) for an aluminum skin thickness of $t_{skin}$=3, 6, and 10 cm when carrying 20 tons of propellant mass.
Figure 13B:
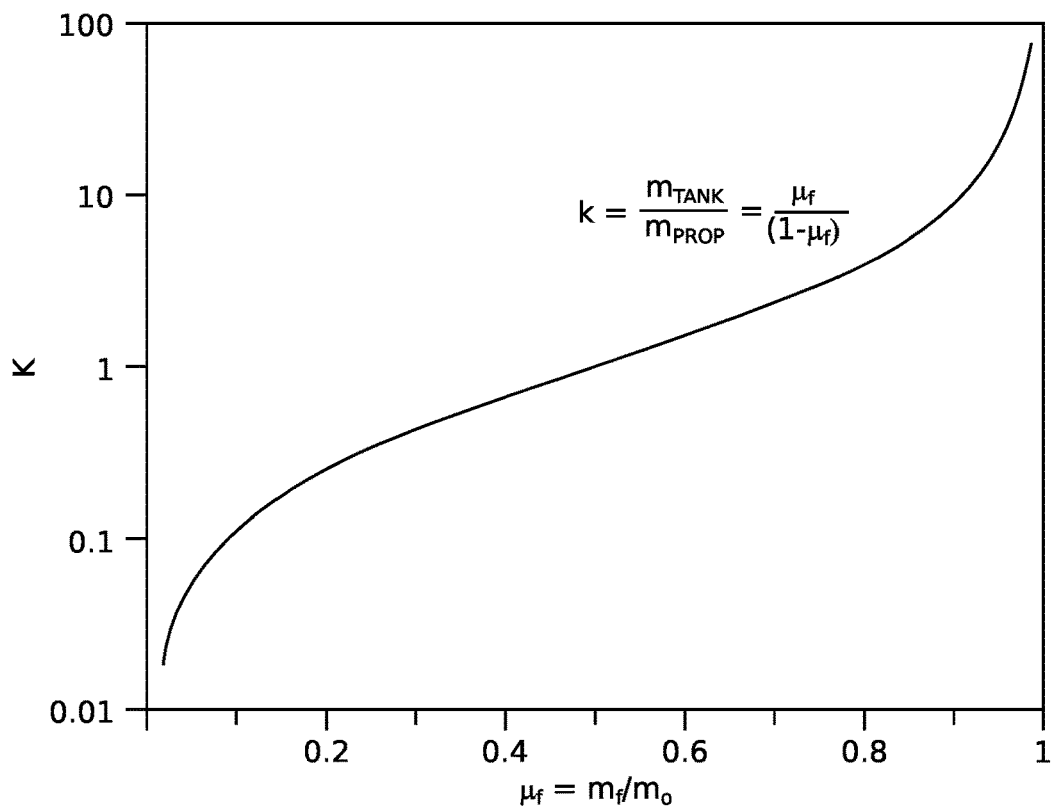
FIG. 13B depicts the plot of relation (8.12), which gives the minimum value of k=$k_{MAX}$ that needs to be satisfied to give a desired value of $\mu_f$.
Figure 13C:
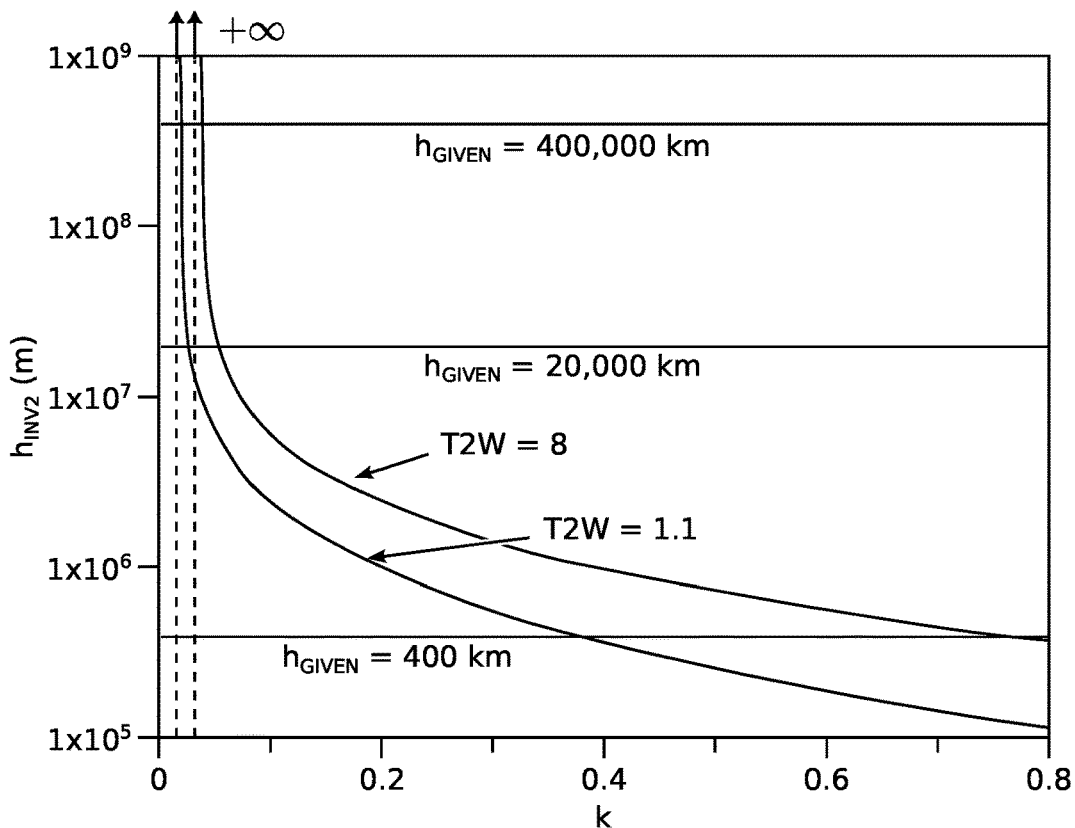
FIG. 13C depicts the height $h_{INV2}(k_{MAX}, T2W)$ function, an important relationship between the height that the rocket can reach and the $k_{MAX}$ value that the rocket design must satisfy, graphically permitting the determination of $k_{MAX}$ for $h_{GIVEN}$=400 km, 20,200 km, and 400,000 km.
Figure 13D:
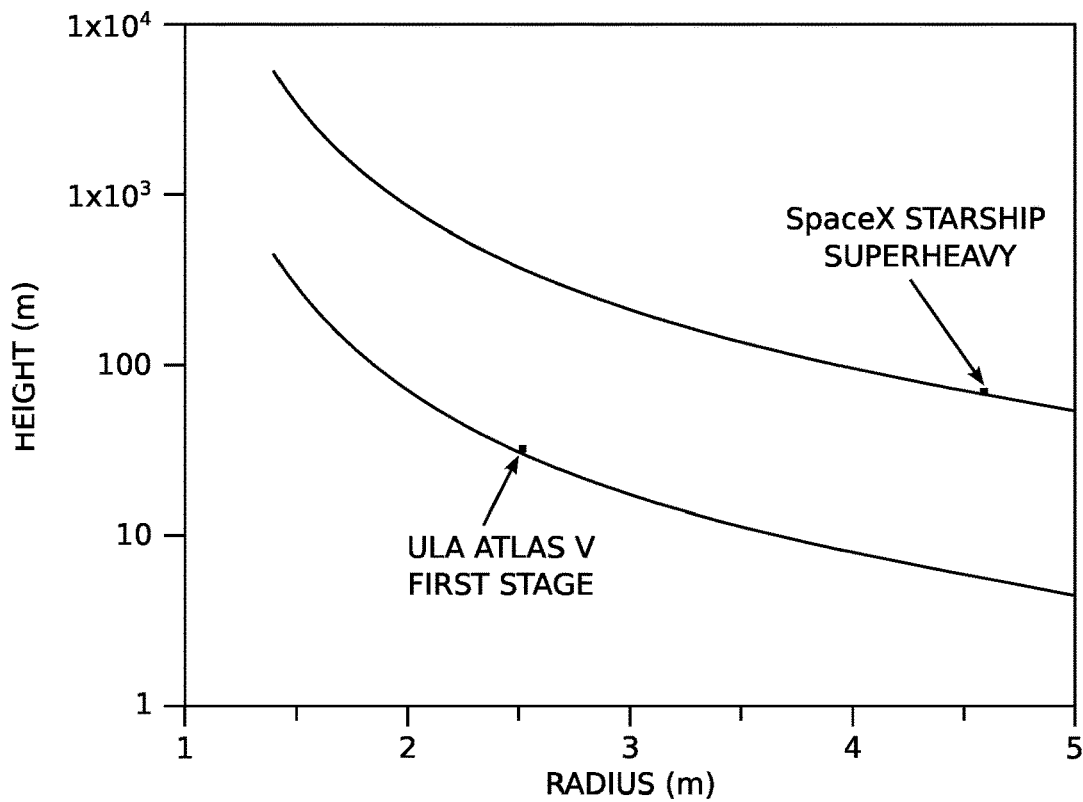
FIG. 13D depicts the SpaceX Starship Super Heavy (loaded with 3,400 tons of propellant) and the ULA Atlas first stage (loaded with 284 tons of propellant) booster heights with a $t_{SKIN}$ thickness of 3 [cm], with respective diameters of 9 [m] and 3.81 [m].
Figure 13E:
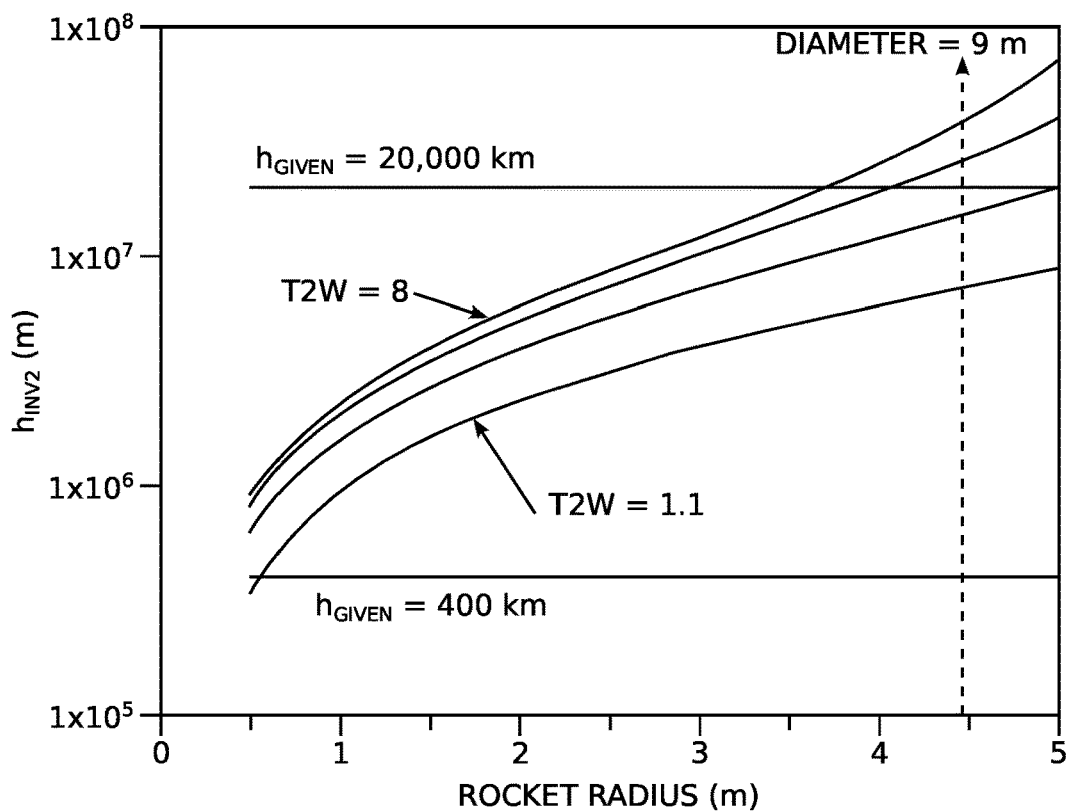
FIG. 13E depicts $h_{INV2}(r, T2W)$, where r is the rocket diameter of the SpaceX Starship Super Heavy loaded with 3,400 Tons of propellant having $t_{SKIN}$=3 [Cm].
Figure 13F:
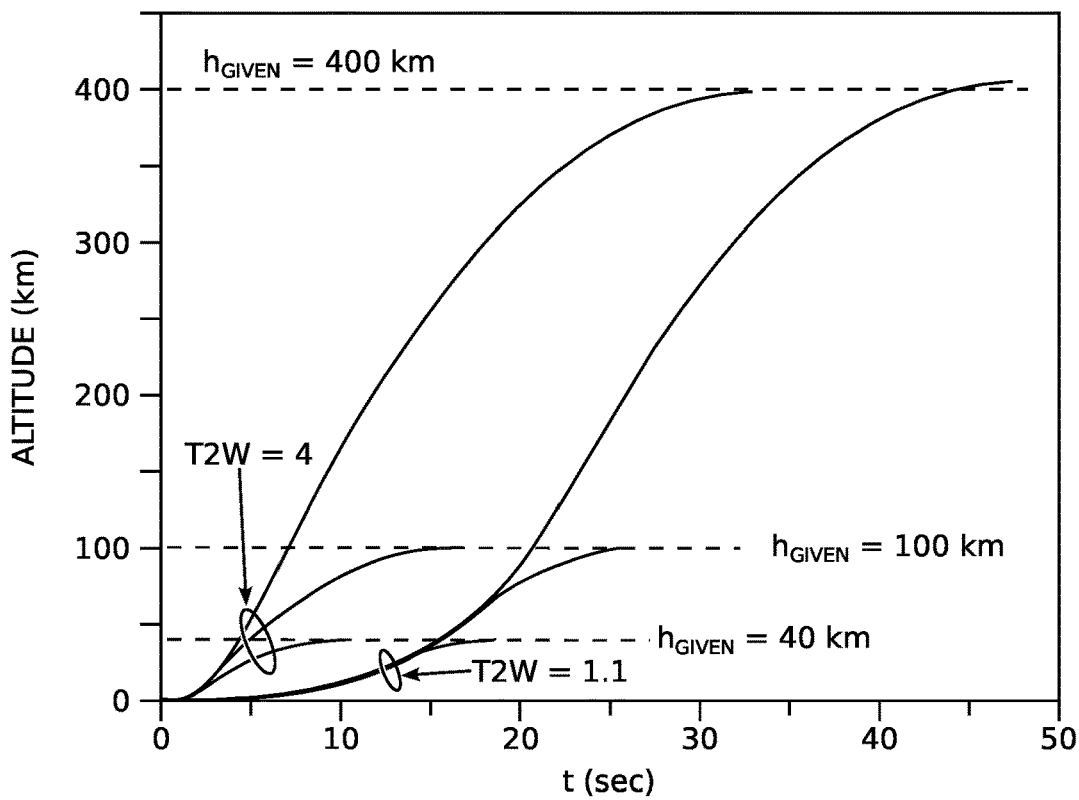
FIG. 13F depicts altitude as a function of time for rocket launching 1,000 [kg] of payload to 40, 100 and 400 [km] altitudes for T2W=1 and 4, k=0.01, NOT an orbital launch.
Figure 13G:
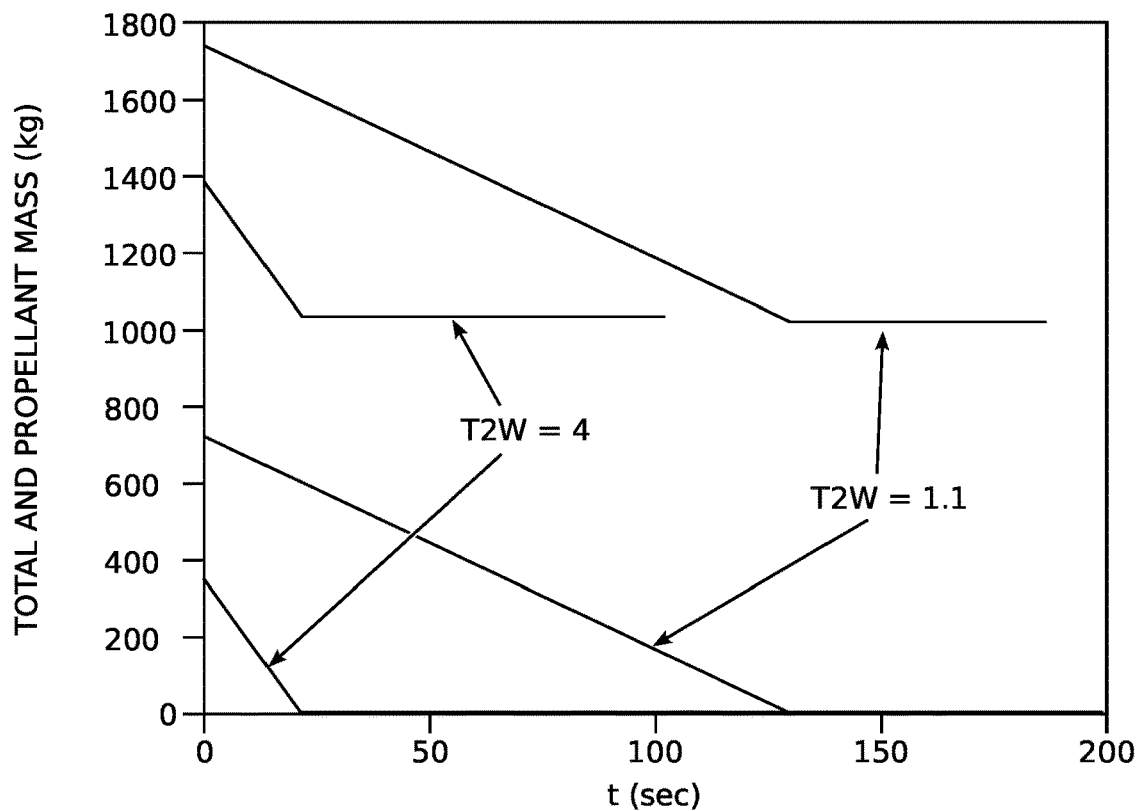
FIG. 13G depicts propellant and total mass as a function of time for launching 1,000 [kg] of payload to 40 [km] altitude for T2W=1, and 4, k=0.01.
Figure 13H:
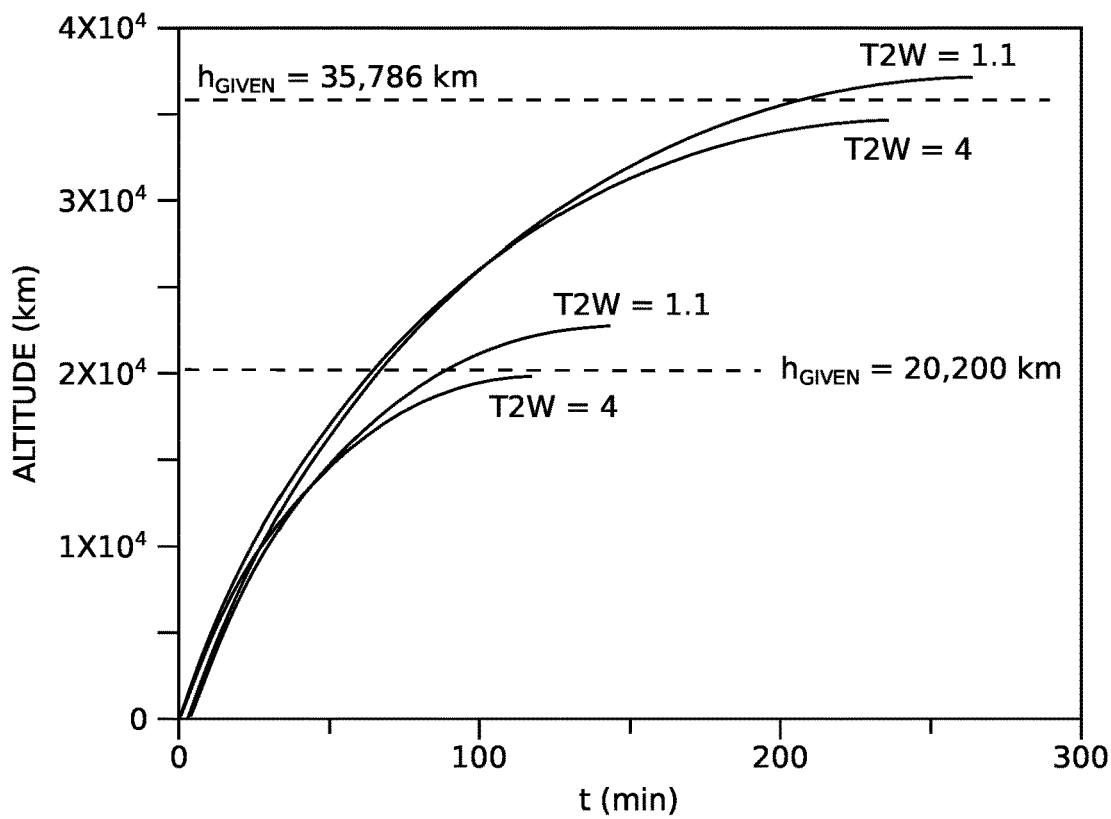
FIG. 13H depicts altitude as a function of time for rocket launching of 1,000 [kg] of payload to 20,200 and 35,786 [km] (GPS and GEO) altitudes for T2W=1.1 and 4, k=0.01, NOT an orbital launch
Figure 13I:
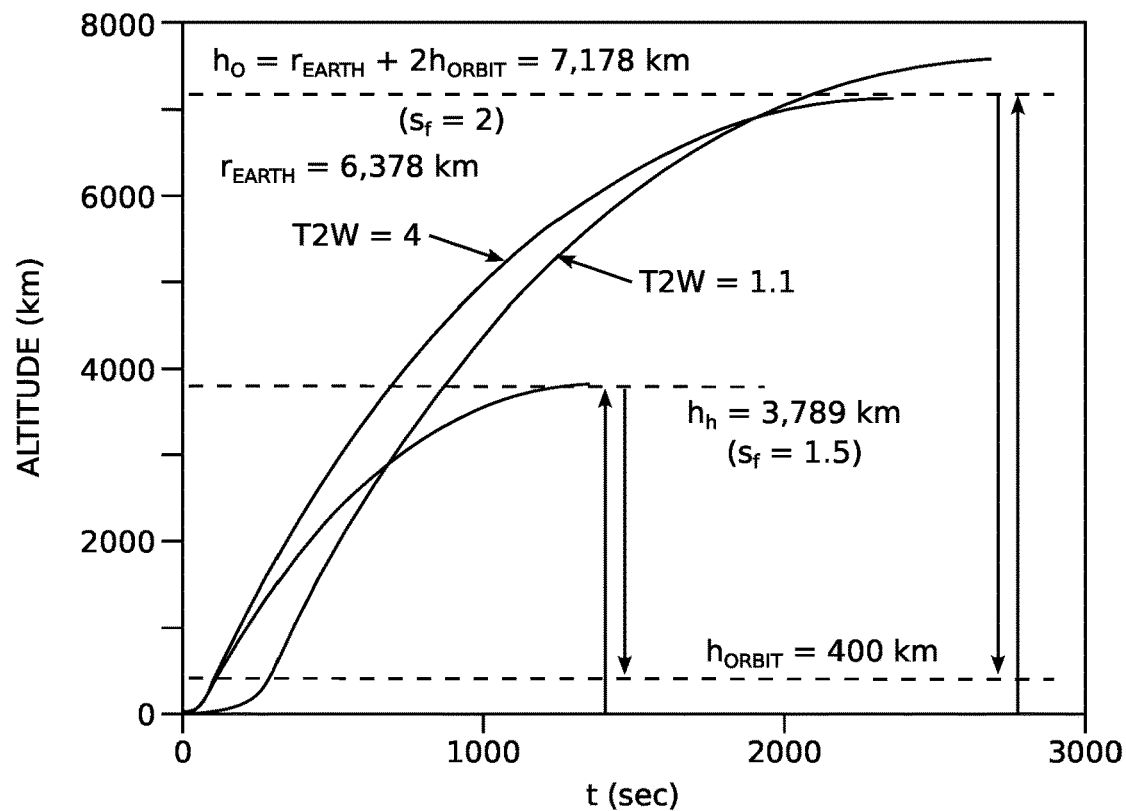
FIG. 13I depicts altitude as a function of time for rocket launching of 1,000 [kg] of payload to a circular orbital altitude of 400 [km] (ISS) with $s_f$=1.5 and 2 for T2W=1.1 and 4, k=0.01.
Figure 13J:
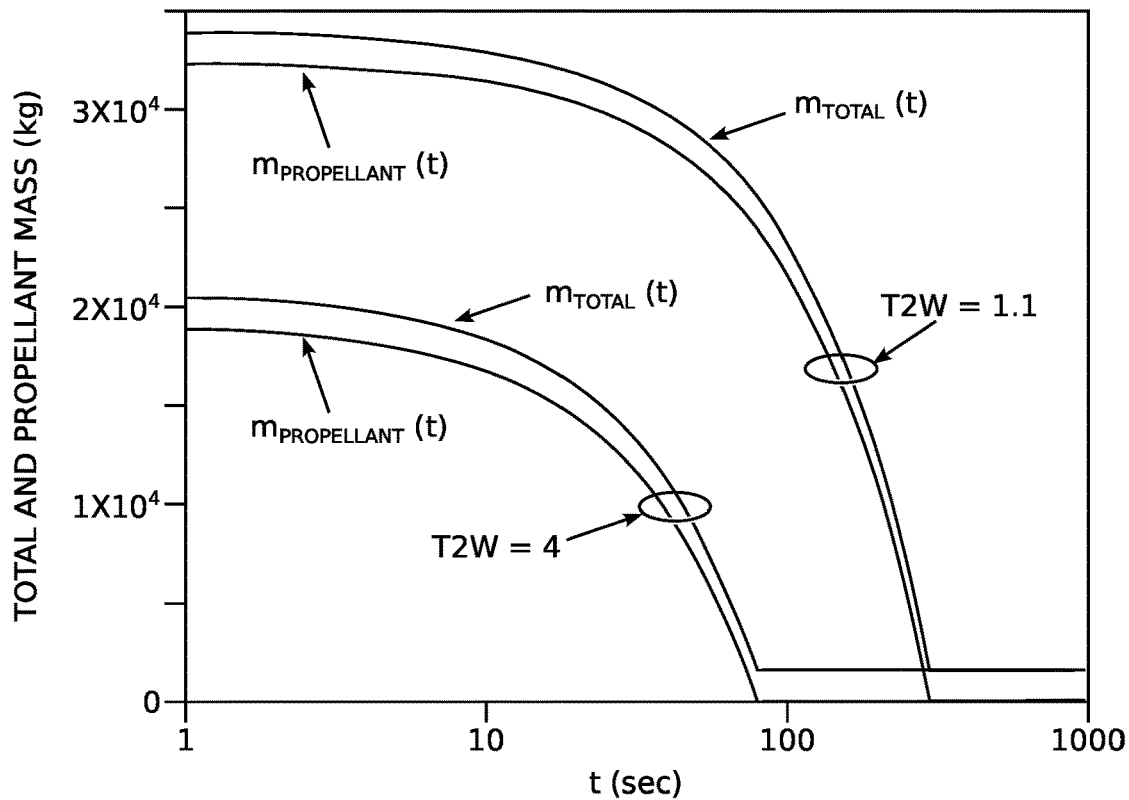
FIG. 13J depicts propellant and total mass as a function of time in logarithmic horizontal axes for launching 1,000 [kg] of payload to a circular orbit at 400 [km] (ISS) altitude with $s_f$=2 for T2W=1.1 and 4, k=0.01.
Figure 13K:
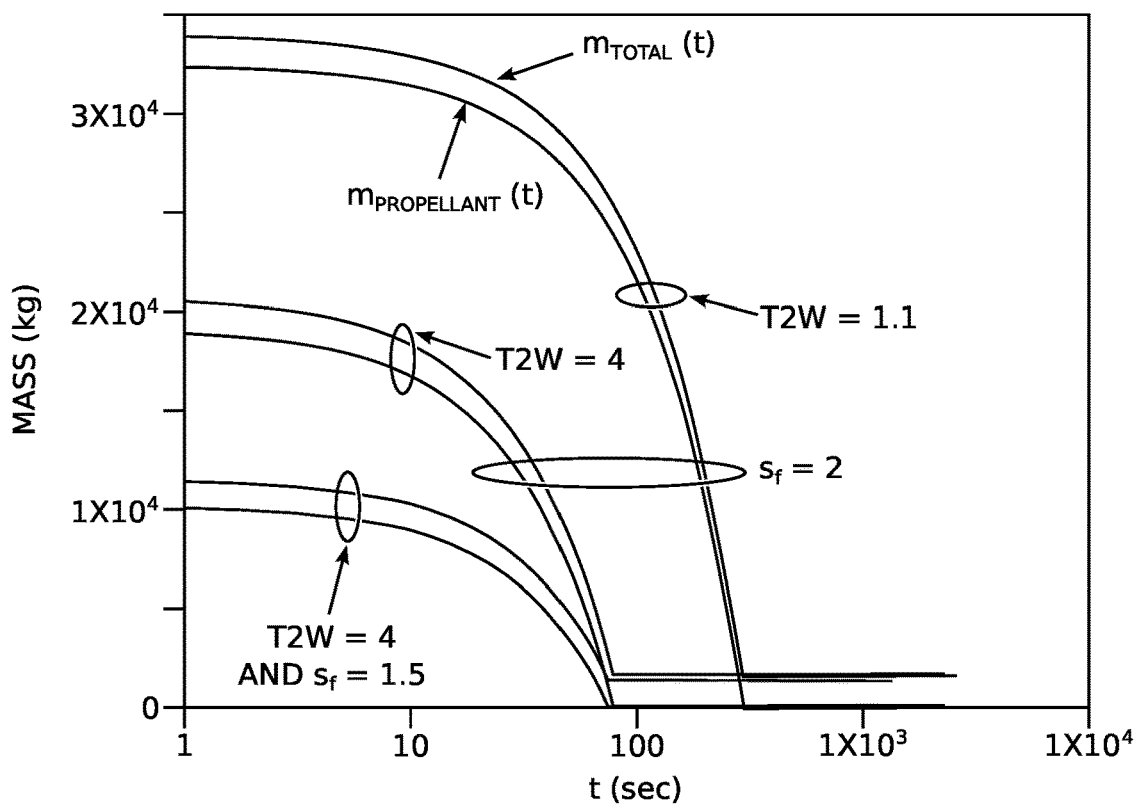
FIG. 13K depicts propellant and total mass as a function of time in logarithmic horizontal axes for launching 1,000 [kg] of payload to a circular orbit at 400 [km] (ISS) altitude with $s_f$=1.5 and 2 for T2W=1-1 and 4, k=0.01.
Figure 13L:
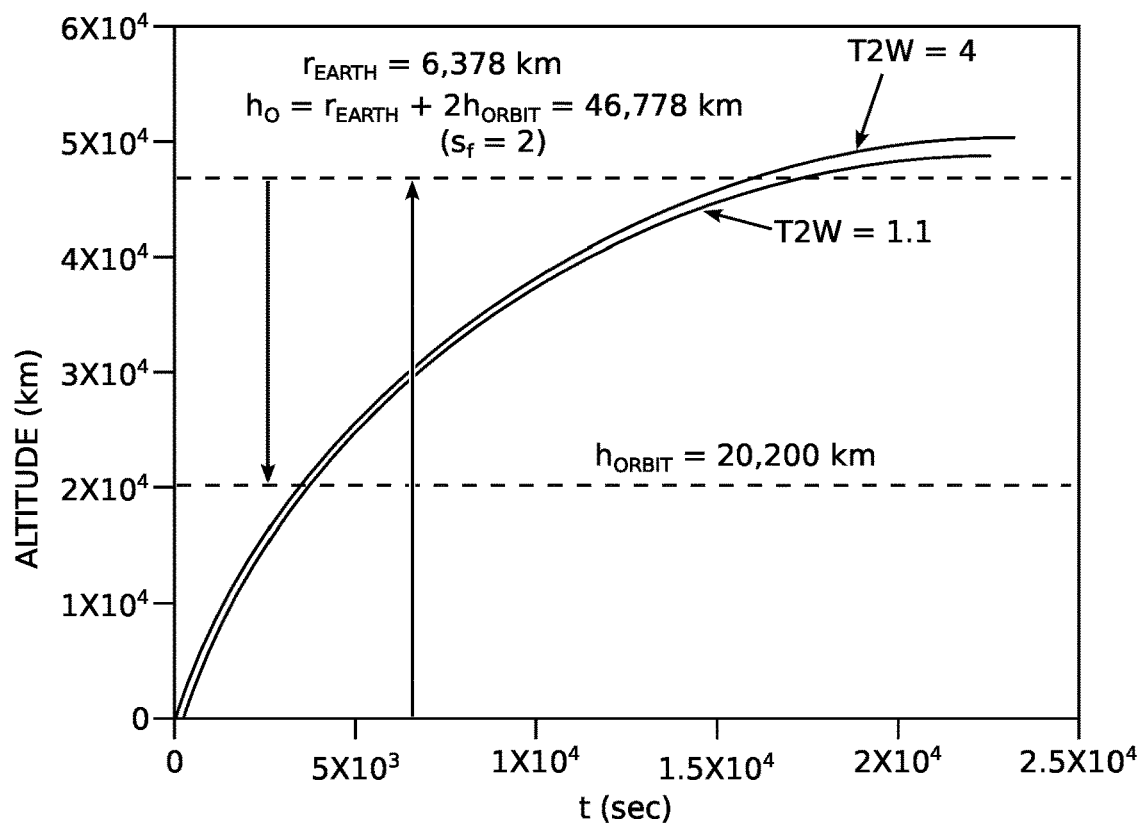
FIG. 13L depicts altitude as a function of time for rocket launching of 1,000 [kg] of payload to a circular orbital altitude of 20,200 [km] (GPS) with $s_f$=2 for T2W=1.1 and 4, k=0.01.

FIG. 13I demonstrates the methodology employed for two different values of $s_f$=1.5 and 2 along with the related mass versus time plots of FIG. 13J and FIG. 13K.

Figure 13M:
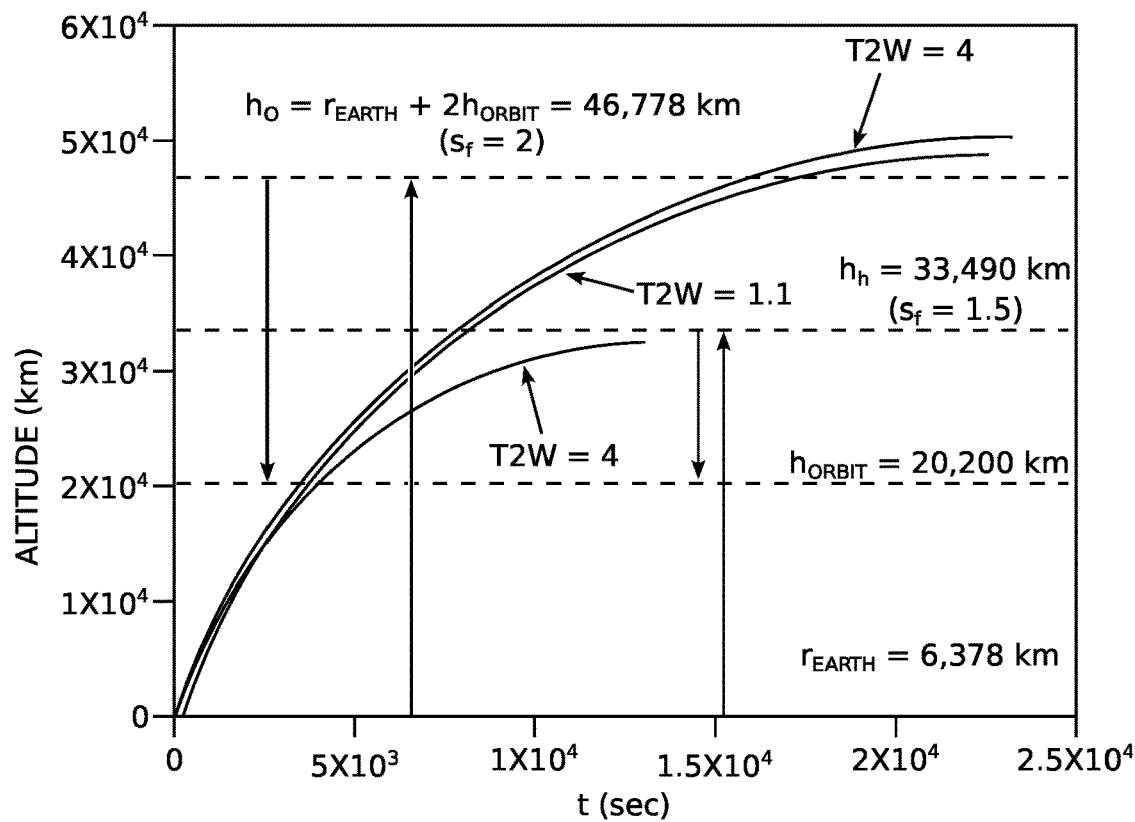
FIG. 13M depicts altitude as a function of time for rocket launching of 1,000 [kg] of payload to a circular orbital altitude of 20,200 [km] (GPS) with $s_f$=1.5 and 2 for T2W=1.1 and 4, k 0.01.
Figure 13N:
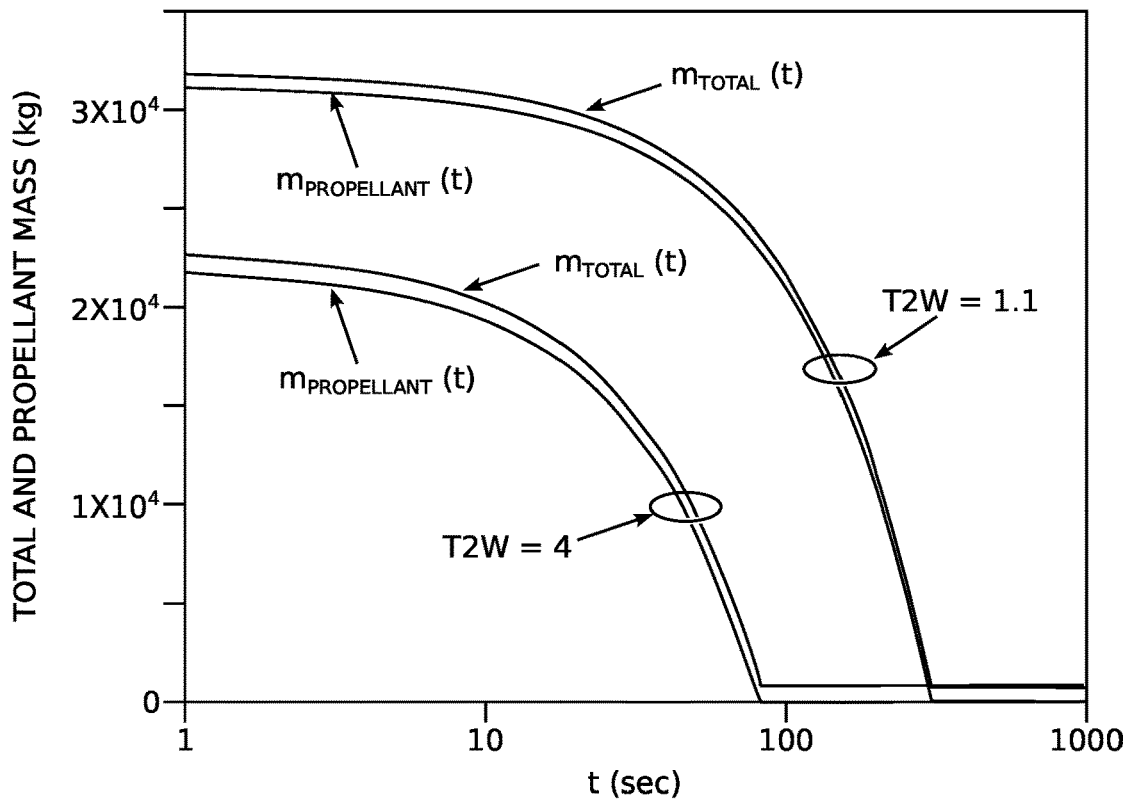
FIG. 13N depicts propellant and total mass as a function of time in logarithmic horizontal axes for launching 1,000 [kg] of payload to a circular orbital altitude of 20,200 [km](GPS) with $s_f$=2 for T2W=1.1 and 4, k=0.01.
Figure 13O:
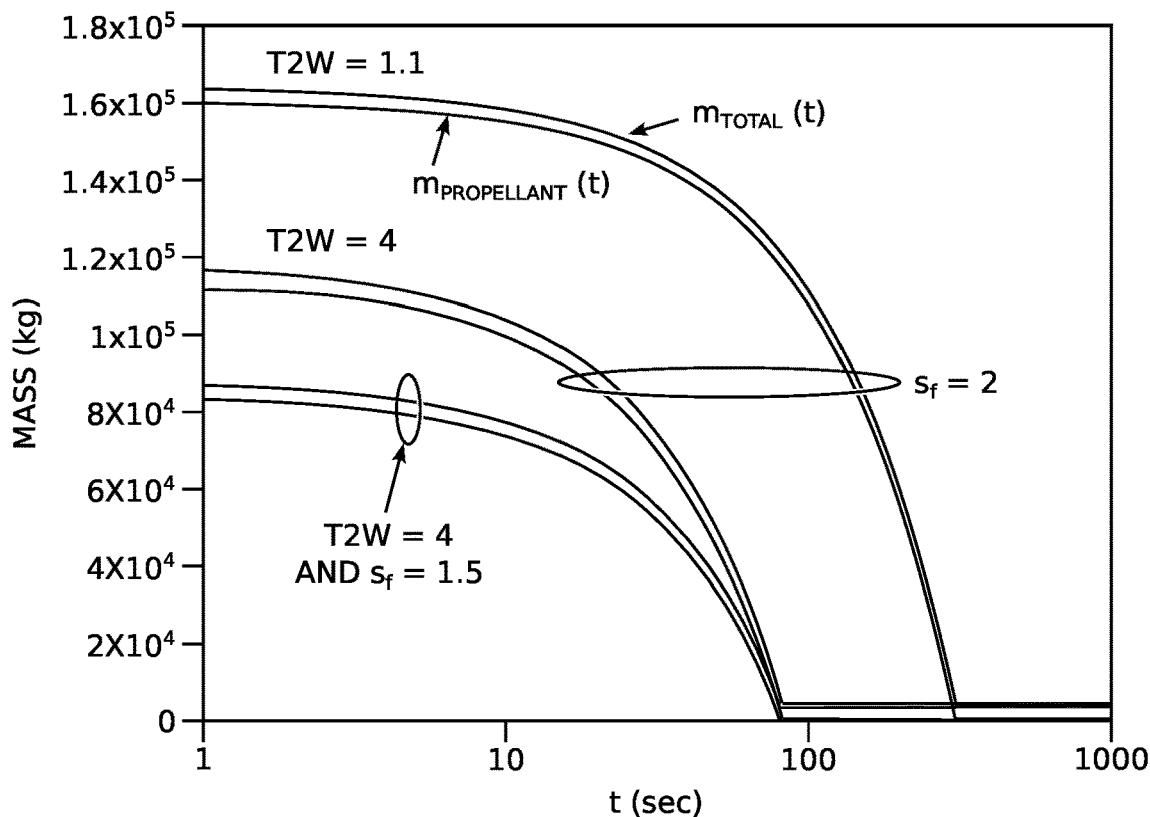
FIG. 13O depicts propellant and total mass as a function of time in logarithmic horizontal axes for launching 1,000 [kg] of payload to a circular orbital altitude of 20,200 [km](GPS) with $s_f$=1.5 and 2 for T2W=1.1 and 4, k=0.01.

Similar graphical demonstration is given for 20,200 [km] (GPS) orbital launch in FIG. 13M with the related mass versus time plots FIG. 13N and FIG. 13O.

At first it may seem counter intuitive and very unnecessary launch strategy of going up for 7,178 [km] to put a satellite to an orbit at 400 [km], as opposed to reaching 400 [km] of altitude directly with a curved trajectory which becomes tangential to the orbit with the velocity vector tangential to the orbital trajectory at the calculated orbital speed. So, it is a good practice to verify this claim by substituting $r_{ORBIT}$ in the total energy equation (3.4) for the orbital radius $r_{ORBIT}$ as, $$TE(r_{ORBIT}) = \frac{1}{2}mv^2 - G\frac{mM}{r_{ORBIT}} = 0 - \frac{1}{2}G\frac{mM}{r_{ORBIT}} \quad (3.12)$$

$$\frac{1}{2}mv^2 = \frac{1}{2}G\frac{mM}{r_{ORBIT}} \quad (3.13)$$

Giving the same orbital velocity derived and given in (2.6) as, $$v = v_{ORBIT} = \sqrt{\frac{GM}{r_{ORBIT}}} \quad (3.14)$$

This is not exactly a proof, because the formula was derived using the same energy conservation law. While the energy conservation law is well understood, this exercise shows that there is no arithmetic error in the calculations. The result is counter intuitive, and additional proof can be derived using a different approach, like Newton's equation of motion for a free-falling body in an inverse square law gravitational field to have additional confidence in the derivation.

a. Analytical Solution of Newton's Equation of Motion to Derive Velocity as Function of Radius of a Free-Falling Mass in an Inverse Square Law Gravitational Field Newton's equation of motion for a free-falling object from a radius of $r_0$ in an inverse square law gravitational field given as, $$F = -G\frac{Mm}{r^2} = m\frac{dv}{dt} \quad (3.15)$$

Where, $$v = \frac{dr}{dt} \quad (3.16)$$

Analytically and if, $$v(r_{ORBIT}) = \sqrt{\frac{GM}{r_{ORBIT}}} \text{ where } r_0 = 2 \cdot r_{ORBIT}, \quad (3.17)$$

then the proof is certain.

Where F, G, m, M, r, v and t are the gravitational force between mases m and M, the universal gravitational constant, mass of the object in motion being modeled with the inverse square gravitational field of object with a mass of M, which is assumed to be stationary due to its very large mass with respect to m, radius, which is the center-to-center distance between the two spherical objects with masses m and M, velocity, and time respectively. Since a space launch system from the Earth is the interest, M is the mass of the Earth and m is the mass of the satellite or the spacecraft.

Although the ordinary differential equation (3.13) is simple, its analytical solution is not very straightforward. Applying the Leibnitz's chain rule [22-26], which was shown to be an especially useful trick derived in [22] for the analytical solution of the non-linear Poisson's equation in the MOS (Metal-Oxide-Semiconductor), gives, $$\frac{dv}{dt} = \frac{dv}{dr}\frac{dr}{dt} \quad (3.18)$$

Substituting (3.16) in (3.18) gives, $$\frac{dv}{dt} = \frac{dv}{dr}v \quad (3.19)$$

Substituting (3.19) in (3.15) gives, $$-G\frac{mM}{r^2} = mv\frac{dv}{dr} \quad (3.20)$$

Simplifying (3.20) gives, $$-G\frac{M}{r^2} = v\frac{dv}{dr} \quad (3.21)$$

Rearranging (3.21) gives, $$GM\frac{dr}{r^2} = vdv \quad (3.22)$$

Equation (3.22) becomes a quite simple differential equation that can be solved either with definite integrals or by solving the integration constant with the boundary condition. The rocket equation derivation is done employing many definite integrals, just to add a different flavor to the work, the solving the integration constant gives the following equation, $$GM\frac{1}{r} = \frac{1}{2}v^2 + C \quad (3.23)$$

Where C is an arbitrary integration constant which needs to satisfy the initial conditions of the problem. Since at t=0 the radius is r=$r_0$ and the initial velocity is $v_0$, the integration constant C must satisfy the equation, $$GM\frac{1}{r_0} = \frac{1}{2}v_0^2 + C \quad (3.24)$$

Giving, $$C = GM\frac{1}{r_0} - \frac{1}{2}v_0^2 \quad (3.25)$$

Substituting (3.25) into (3.23) gives the complete solution as, $$GM\frac{1}{r} = \frac{1}{2}v^2 + GM\frac{1}{r_0} - \frac{1}{2}v_0^2 \quad (3.26)$$

Rearranging terms in (3.26) gives, $$v^2 = 2\left(GM\frac{1}{r} - GM\frac{1}{r_0} + \frac{1}{2}v_0^2\right) \quad (3.27)$$

Finally, the $v(r)$ relation that we are looking for becomes, $$v(r) = \sqrt{2\left(GM\frac{1}{r} - GM\frac{1}{r_0} + \frac{1}{2}v_0^2\right)} \quad (3.28)$$

Writing (3.28) in more compact form gives, $$v(r) = \sqrt{2GM\left(\frac{1}{r} - \frac{1}{r_0}\right) + v_0^2} \quad (3.29)$$

For a falling mass to the earth the bounds of r and $r_0$ can be given as, $$r_E \le r \le r_0 \text{ and } r_E \le r_0 \le \infty \quad (3.30)$$

For $v_0=0$ (3.29) gives, $$v(r) = \sqrt{2GM\left(\frac{1}{r} - \frac{1}{r_0}\right)} \quad (3.31)$$

$$r=r_0=2 \cdot r_{ORBIT} \quad (3.32)$$

(3.31) becomes, $$v(r_{ORBIT}) = \sqrt{2GM\left(\frac{1}{r_{ORBIT}} - \frac{1}{r_0}\right)} \quad (3.33)$$

Finally, the counter intuitive same answer that is being sought appears as, $$v(r_{ORBIT}) = \sqrt{\frac{GM}{r_{ORBIT}}} \quad (3.34)$$

To write the result in text, it can be said that if an object in an inverse square law gravitational field falls from any radius $r_0$ with respect to a larger mass M, with a zero initial velocity to half of its initial radius $r_0$ with respect to the larger mass M, the speed that it will gain is equal to the speed obtained when it is in a circular stable orbital rotational speed around the larger mass M at an orbital radius of $r_{ORBIT}$. In the process of proving the relation (3.15) beyond any doubt, a very general and handy $v(r)$ relation is also given as (3.27) which is also used later in this work. Since more confidence exists in the (3.7) it is also useful to know the fall times between the first and second radiuses. Analytical formulas are available [4, 5] and FIG. 3F depicts the fall times from (2·$r_{ORBIT}$ to $r_{ORBIT}$), (2·$r_{ORBIT}$ to $r_{EARTH}$) and ($r_{ORBIT}$ to $r_{EARTH}$) as a function of altitude up to 60,000 [km]. As can be seen, all of the fall times related to LEO satellites are very tightly spaced and difficult to distinguish from each other, which are shown on the left-hand side of FIG. 3F. Table 3A lists the calculated fall times from 2·$r_{ORBIT}$ to $r_{ORBIT}$ for the satellites listed in Table 2, with the corresponding numbering.

TABLE 3A

Calculated Fall times from 2 · $r_{ORBIT}$ to $r_{ORBIT}$ for the satellites listed in Table 2, with the corresponding numbering. As can be seen if the time to orbit is an issue, the method presented in this disclosure is not necessarily the best choice.

| Numbering in TABLE 2 | Orbital Altitude [km] | Launch Altitude $h_0$[km] | Fall Time from $h_0 \to h$[s] | Fall Time from $h_0 \to h$[hour] |
|---|---|---|---|---|
| 1 | 255 | 6,888 | 2,199 | 0.611 |
| 2 | 400 | 7,178 | 2,272 | 0.631 |
| 3 | 540 | 7,458 | 2,343 | 0.651 |
| 4 | 781 | 7,940 | 2,466 | 0.685 |
| 5 | 20,200 | 46,778 | 17,644 | 4,901 |
| 6 | 35,786 | 77,950 | 35,257 | 9,793 | a. Ideal Gas Law, Gas Density

The gas density calculations will be useful in Section 7 where some basic rocket fuel and oxidizer calculations are given. Modifying the well-known ideal gas law, $$PV = nRT \tag{3.35}$$

Or more conveniently written as, $$PVM_{mol} = mRT \tag{3.36}$$

Where P, V, n, R, T, m and M are pressure, volume, mol, ideal gas constant, temperature, mass of the gas, and molecular mass respectively. Dividing both sides of (3.34) with V gives the ideal gas law as, $$PM_{mol} = \frac{m}{V}RT = \rho RT \tag{3.37}$$

Where $\rho$ is the density of the gas which leads to the gas density formula, $$\rho = \frac{PM_{mol}}{RT} \tag{3.38}$$

Gases related to this work are $H_2$, $N_2$, $O_2$, $CO_2$, and He. Molecular masses M for these gases can be calculated based on their atomic masses giving approximately 2, 28, 32, 44, and 4 [gr/mol] respectively. The gas density relation as given in (3.38) and its function of altitude as shown in FIG. 1E gets into the numerical solution of the equation of motion for including the air drag during the rocket's travel in the atmosphere. Air drag force $F_D$ is expressed by the well-known relation, $$F_D = \frac{1}{2}\rho k_D S v^2 \tag{3.39}$$

Where $\rho$, $k_D$, S, and v are the air density, drag coefficient, surface area perpendicular to the air flow and air speed respectively.

If the satellite in orbit faces air drag, as formulated in (3.39), it will either burn out due to frictional heat generated or it will lose speed and energy and eventually spiral down to Earth and will crash to the Earth's surface. As can be seen in FIG. 1E density of air goes very close to zero after altitudes of 100 [km], which gives practically zero drag force, and the satellite can stay in orbit forever after reaching the orbital velocity with the right direction. This is the only reason of putting satellites into orbit higher than 100 [km], or in other words above the atmosphere. Sixty-seven years after the launch of the first satellite in 1957, still many news and social media news sources very incorrectly use "zero g", "no gravity", or "zero gravity" terminology at the satellite or space craft launch news. As can be seen in FIGS. 2A and 2B the gravitational pull of earth in all LEOs is not less than 0.75 of its value at sea level, not even close to "zero gravity" as often reported. Zero gravity is only possible at an infinite distance from a mass.

Rocket Thrust and Mass.

Rockets create thrust by ejecting parts of its mass with high velocity, which can be mathematically formulated using the conservation of momentum principle, and can be considered a straight-forward calculus exercise [1-3]. There are many scientists who need to be credited for this derivation going back to 1810 [3]. The first record of the derivation of the rocket equation is known to have been done by the British mathematician William Moore in his work "Theory on the motion of Rockets" and "Treatise on the Motion of Rockets and an assay on Naval Gunnery", which was published in 1813. The minister William Leitch, another British scientist also independently derived the fundamentals of rocketry in 1861. Robert Goddard in the USA also independently derived the rocket equation in 1912. Hermann Oberth in Germany derived the same equation studying the feasibility of space travel in 1920's.

The Russian scientist Konstantin Tsiolkovsky's (1857-1935) derivation of the rocket equation in 1897 is accepted as being the first to consider whether rockets could achieve the speeds necessary for space travel and therefore it is named as Tsiolkovsky Rocket Equation, which he called "formula of aviation". He is also the inventor of multi-stage rockets based on the very interesting mathematical properties of the rocket equation. He is also the inventor of the "space elevator" and many other things related to rocket science and is therefore accepted as being the father of rocket science. Hermann Julius Oberth (1894-1989) a German rocket scientist also derived the rocket equation while working in Peenemunde during Second World War for the V-2 ballistic rocket with his student Werner von Braun who ended up running the Apollo program at NASA.

Tsiolkovsky's Rocket Equation.

Several forms of derivation are possible [1-3]. The equation of motion for the rocket in vector notation can be written as, $$\vec{F}_{EXT} = m(t)\frac{d\vec{v}}{dt} + v_e \frac{d[m(t)]}{dt}\vec{u} \tag{5.1}$$

where $\vec{F}_{EXT}$, m(t), $\vec{v}$, $v_e$, and $\vec{u}$ are the sum of external forces, the mass of the rocket, which is a function of time, velocity of the rocket, exhaust gas velocity relative to the rocket, and the unit exhaust gas velocity vector with respect to the rocket, respectively. The time dependent mass of the rocket for constant fuel burn rate $b_r$ can be given as, $$m(t) = m_0 - b_r t \tag{5.2}$$

where $m_0$ and $b_r$ are the initial total mass of the rocket and fuel burn rate in [kg/s]. With no external forces and in scalar notation (5.1) can be written as, $$m(t)\frac{dv}{dt} = -v_e \frac{d[m(t)]}{dt} \tag{5.3}$$

where $v_e$ is the effective exhaust velocity in [m/s], which has a range of 2,500-4,500 [m/s] based on the propellant used, the rocket engine design, its convergent-divergent nozzle geometry, and injection-mix efficiency of the propellant into the thrust chamber for liquid propellants. The range of these some values of $v_e$ for some popular rockets are presented in Table 4A.

TABLE 4A

List of exhaust velocity and propellant types of some well-known rockets at lift-off.
RP-1 is a rocket fuel based on kerosene and LOX is Liquid OXygen.

| Rocket Engine Country of Origin | Launch Vehicle | Fuel Oxidizer | $V_E$[m/s] Specific Impulse[s] | Thrust [kN] | Mass Flow Rate [kg/s] | Thrust to weight (T2W) Dry weight |
|---|---|---|---|---|---|---|
| V-2 Rocket Engine NAZI Germany | A-4 (V-2) | (75% Alcohol 25% water) LOX | 1,989 m/s 203 s | 245 | 133 kg/s | |
| Aerojet LR-87-AJ-1 (2 Nozzle) USA | TITAN II GLV (Gemini Launch Veichle) | Hypergolic Propellant (Oxidizer ignites at contact) Hydrezeine (Aerozine-50) and $N_2O_4$ | 2,528 m/s 258 s | 1,900 | | |
| Rocketdyne F-1 USA | Saturn V First Stage (5 F-1's giving total thrust of 35,000 [kN]) | RP-1 LOX | 2,580 m/s 263 s | 7,740 | 2,577 kg/s | 94 8,400 kg |
| Energomash RD-170 (4 nozzle) Russia | Energia | RP-1 LOX | 3,030 m/s 309 s | 7,250 | | 82 9,750 kg |
| Enorgamash RD-180 (2 nozzle) Russia | Atlas V | RP-1 LOX | 3,050 m/s 311 s | 3,830 | 1,250 kg/s | 78.44 5,480 kg |
| Rocketdyne RS-25 USA | Space Shuttle (3X RS-25) | Liquid Hydrogen LOX | 4,460 m/s 455 s | 5,250 | | |
| Thiokol/Pratt-Withney SRB USA | Space Shuttle 2 Solid Rocket Boosters | Solid Fuel PBNA-APCP | 2,370 m/s 242 s | 2 × 6,500 | 250 Ton Propellant Tb = 127 s | 45 Tons Empty Diameter 3.71 m Height 45.46 m |
| Blue Horizon BE-4 USA | ULA Vulcan Centaur | CH4 LOX | 3,087 m/s 315 s | | | |
| Vulcain 2 European Space Agency | Ariene-5 First Stage | Liquid Hydrogen LOX | | 1,390 | | |
| P241 European Space Agency | Ariene-5 First Stage 2 Solid Rocket Boosters | Solid Fuel AP Aluminum HTBP | | 2 × 7,080 | 273 Ton Gross Tb = 140 s | 33 Tons Empty Diameter 3.06 m Height 31.6 m |
| SpaceX Merlin USA | SpaceX Falcon | RP-1 LOX | 2,770 m/s 311 s | 854 kN | | 184 470 kg |
| SpaceX Raptor USA | SpaceX Starship Heavy 33X Raptors 72MN | $CH_4$ LOX | 3,400 m/s 311 s | 2,210 kN | 650 kg/s | 200 1,500 kg |

Multiplying both sides of (5.3) with dt gives, $$m(t)d\mathcal{V} = -\mathcal{V}_e d[M(t)] \quad (5.4)$$

On the other hand, differentiating (5.2) the generated thrust, $F_T$ in scalar form in [Newtons] becomes, $$F_T = -\mathcal{V}_e b_r \quad (5.5)$$

The negative sign indicates that the generated thrust is in the opposite direction of the exhaust gas flow relative to the rocket. Multiplying both sides of (5.4) with dt eliminates the time dependency and gives the very simple differential equation where its analytical solution is trivial as, $$dv = -v_e \frac{dm}{m} \quad (5.6)$$

Integration of both sides of (5.6) using the proper limits gives, $$\int_{v_0}^{v_f} dv = -v_e \int_{m_0}^{m_f} \frac{dm}{m} \quad (5.7)$$

where $m_0$, $m_f$, $\mathcal{V}_0$, and $\mathcal{V}_f$ are the initial and final total mass of the rocket in [kg], and initial and final velocity of the rocket, respectively in [m/s]. Finally, the solution of (5.7) leads rocket equation to its most common form as, $$\Delta v = v_e \ln\left(\frac{m_0}{m_f}\right) = I_{SP} g_0 \ln\left(\frac{m_0}{m_f}\right) \quad (5.8)$$

where, $$\Delta \mathcal{V} = \mathcal{V}_f - \mathcal{V}_0 \quad (5.9)$$

where $\Delta v$, $I_{SP}$, and $g_0$ are the difference in velocity, specific impulse in seconds [s], and standard gravity in [m/s$^2$] respectively. Since in a rocket $m_0 \gg m_f$, $\Delta v$ is always larger than the mass ejection velocity or exhaust gas exit velocity from the rocket engine nozzle, which is in the range of 2,500-4,500 [m/s] as can be seen in Table 4A. As can be seen relations (5.9) and (5.11) enable the rocket to achieve very large orbital velocities or even escape velocity, which is 11,000 [m/s] on Earth's surface, and theoretically propel the rocket to an infinite distance away from the Earth ignoring other gravitational effects present.

For constant fuel burn rate $b_r$ the fuel burn time $T_B$ relates the final mass $m_f$ to the burn rate $b_r$ as, $$m_f = m_0 - m_{prop} = m_0 - b_r T_B \quad (5.10)$$

where $m_{prop}$ is the mass of the (fuel+oxidizer), which is consumed until the end of fuel burn time $T_B$. One of the most important and useful applications of the rocket equation is in relating the initial and final mass of the rocket as a function of desired speed difference $\Delta v$. Taking the first part of (5.8), it can be written as, $$\Delta v = v_e \ln\left(\frac{m_0}{m_f}\right) \quad (5.11)$$

Dividing both sides with $v_e$ gives, $$\frac{\Delta v}{v_e} = \ln\left(\frac{m_0}{m_f}\right) \quad (5.12)$$

(5.12) can also be written as, $$e^{\frac{\Delta v}{v_e}} = \frac{m_0}{m_f} \quad (5.13)$$

Solving $m_f$ from (5.13) gives, $$m_f = m_0 e^{-\frac{\Delta v}{v_e}} \quad (5.14)$$

Substituting the first part of (5.10), $$m_f = m_0 - m_{prop} \quad (5.15)$$

Into (5.14) gives, $$m_0 e^{-\frac{\Delta v}{v_e}} = m_0 - m_{prop} \quad (5.16)$$

Solving $m_{prop}$ from (5.16) gives, $$m_{prop} = m_0\left(1 - e^{-\frac{\Delta v}{v_e}}\right) \quad (5.17)$$

The equation (5.17) is very useful because by entering 2 numbers into it, it is possible to calculate $m_{prop}$, the fuel needed as a percentage of the initial mass $m_0$ to gain a given speed and rocket exhaust velocity for the case of no external forces.

5.1 Derivation of Tsiolkovsky's Rocket Equation for Constant Gravitational Acceleration.

For a rocket moving straight up vertically against Earth's gravitational force the most important force to consider is the Earth's gravitational force. The resulting gravitational acceleration g acting upon is formulated as [4-5, 15, 18-21], $$g = G\frac{m_{EARTH}}{r^2} \text{ where } r = r_{EARTH} + h \quad (5.18)$$

where r, G, $m_{EARTH}$, h, $r_{EARTH}$ are object distance to the center of the Earth, Newton's constant of gravitation, mass of the Earth, and altitude measured from the surface of the Earth. Following are the numerical values in (5.18) as, $G = 6.674 \times 10^{11} [m^3 \cdot kg^{-1}]$ or $[N \cdot m^2 \cdot kg^{-2}]$ Mass of Earth $m_{EARTH} = 5.972 \times 10^{24} [kg]$ The Earth's Polar and Equatorial radiuses are slightly different and are, $r_{Epolar} = 6,357 [km]$ and $r_{EEqutorial} = 6,378 [km]$.

As shown in FIGS. 2A, 2B, and 2C, for all practical purposes the gravitational acceleration g for the range of altitudes involved in this analysis can be assumed constant with a numerical value of 9.81 [m/s$^2$] at sea level. Since rocket propulsion can deliver the very high velocities required to put a satellite into orbit, it became the only practical means of doing so. In this mode the Earth's gravitational acceleration g must be included in the rocket equation [1-3].

For this case the rocket equation of motion becomes, $$\vec{F}_{EXT} = m\frac{d\vec{v}}{dt} - v_e\frac{dm}{dt}\vec{u} \quad (5.19)$$

The second term on the right-hand side is the thrust generated in vector form where $\vec{u}$ is the unit vector in the direction of the flight path relative to the rocket, which is opposite to the rocket velocity vector $\vec{v}$. Rearranging (5.19) gives, $$m\frac{d\vec{v}}{dt} = \vec{F}_{EXT} - v_e\frac{dm}{dt}\vec{u} \quad (5.20)$$

The constant force $\vec{F}_{EXT}$ generated by a constant acceleration g opposing the direction of the thrust can be introduced into (5.20), and ignoring air drag gives the one-dimensional scalar rocket equation of motion as, $$m\frac{dv}{dt} = -mg - v_e\frac{dm}{dt} \quad (5.21)$$

Multiplying both sides of (5.21) with dt as done before gives, $$mdv = -mgdt - v_e dm \quad (5.22)$$

Dividing both sides of (5.22) by m gives, $$dv = -gdt - v_e\frac{dm}{m} \quad (5.23)$$

(5.23) can be analytically integrated as, $$\int_{v_0}^{v_f} dv = -\int_{t_0}^{t_f} g\,dt - v_e \int_{m_0}^{m_f} \frac{dm}{m} \quad (5.24)$$

Giving, $$v_f - v_0 = g(t_f - t_0) - v_e[\ln(m_f) - \ln(m_0)] \quad (5.25)$$

On the other hand, $(t_f-t_0)$ in (5.25) is the burn time $T_B$ for constant burn rate $b_r$ calculated as, $$T_B = (t_f - t_0) = \frac{m_{prop}}{b_r} \quad (5.26)$$

Arranging (5.25) and substituting (5.26) in it gives, $$v_f = v_0 + v_e \ln\left(\frac{m_0}{m_f}\right) - g\frac{m_{prop}}{b_r} \quad (5.27)$$

Equation (5.27) is the corresponding equation (5.11) for the case of no external forces. In this work the rocket in the launch stage moves in the opposite direction of gravitational force, but during the descent or capture stage the rocket moves in the same direction as gravitational force. If the gravitational acceleration is in the direction of the thrust, the sign of the last term in (5.27) changes to a positive sign (+). Covering both cases (5.27) can be written as, $$\Delta v = v_f - v_0 = v_e \ln\left(\frac{m_0}{m_f}\right) \mp g\frac{m_{prop}}{b_r} \quad (5.28)$$

where the + sign corresponds to gravitational acceleration if it is in the same direction as thrust, the case where it is used in the descent stage of the system described herein. The velocity difference $\Delta v(+g)$, which is defined as the rocket velocities going opposite and in the same direction of gravitational acceleration, has the same mass parameters, $$\Delta v(\mp g) = 2 \cdot g\frac{m_{prop}}{b_r} = 2gT_B \quad (5.29)$$

Equation (5.29) shows that the same velocity can be gained with a significantly smaller mass of propellant. Rocket assisted descent is important and requires a more detailed analysis as is given in Section 5.2. Coming back to lift-off case, since the rocket should be able to lift-off the ground with full initial mass $m_0$, the thrust $F_T$ must satisfy, $$m_0 = \frac{F_T}{T2W \cdot g} = \frac{v_e b_r}{T2W \cdot g} \text{ where } T2W > 1 \quad (5.30)$$

The parameter T2W is the thrust-to-weight ratio of the rocket at the launch pad, which must be greater than 1 for a successful launch. Due to safety of the launch the typically T2W at the launch is set to a number greater than 1.5.

Relation (5.27) and its more general form (5.28) can be represented better by introducing a parameter $\mu(t)$ as, $$\mu(t) = \frac{m(t)}{m_0} \text{ where } 0 < \mu \le 1 \quad (5.31)$$

The minimum value of $\mu(t)$ is reached when all the propellant is consumed. Since there is always a payload involved with any launch $m_f > 0$, the final value of $\mu_f$ is greater than zero as given in (5.31). The inverse of $\mu(t)$ can be written as, $$\frac{1}{\mu_f} = \frac{m_0}{m_f} = \frac{m_0}{m_0 - m_{prop}} \quad (5.32)$$

Since, $$m_{prop} = m_0 - m_f \quad (5.33)$$

Time dependency of $\mu(t)$ in terms of burn rate can be written explicitly as, $$\mu(t) = \frac{m(t)}{m_0} = \frac{m_0 - b_r t}{m_0} \quad (5.34)$$

Substituting $t=0$ and $t=T_B$ in (5.34), the upper (final) and lower (initial) limits of $\mu_f$ in powered flight can be written as, $$\mu(0) = \mu_0 = 1 \text{ and } \mu(T_B) = \mu_f = \frac{m_0 - m_{prop}}{m_0} \quad (5.35)$$

Some arithmetic performed on the second part of (5.27) and (5.28) gives, $$g\frac{m_{prop}}{b_r} = g\frac{m_0 - m_f}{b_r} = g\frac{m_0\left(1 - \frac{m_f}{m_0}\right)}{b_r} \quad (5.36)$$

Multiplying dominator and the denominator of (5.36) with $v_E$ and T2W gives, $$\frac{(v_E T2W)gm_0\left(1 - \frac{m_f}{m_0}\right)}{(v_E T2W)b_r} = \frac{v_E(gm_0 T2W)(1 - \mu)}{(v_E b_r)T2W} \quad (5.37)$$

On the other hand, writing thrust in terms of thrust-to-weight ratio T2W gives, $$F_T = gm_0 T2W = v_E b_r \quad (5.38)$$

Substituting (5.38) in (5.37) gives, $$\frac{v_E gm_0 T2W(1 - \mu_f)}{v_E b_r T2W} = \frac{v_E F_T(1 - \mu_f)}{F_T \cdot T2W} = \frac{v_E(1 - \mu_f)}{T2W} \quad (5.39)$$

The equation (5.29) which gives the velocity of the rocket accelerating in the opposite direction of the uniform gravitational acceleration g after burning all its propellant $m_{prop}$ becomes expressed in a very compact form with very simple rocket related variables pf and T2W as, $$\Delta v(\mu_f, T2W) = v_B = v_E \left[ \ln\left(\frac{1}{\mu_f}\right) - \frac{(1-\mu_f)}{T2W} \right] \quad (5.40)$$

Since the initial velocity of the rocket when it is standing on the launch pad is zero, using $v_B$, where the subscript "B" representing "Burnt", instead of $\Delta v(\mu_f, T2W)$, is a more meaningful and more convenient in the following math. Close examination of (5.40) gives, for $\mu_f \rightarrow 0$ $v_B(0) \rightarrow \infty$ \quad (5.41)

This result is clearly non-physical and needs correction which is explained in Section 6 below. And, for $\mu_f = 1$ $v_B(1) = 0$ \quad (5.42)

Figure 4A:
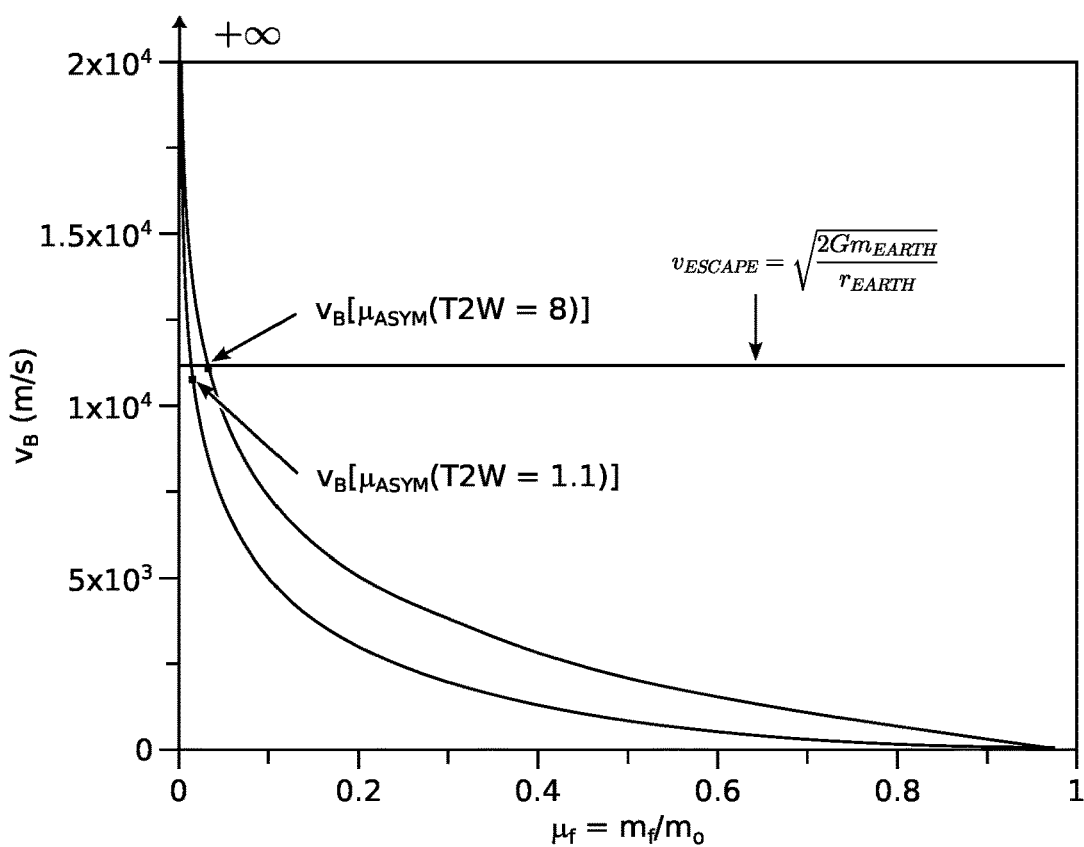
FIG. 4A depicts $v_B(\mu_f, T2W)$ for thrust-to-weight ratio T2W=1.1 and 8 with a constant acceleration g

FIG. 4A depicts $v_B(\mu_f, T2W)$ for thrust-to-weight ratio T2W=1.1 and 8 with a constant acceleration g. The asymptote at which makes $v_B \rightarrow \infty$ at $\mu_f = 0$ is marked with dotted vertical line is clearly shown. One of the early questions to be explored in rocketry was to determine if rocket propulsion could generate velocities sufficient to put an object into orbit, or sufficient to create an escape velocity $v_{ESCAPE}$ from the Earth. To illustrate, escape velocity $v_{ESCAPE}$ is superimposed on the $v_B(\mu_f, T2W)$ curves. As can be seen, for $\mu_f$ values very close to zero, $v_B(\mu_f, T2W) \geq v_{ESCAPE}$, where the rocket escapes the Earth's gravitational pull and reaches an infinite altitude h→+∞. The linear scale of $\mu_f$ in FIG. 4A does not clearly show how close the $\mu_f$ value must become for $v_B(\mu_f, T2W) \geq v_{ESCAPE}$ or for any hypersonic velocities to put a satellite into a desired orbit as shown in FIGS. 1A and 1B. This could be achieved by presenting the same data in FIG. 4A where the horizontal axis is drawn in logarithmic scale.

Figure 4B:
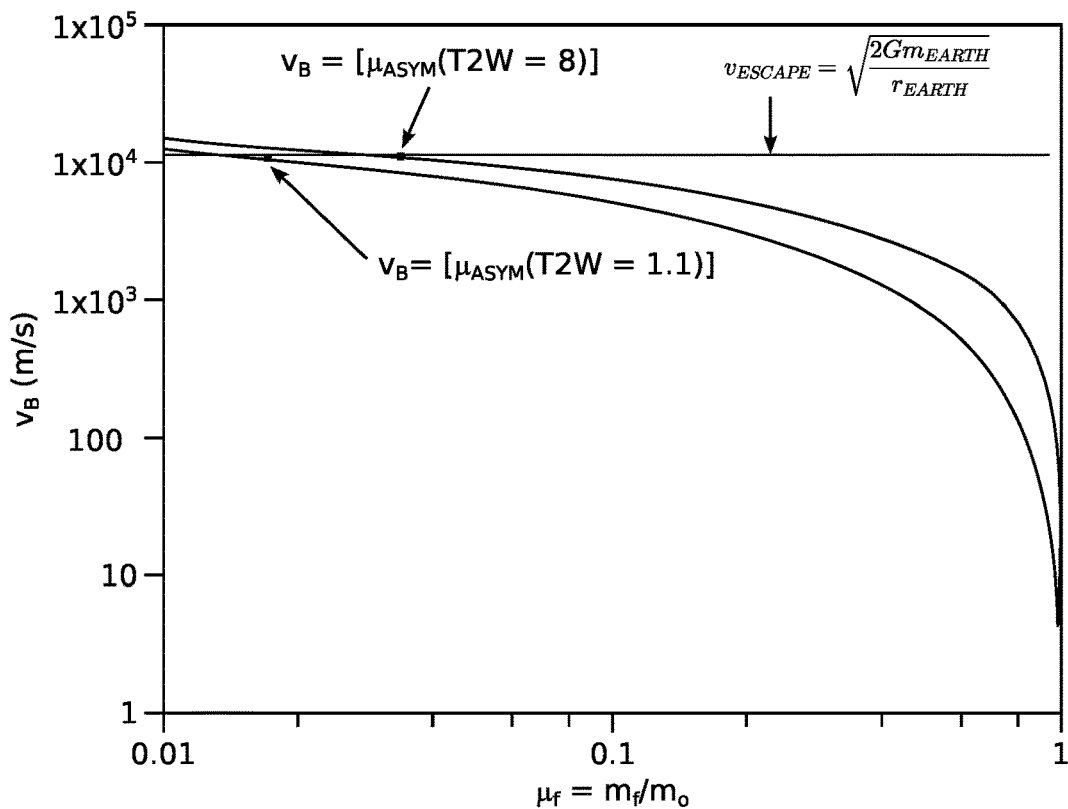
FIG. 4B depicts $v_B(\mu_f, T2W)$ for thrust-to-weight ratio T2W=1.1 and 8 at a constant acceleration g, where the horizontal axis is in logarithmic scale.

FIG. 4B depicts $v_B(\mu_f, T2W)$ for thrust-to-weight ratio T2W=1.1 and 8 with a constant acceleration g, where the horizontal axis is in logarithmic scale. The required $\mu_f$ values for achieving $v_B(\mu_f, T2W) \geq v_{ESCAPE}$ or for any hypersonic velocities needed to put a satellite into a desired orbit have to be below 0.1, meaning that majority of the rocket mass has to be propellant.

Writing everything in scalar form for simplicity, if z represents the distance traveled up, or in the opposite direction of the gravitational acceleration, the velocity along the same direction becomes the derivative of Z traveled expressed as, $$v_B = \frac{dz}{dt} \quad (5.43)$$

Integrating (5.43) as, $$\int_{z=0}^{z=h_B} dz = v_E \int_{t=0}^{t=T_B} \left[ \ln\left(\frac{1}{\mu}\right) - \frac{(1-\mu)}{T2W} \right] dt \quad (5.44)$$

The integral (5.44) can be evaluated with a variable transformation applying Leibnitz's chain rule [20-24] given as, $$v_B = \frac{dz}{dt} = \frac{dz}{d\mu} \frac{d\mu}{dt} = -\frac{b_r}{m_0} \frac{dz}{d\mu} \quad (5.45)$$

Differentiating (5.34) with respect to t gives, $$\frac{d\mu}{dt} = -\frac{m_0}{b_r} \quad (5.46)$$

Substituting (5.46) in (5.45) becomes, $$dz = -\frac{m_0}{b_r} v(\mu) d\mu \quad (5.47)$$

Giving the integral with the help of the lower and upper limits of $\mu$ given in (5.35), $$\int_{z=0}^{z=h_B} dz = -\frac{m_0}{b_r} v_E \int_{\mu=\mu_0}^{\mu=\mu_f} \left[ \ln\left(\frac{1}{\mu}\right) - \frac{(1-\mu)}{T2W} \right] d\mu \quad (5.48)$$

The upper limit $h_B$ in the integral on the left-hand side of the integral equation (5.48) is the altitude that the rocket reaches after ejecting all its propellant, or at $t=T_B$.

To integrate the first term in the right hand-side of the integral equation (5.48), $$\int_{\mu=\mu_0=1}^{\mu=\mu_f} \ln\left(\frac{1}{\mu}\right) d\mu \quad (5.49)$$

With the variable transformation, $$x = \frac{1}{\mu} \text{ giving } d\mu = -\frac{1}{x^2} dx \quad (5.50)$$

resulting in the integral which has an open form integral expression [22-24] as, $$\int \ln\left(\frac{1}{\mu}\right) d\mu = -\int \frac{\ln(x)}{x^2} dx = \frac{\ln(\mu)}{\mu} + \frac{1}{\mu} \quad (5.51)$$

Substituting $\mu_f$ in $\mu$ (5.51) for calculating the integral value at the upper integration limit $I_2$ of (5.49) becomes, $$I_2 = \mu_f \ln\left(\frac{1}{\mu_f}\right) + \mu_f \quad (5.52)$$

Substituting the lower integration limit $\mu_0=1$ in (5.51) for calculating the integral value at the lower limit $I_1$ of (5.49) gives, $$I_1 = \mu_0 \ln\left(\frac{1}{\mu_0}\right) + \mu_0 = 1 \cdot \ln\left(\frac{1}{1}\right) + 1 = 1 \quad (5.53)$$

The resulting integral value $I_2 - I_1$ of the first part in (5.49) becomes, $$\int_{\mu=1}^{\mu=\mu_f} \ln\left(\frac{1}{\mu}\right) d\mu = \mu_f \ln\left(\frac{1}{\mu_f}\right) + \mu_f - 1 \quad (5.54)$$

Integration of the second term in right hand-side of (5.48) is straightforward giving [22-24], $$\int \frac{(1-\mu)}{T2W} d\mu = -\frac{1}{2}\frac{(1-\mu)^2}{T2W} \tag{5.55}$$

Applying the integration limits at (5.48) to (5.55) gives $$-\int_{\mu=1}^{\mu=\mu_f} \frac{(1-\mu)}{T2W} d\mu = \frac{1}{2}\frac{(1-\mu_f)^2}{T2W} \tag{5.56}$$

Substituting (5.56) in (5.48) the integral (5.48) finally becomes, $$h_B = v_E \frac{m_0}{b_r}\left[1 - \mu_f \ln\left(\frac{1}{\mu_f}\right) - \mu_f - \frac{1}{2}\frac{(1-\mu_f)^2}{T2W}\right] \tag{5.57}$$

The multiplier in front of (5.57) can be simplified further by multiplying denominator and the dominator with $(g \cdot v_E)$ giving, $$\frac{v_E m_0(v_E g)}{b_r(v_E g)} = \frac{v_E^2 m_0 g}{F_T g} = \frac{v_E^2}{g \cdot T2W} \tag{5.58}$$

Giving the height $h_B$ that the rocket reaches in powered flight at the time of $T_B$, in other words when it runs out of propellant, with a vertical velocity in opposing direction of constant acceleration g as, $$h_B(\mu_f, T2W) = \frac{v_E^2}{g \cdot T2W}\left[1 - \mu_f \ln\left(\frac{1}{\mu_f}\right) - \mu_f - \frac{1}{2}\frac{(1-\mu_f)^2}{T2W}\right] \tag{5.59}$$

At that point the rocket has a velocity $v_B$ as given in (5.40) and it keeps gaining altitude. In other words, it coasts until it reaches its final altitude h also known as "apogee" in the rocket literature where its velocity becomes zero.

The limits of $h_B(\mu_f, T2W)$ at $\mu_f=0$ and $\mu_f=1$ are worth mentioning giving, $$\text{for } \mu_f \to 0 \ h_B(0, T2W) \to \frac{v_E^2}{g \cdot T2W}\left(1 - \frac{1}{2T2W}\right) \tag{5.60}$$

$$\text{for } \mu_f \to 1 h_B(1,T2W)=0 \tag{5.61}$$

Figure 5A:
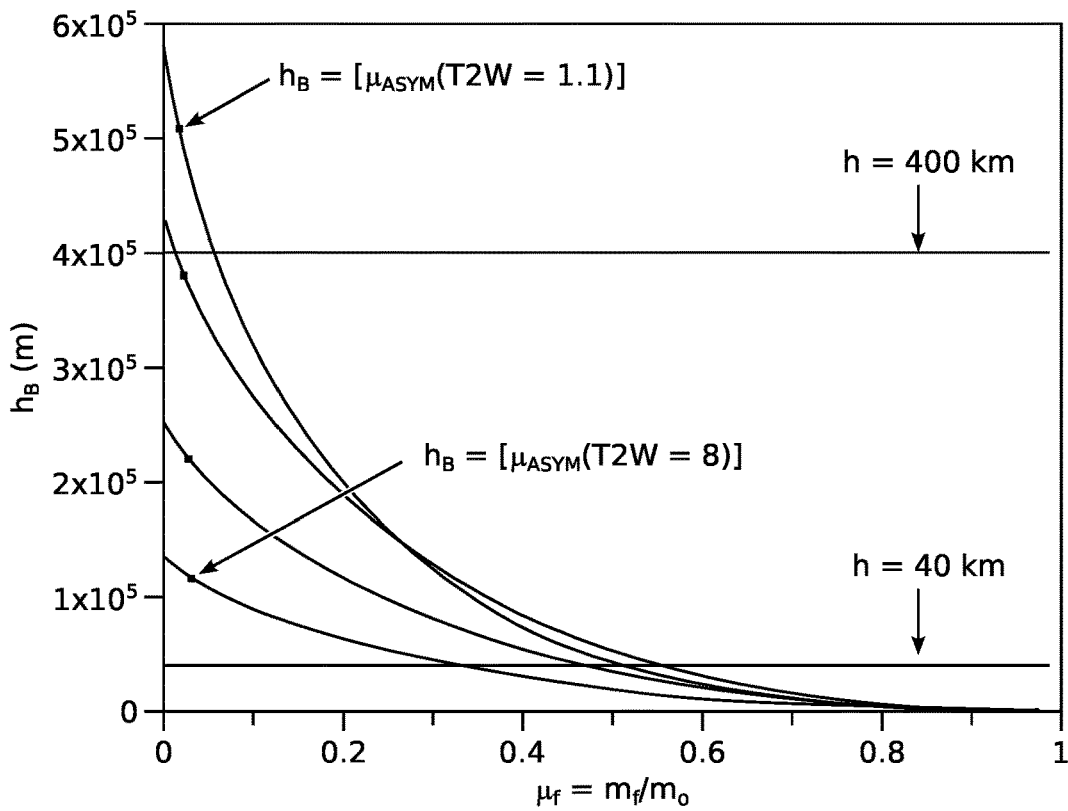
FIG. 5A depicts $h_B(\mu_f, T2W)$ for thrust-to-weight ratio T2W=1.1, 2, 4, and 8 with a constant acceleration g.

FIG. 5A depicts $h_B(\mu_f, T2W)$ for thrust-to-weight ratio T2W=1.1, 2, 4, and 8 with a constant acceleration g.

Figure 5B:
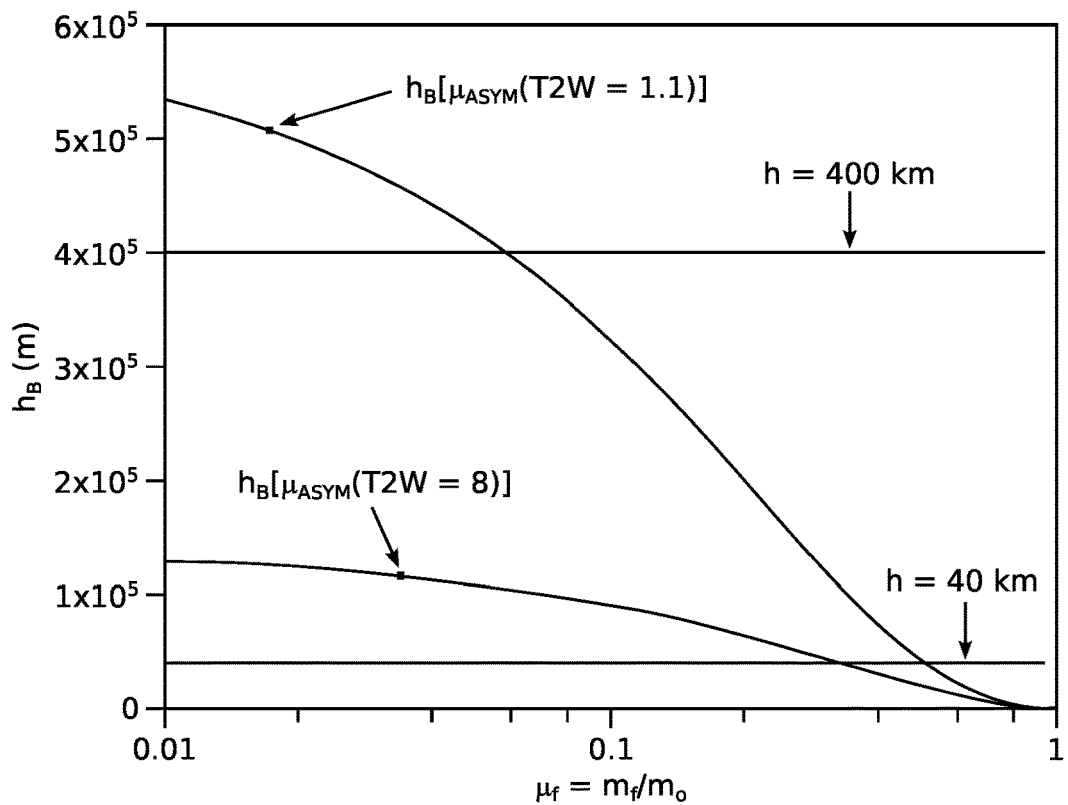
FIG. 5B depicts $h_B(\mu_f, T2W)$ for thrust-to-weight ratio T2W=1.1 and 8 with a constant acceleration g, where the horizontal axis is in logarithmic scale.

FIG. 5B depicts $h_B(\mu_f, T2W)$ for thrust-to-weight ratio T2W=1.1 and 8 where the horizontal axis is in logarithmic scale.

What is interesting to observe is that $h_B(0, T2W)$, as given in (5.60) and shown in FIGS. 5A and 5B, has a finite value that is less than 600 [km] for any practical thrust to weight ratio of T2W. As shown in FIGS. 2A, 2B, and 2C, the g(h) variation for altitudes of 600 [km], which can be considered to be the maximum burn height $h_{BMAX}$, is negligible, meaning that the constant acceleration g assumption for any condition is an excellent approximation, at least for the burn stage of any rocket launched from Earth. FIG. 2C depicts the gravitational acceleration normalized to its sea level value as a function of altitude g(h) with the maximum burn altitude $h_B(\mu_f=0)$ for T2W=1.1, 2, 4 and 8 marked on the curve, which graphically displays this important fact for a wide range of T2W values. As can be seen at the highest burn altitude the normalized gravitational acceleration does not go below 0.85 meaning that constant acceleration g assumption is a good approximation for any rocket launched from the Earth for its $h_B(0, T2W)$ calculation. This property is used for the derivation of the inverse square law gravitational case in as described in Section 6.

The horizontal lines superimposed on FIGS. 5A and 5B show $h_{GIVEN}=40$ and 400 [km]. Their intersection points with the $h_B(\mu_f, T2W)$ curves give the corresponding pf values which is the graphical solution to the non-linear problem given as the equation $h_B$ If, T2W$)-h_{GIVEN}=0$. FIG. 5A shows that for $h_B(\mu_f, T2W)=40$ [km], $\mu_f$ should be roughly in the interval of $0.3 \leq \mu_f \leq 0.6$ for all the ranges of T2W, which demonstrates the graphical solution method to this non-linear problem related to rocket design altitude. FIG. 5A does clearly show the intersection points of $h_B(\mu_f, T2W)$ curves and $h_{GIVEN}=400$ [km], but FIG. 5B, having a logarithmic horizontal axis, gives roughly $\mu_f=0.06$, illustrating some of the difficulties in reaching higher altitudes.

The final altitude h can be solved by applying the energy conservation law [21] as, $$KE(h_B)+PE(h_B)=KE(h)+PE(h) \tag{5.62}$$

Where $KE(h_B)$ and $PE(h_B)$ are the kinetic and potential energies at the altitude $h_B$, where the velocity of the rocket is the known value of $v_B$. Similarly, KE (h) and PE(h) are the kinetic and potential energies at the final altitude h, where the rocket velocity $v_h^2$ is zero, giving zero kinetic energy at apogee, which can be written explicitly as, $$\frac{1}{2}m_f v_B^2 + m_f g h_B = \frac{1}{2}m_f v_h^2 + m_f g h \tag{5.63}$$

Solving h from (5.59) for $v_h^2=0$ gives, $$h(\mu_f, T2W) = \left[\frac{v_B^2(\mu_f, T2W)}{2g} + h_B(\mu_f, T2W)\right] \tag{5.64}$$

Figure 6A:
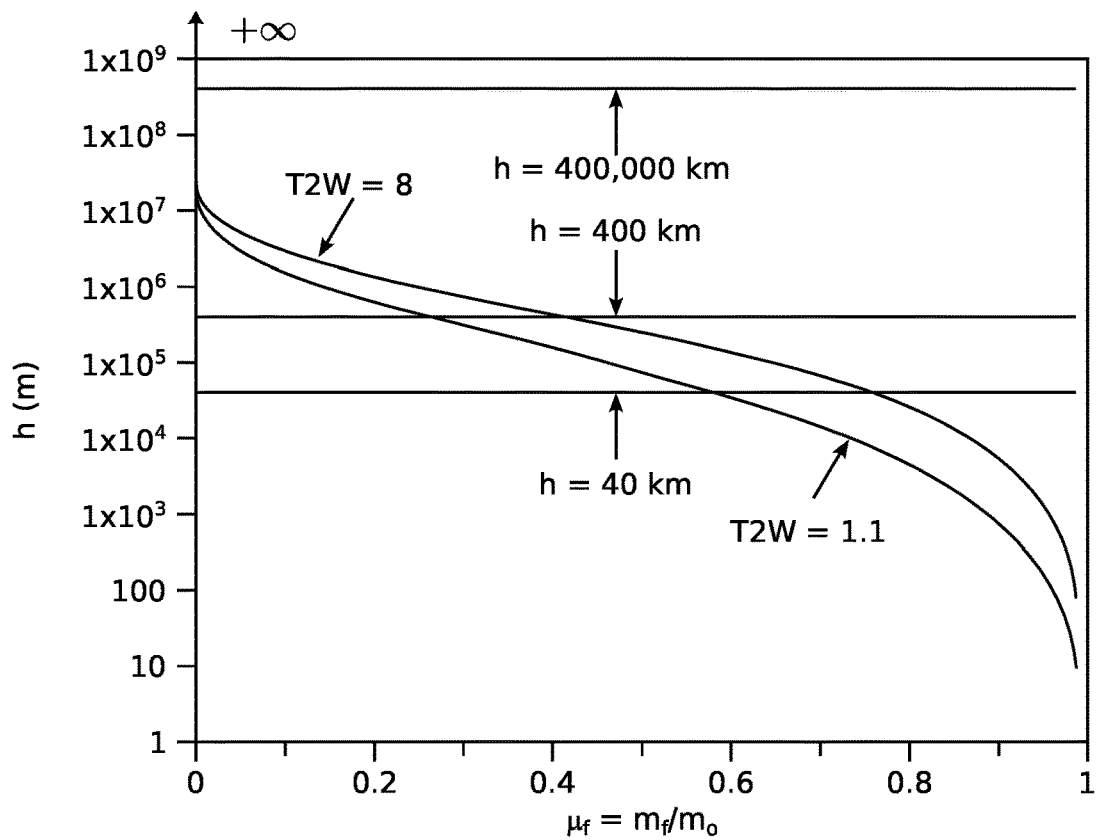
FIG. 6A depicts the climb altitude $h(\mu_f, T2W)$ for the constant gravitational acceleration of g=9.8 [m/s²] with thrust-to-weight ratio T2W=1.1 and 8 where the vertical axis is in logarithmic scale.

FIG. 6A depicts the climb altitude $h(\mu_f, T2W$ for the constant gravitational acceleration of g=9.8 [m/s²] with thrust-to-weight ratio T2W=1.1 and 8 where the vertical axis is in logarithmic scale. Since the $v_B(\mu_f, T2W)$ term in (5.64) becomes+∞ for $\mu_f=0$, $h(\mu_f, T2W)$ also becomes+∞, as shown with an asymptote (dotted vertical line) in FIG. 6A at $\mu_f=0$.

The horizontal lines superimposed on $h_{GIVEN}=40$, 400, and 400,000 [km], and their intersection points with the $h(\mu_f, T2W)$ curves give the corresponding if values that is the graphical solution to the non-linear problem $h(\mu_f, T2W)-h_{GIVEN}=0$. FIG. 6A shows that for $h(\mu_f, T2W)=40$ [km], $\mu_f$ should be roughly in the interval of $0.6 \leq \gamma_f \leq 0.75$ for all the ranges of T2W, which is an easily achievable task. This demonstrates the graphical solution method of solving this non-linear problem for rocket design altitude. FIG. 6A also clearly shows that the intersection points of the $h(\mu_f, T2W)$ curves and $h_{GIVEN}=400$ [km] are roughly in the interval of $0.275 \leq \mu_f \leq 0.45$. FIG. 6A shows the difficulty in reaching extreme altitudes of 400,000 [km] which is the approximate distance to the Moon, requiring very small $\mu_f$ values. FIG.

6A graphically demonstrates that reaching LEO orbital heights is only achievable with multi-stage rockets.

The first term in the brackets of (5.64) is the distance that the rocket "coasts" after depleting all its propellant under constant acceleration "g" and is represented as, $$h_C(\mu_f, T2W) = \frac{v_B^2(\mu_f, T2W)}{2g} \quad (5.65)$$

Naming this distance $h_C$, as the "coast" distance, writing (5.64) in terms of the sum of $h_B$ and $h_C$ becomes handy in evaluating the derivatives and limits with respect to pf giving, $$h(\mu_f, T2W) = h_C(\mu_f, T2W) + h_B(\mu_f, T2W) \quad (5.66)$$

Since (5.41) holds the limit of $h_C(\mu_f, T2W)$ at $\mu_f=0$ becomes, $$\mu_f \to 0 \ v_B^2(0, T2W) \to \infty\ h_C(0, T2W) \to \infty \quad (5.67)$$

The limit of $h_C(\mu_f, T2W)$ at $\mu_f=1$ gives, $$\mu_f \to 1\ v_B^2(1, T2W) \to 0\ h_C(1, T2W) \to 0 \quad (5.68)$$

Due to (5.66), the limits of h at at $\mu_f=0$ and $\mu_f=1$ give the same values as (5.67) and (5.68). Due to (5.67), $\mu_f \to 0$ becomes the asymptotes for the $h_C(\mu_f, T2W)$ and $h(\mu_f, T2W)$ curves, as shown in FIGS. 6A and 6B.

Figure 6B:
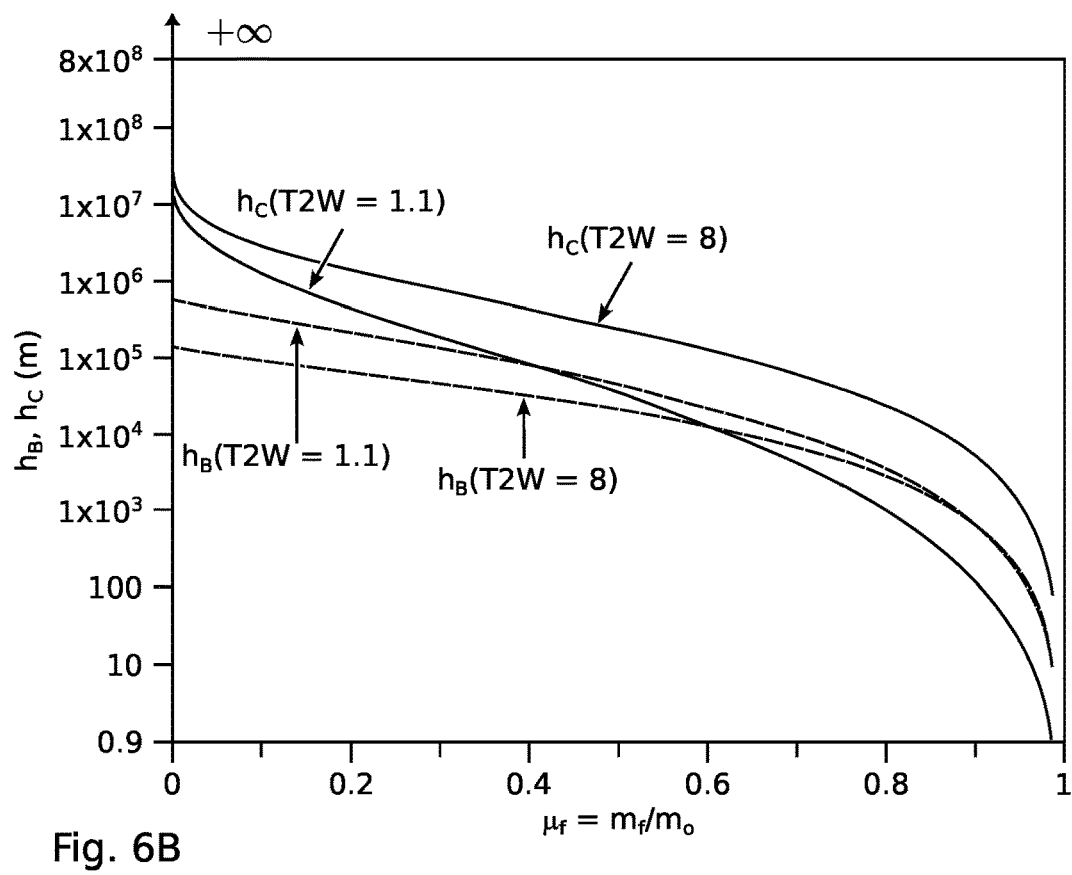
FIG. 6B depicts burn height $h_B(\mu_f, T2W)$ and coast height $h_C(\mu_f, T2W)$ for the constant gravitational acceleration of g=9.8 [m/s²] with thrust-to-weight ratio T2W=1.1 and 8 where the vertical axis is in logarithmic scale.

FIG. 6B depicts burn height $h_B(\mu_f, T2W)$ and coast height $h_C(\mu_f, T2W)$ for the constant gravitational acceleration of g=9.8 [m/s²] with thrust-to-weight ratio T2W=1.1 and 8 where the vertical axis is in logarithmic scale. The asymptote for $h_C(\mu_f, T2W)$ is shown at $\mu_f \to 0$ with the dotted vertical line while $h_B(\mu_f, T2W)$ has a finite value less than 600 [km].

5.2 Solution of Tsiolkovsky's Rocket Equation for Constant Gravitational Acceleration
When the Rocket Thrust is in the Same Direction of the Gravitational Force The modification to accommodate the rocket thrust being in the same direction of the gravitational force is straightforward. The burn velocity $v_B$ after consuming all the rocket propellant as given in initially at (5.28), (5.29) and finally in (5.40) can be written for gravitational force is in the opposite direction of the rocket thrust as, $$v_B^{-g} = v_E \left[ \ln\left(\frac{1}{\mu_f}\right) - \frac{(1-\mu_f)}{T2W} \right] \quad (5.69)$$

Superscript −g is not an exponent, it is a superscript indicating it is the velocity gained when the rocket thrust is in the opposite direction of the gravitational force symbolized as g. After some simple math, the velocity gained when the rocket thrust is in the same direction of gravitational force can be written as, $$v_B^{+g} = v_E \left[ \ln\left(\frac{1}{\mu_f}\right) + \frac{(1-\mu_f)}{T2W} \right] \quad (5.70)$$

Similar notation can be used for the $h_B$, derived in (5.59) for the distance covered when the rocket thrust is in the opposite direction of the gravitational force symbolized as gas, $$h_B^{-g}(\mu_f, T2W) = \frac{v_E^2}{g \cdot T2W}\left[1 - \mu_f \ln\left(\frac{1}{\mu_f}\right) - \mu_f - \frac{1}{2}\frac{(1-\mu_f)^2}{T2W}\right] \quad (5.71)$$

Again, after some simple math, the velocity gained when the rocket thrust is in the same direction of gravitational force can be written as, $$h_B^{+g}(\mu_f, T2W) = \frac{v_E^2}{g \cdot T2W}\left[1 - \mu_f \ln\left(\frac{1}{\mu_f}\right) - \mu_f + \frac{1}{2}\frac{(1-\mu_f)^2}{T2W}\right] \quad (5.72)$$

Figure 3H:
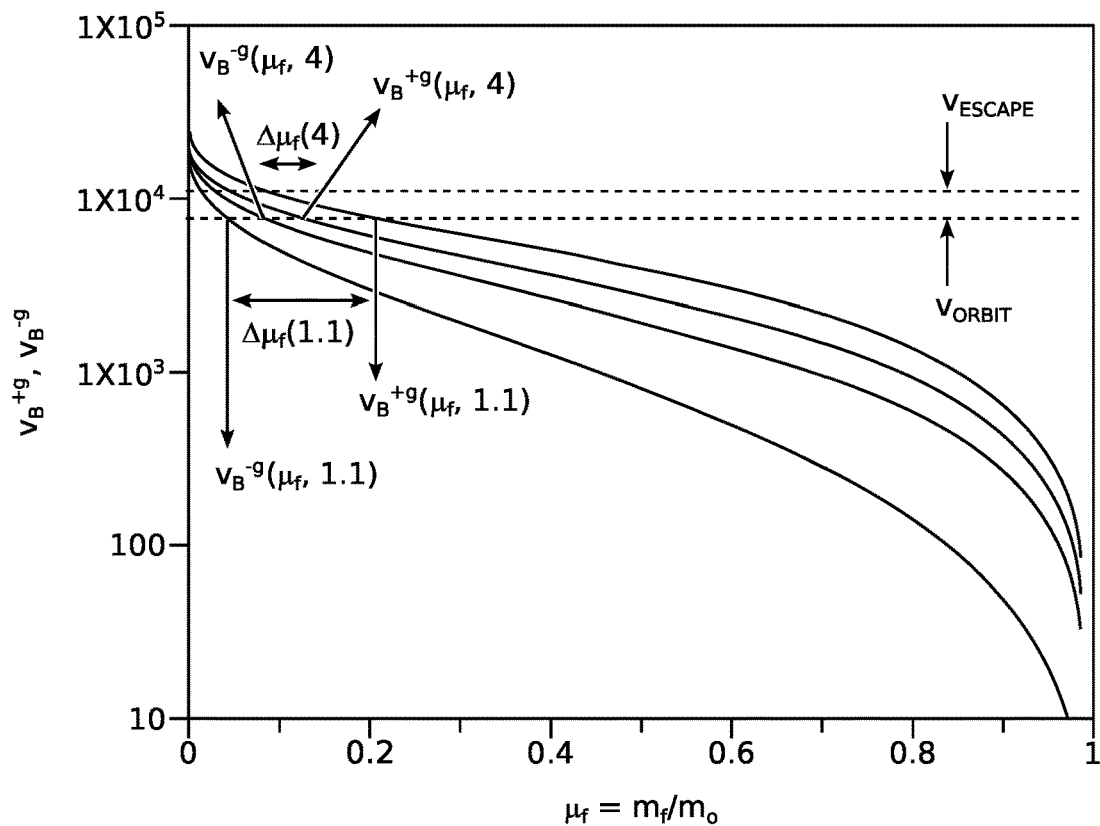
FIG. 3H depicts the rocket thrust assisted velocity reached $v_B$, having rocket thrust being in the same direction of the constant gravitational acceleration shown as $v_B^{+g}$ (in rocket powered vertical descent) and rocket thrust being in the opposite direction of the constant gravitational acceleration shown as $v_B^{-g}$ (in rocket powered vertical ascent) using the solution of modified Tsiolkovsky's rocket equation for T2W=1.1 and 4 versus $\mu_f$.

FIG. 3H depicts the rocket thrust assisted velocity reached $v_B$, having rocket thrust being in the same direction of the constant gravitational acceleration shown as $v_B^{+g}$ (in rocket powered vertical descent) and rocket thrust being in the opposite direction of the constant gravitational acceleration shown as $v_B^{-g}$ (in rocket powered vertical ascent) using the solution of modified Tsiolkovsky's rocket equation for T2W=1.1 and 4 versus $\mu_f$. In both cases velocities are after all the propellant is consumed. Escape velocity and orbital velocities for 400 [km] altitude is also shown for reference.

Figure 3I:
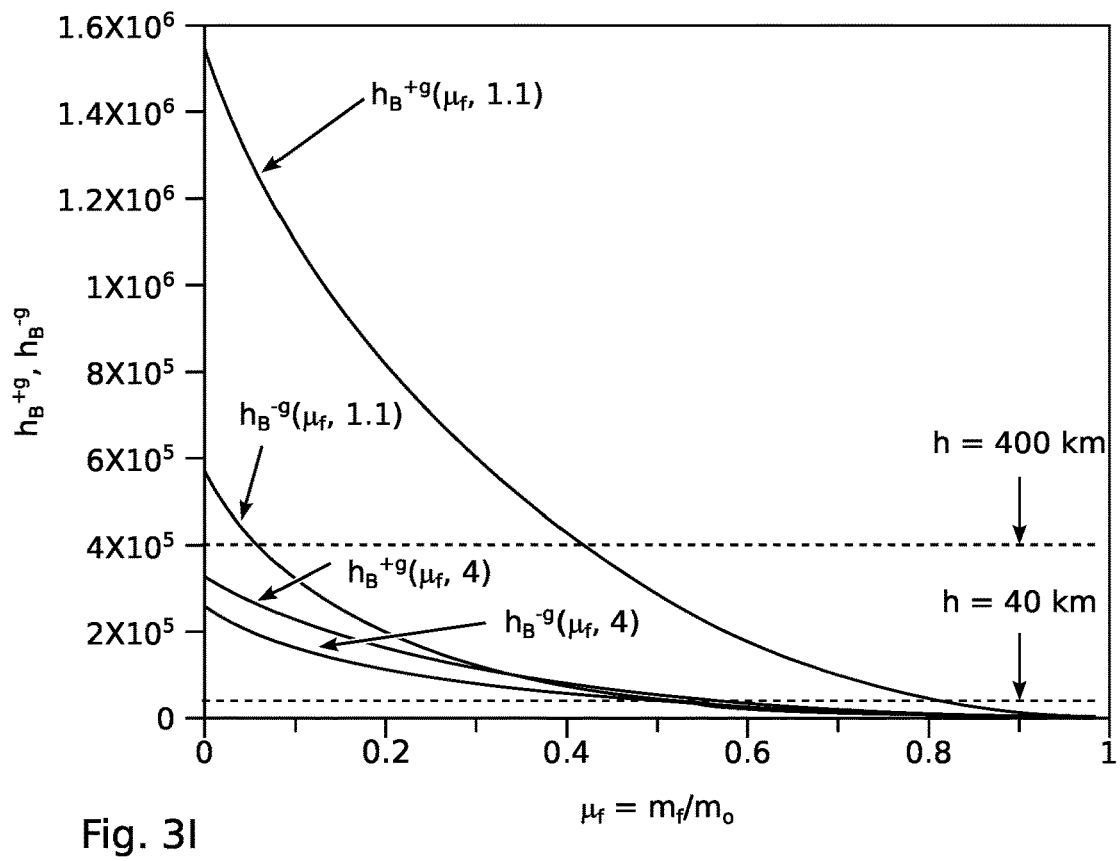
FIG. 3I depicts the rocket thrust assisted distance covered having rocket thrust being in the same direction of the constant gravitational acceleration shown as h+(in rocket powered vertical descent) and rocket thrust being in the opposite direction of the constant gravitational acceleration shown as $h_B^{-g}$ (in rocket powered vertical ascent) using the solution of modified Tsiolkovsky's rocket equation for T2W=1.1 and 4 versus $\mu_f$.

FIG. 3I depicts the rocket thrust assisted distance covered having rocket thrust being in the same direction of the constant gravitational acceleration shown as $h_B^{+g}$ (in rocket powered vertical descent) and rocket thrust being in the opposite direction of the constant gravitational acceleration shown as $h_B^{-g}$ (in rocket powered vertical ascent) using the solution of modified Tsiolkovsky's rocket equation for T2W=1.1 and 4 versus $\mu_f$. In both cases distances are after all the propellant is consumed. The distances of 400 and 40 [km] are also shown for reference.

Figure 3J:
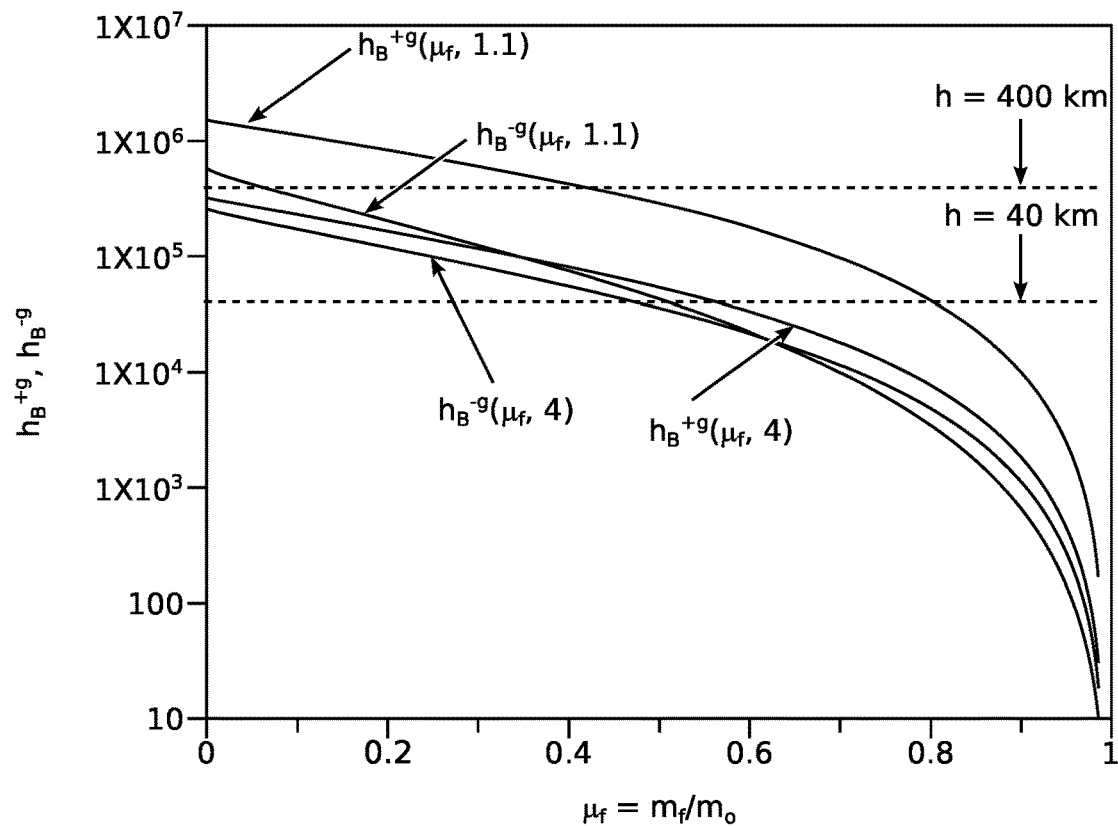
FIG. 3J is same data depicted in FIG. 3I in logarithmic x axes to show the covered distances clearer for larger $\mu_f$ values.

FIG. 3J is same data depicted in FIG. 3I in logarithmic x axes to show the covered distances clearer for larger $\mu_f$ values.

Figure 3K:
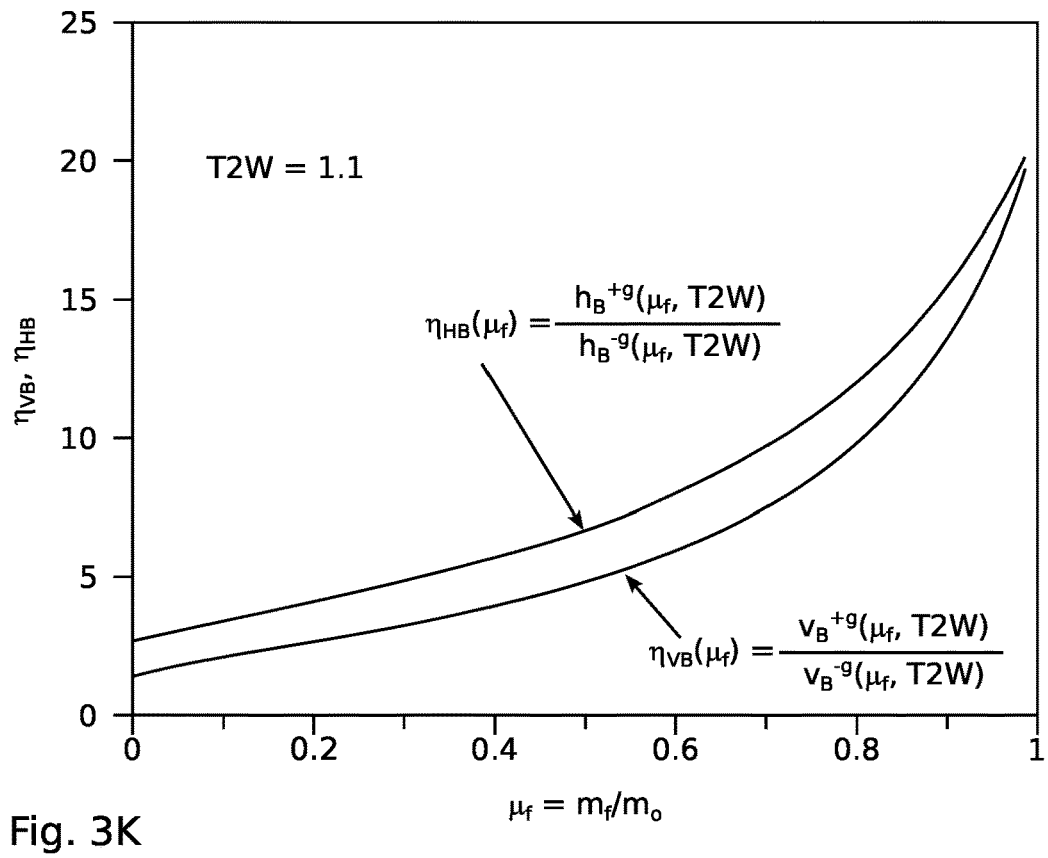
FIG. 3K depicts the ratios between the velocities reached $\eta_{VB}(\mu_f)=v_B^{+g}/v_B^{-g}$ and ratios of the distances covered $\eta_{HB}(\mu_f)=h_B^{+g}(\mu_f, T2W)/h_B^{-g}(\mu_f, T2W)$ for T2W=1.1.

FIG. 3K depicts the ratios between the velocities reached $\eta_{VB}(\mu_f) = v_B^{+g}/v_B^{-g}$ and ratios of the distances covered $\eta_{HB}(\mu_f) = h_B^{+g}(\mu_f, T2W)/h_B^{-g}(\mu_f, T2W)$ for T2W=1.1.

Figure 3L:
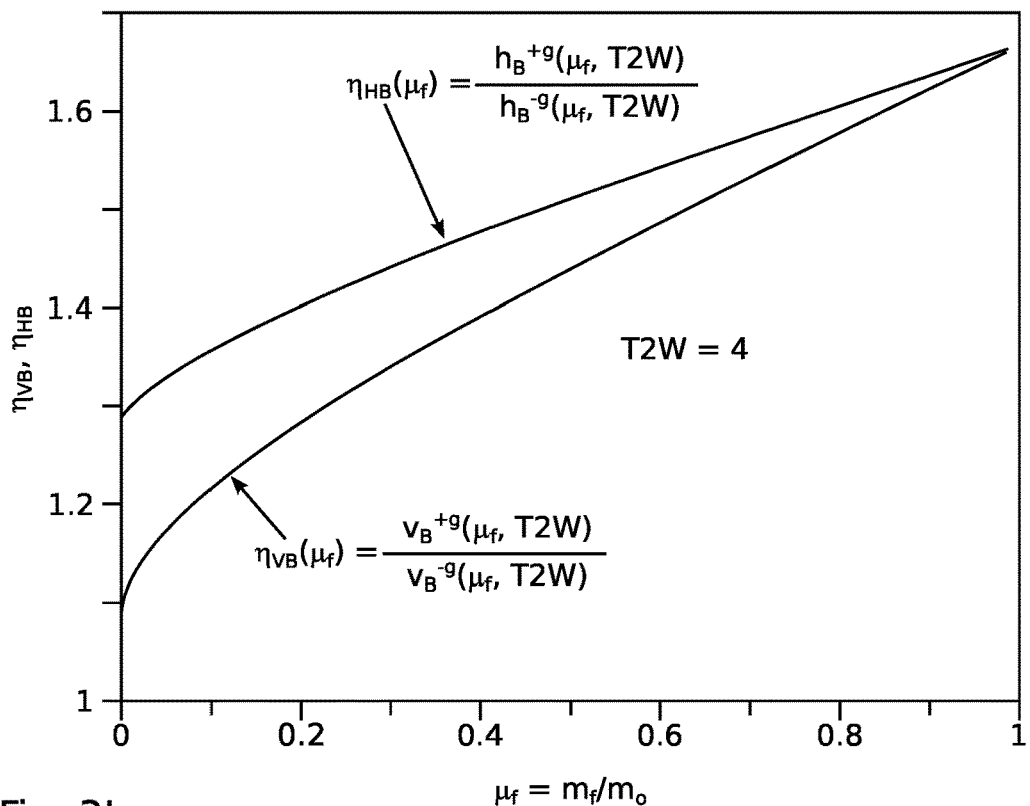
FIG. 3L depicts the ratios between the velocities reached $\eta_{VB}(\mu_f)=v_B^{+g}/v_B^{-g}$ and ratios of the distances covered $\eta_{HB}(\mu_f)=h_B^{+g}(\mu_f, T2W)/h_B^{-g}(\mu_f, T2W)$ for T2W=4.

FIG. 3L depicts the ratios between the velocities reached $\eta_{VB}(\mu_f) = v_B^{+g}/v_B^{-g}$ and ratios of the distances covered $\eta_{HB}(f) = h_B^{+g}(\mu_f, T2W)/h_B^{-g}(\mu_f, T2W)$ for T2W=4.

As can be seen the only differences are the sign change in the last terms in (5.69) and (5.71) but it has a very significant effect on the velocities gained and distances covered between the vertical rocket assisted descent described in this invention and prior art ascend.

With all the notations given above FIG. 3H-FIG. 3L displays the comparative analysis between (5-69) and (5.70) for velocities gained graphically for T2W=1.1 and 4. As can be seen in in FIG. 3H for T2W=1.1 the same payload can gain orbital velocity for orbital height of h=400 [km] (ISS orbital altitude) with $\mu_f=0.2$ in rocket assisted decent, while the same velocity can be gained with $\mu_f=0.05$ giving a $\Delta\mu_f(T2W=1.1)=0.15$ resulting in very significant propellant savings and reduction in rocket thrust for the same payload in descent versus ascent. FIG. 3H also shows the similar fact with less savings for T2W=4. Precise numerical values of $\Delta\mu_f(\mu_f, T2W)$ are given in the third column of Table 3B for all six orbital altitudes listed in Table 3A for T2W=1.1, 2, and 8.

FIG. 3I depicts the rocket thrust assisted distance covered having rocket thrust being in the same direction of the constant gravitational acceleration shown as $h_B^{+g}$ (in rocket powered vertical descent) and rocket thrust being in the opposite direction of the constant gravitational acceleration shown as $h_B^{-g}$ (in rocket powered vertical ascent) using the solution of modified Tsiolkovsky's rocket equation for T2W=1.1 and 4 versus $\mu_f$. In both cases distances are after all the propellant is consumed. The distances of 400 and 40 [km] are also shown for reference.

FIG. 3J is same data depicted in FIG. 3I in logarithmic x axes to show the covered distances clearer for larger $\mu_f$ values.

FIG. 3K depicts the ratios between the velocities reached $\eta_{VB}(\mu_f)=v_B^{+g}/v_B^{-g}$ and ratios of the distances covered $\eta_{HB}(\mu_f)=h_B^{+g}(\mu_f, T2W)/h_B^{-g}(\mu_f, T2W)$ for T2W=1.1.

FIG. 3L depicts the ratios between the velocities reached $\eta_{VB}(\mu_f)=v_B^{+g}/v_B^{-g}$ and ratios of the distances covered $\eta_{HB}(\mu_f)=h_B^{+g}(\mu_f, T2W)/h_B^{-g}(\mu_f, T2W)$ for T2W=4.

As a conclusion, the main reason of achieving orbital velocities by going into smaller radiuses then initially calculated $r_0$ given as, $$r_0 = 2 \cdot r_{ORBIT} \tag{5.73}$$

using energy conservation principle with the same mass as in (1.1). This results in defining a third radius $r_h$ with a scaling factor $s_f$ as given in (1.2) as, $$r_h = s_f r_{ORBIT} \text{ where } 1.1 < s_f < 2 \tag{5.74}$$

It is important to point out that all these calculations are done for vertical descent and ascent using rocket propulsion based on mass ejection for constant gravitational force. FIG. 3H and FIG. 3L clearly show that the thrust to weight ratio (T2W) plays an important part in the results. From the curves it is evident that as the T2W increases, the curves get piled on top of each other and are difficult to distinguish from each other. Table 3B gives a clearer view of the analysis done for satellites at different orbital altitudes showing the T2W effect on the results and the logic of coming up with a third radius $r_h$ and its relation to $r_0$ through the scaling factor $s_f$.

This is done in two steps:
a. Find the $\mu_f^{+g}$ which will give the orbital velocity $v_{ORBIT}(h)$ when initially stationary at the altitude h by solving the equation given in (5.70) as, $$v_{ORBIT}(h) = v_E \left[ \ln\left(\frac{1}{\mu_f^{+g}}\right) + \frac{(1-\mu_f^{+g})}{T2W} \right] \tag{5.75}$$

ii) By substituting $\mu_f^{+g}$ for p in (5.72) $h_B^{+g}(\mu_f, T2W)$ is obtained, which is the fall distance covered when the rocket thrust is in the same direction of gravitational acceleration while reaching $v_{ORBIT}(h)$ from an initial velocity of zero and is written on the $5^{th}$ column of Table 3B for all 6 orbital altitudes and for 4 different values of T2W. The arithmetic for calculating $s_f$ is straightforward and is listed in column 7 of Table 3B. Column 6 gives the $h_B^{+g}(\mu_f, T2W)/h$ ratio. As can be seen all the way to orbital altitudes of 781 [km], the results are consistent, but the inaccuracy caused by assuming constant acceleration throughout the entire descent path becomes apparent.

| Orbital Altitude h [km] | T2W | $\mu_B^{+g} - \mu_B^{-g}$ $\Delta\mu_f(h,T2W)$ | $h_B^{-g}$ [km] | $h_B^{+g}$ [km] | $\frac{h_B^{+g}}{h}$ | $sf = \frac{r_h^{+g}}{r_{ORBIT}}$ | $\frac{m_{PROP}^{-g} - m_{PROP}^{+g}}{payload}$ |
|---|---|---|---|---|---|---|---|
| 255 | 1.1 | 0.167 | 207.35 | 865.90 | 3.396 | 1.131 | 18.56 |
| 255 | 2 | 0.092 | 239.97 | 467.23 | 1.832 | 1.070 | 9.198 |
| 255 | 4 | 0.046 | 164.37 | 225.13 | 0.833 | 1.034 | 4.440 |
| 255 | 8 | 0.023 | 93.93 | 109.57 | 0.430 | 1.017 | 2.200 |
| 400 | 1.1 | 0.170 | 212.12 | 892.20 | 2.231 | 1.132 | 18.077 |
| 400 | 2 | 0.094 | 247.17 | 482.47 | 1.206 | 1.071 | 8.951 |
| 400 | 4 | 0.047 | 169.77 | 232.77 | 0.582 | 1.034 | 4.320 |
| 400 | 8 | 0.023 | 97.13 | 113,36 | 0.283 | 1.017 | 2.141 |
| 540 | 1.1 | 0.173 | 216.69 | 917.70 | 1.699 | 1.133 | 17.629 |
| 540 | 2 | 0.096 | 254.15 | 497.28 | 0.921 | 1.072 | 8.726 |
| 540 | 4 | 0.048 | 175.03 | 240.21 | 0.445 | 1.035 | 4.211 |
| 540 | 8 | 0.024 | 100.24 | 117.05 | 0.217 | 1.017 | 2.087 |
| 781 | 1.1 | 0.178 | 224.50 | 961.83 | 1.232 | 1.134 | 16.910 |
| 781 | 2 | 0.099 | 266.21 | 522.97 | 0.67 | 1.073 | 8.365 |
| 781 | 4 | 0.049 | 184.14 | 253.15 | 0.32 | 1.035 | 4.036 |
| 781 | 8 | 0.025 | 105.66 | 123.47 | 0.158 | 1.017 | 2.000 |
| 20,200 | 1.1 | 0.356 | 727.84 | 4,910 | 0.243 | 1.185 | 4.792 |
| 20,200 | 2 | 0.210 | 1,309.7 | 2,994 | 0.148 | 1.113 | 2.277 |
| 20,200 | 4 | 0.108 | 1,069 | 1,571 | 0.078 | 1.059 | 1.081 |
| 20,200 | 8 | 0.054 | 662.6 | 798 | 0.04 | 1.030 | 0.533 |
| 35,786 | 1.1 | 0.394 | 1,055 | 8,271 | 0.231 | 1,196 | 3.437 |
| 35,786 | 2 | 0.233 | 2,169 | 5,192 | 0.145 | 1,123 | 1,596 |
| 35,786 | 4 | 0.119 | 1,861 | 2,791 | 0.078 | 1,066 | 0.751 |
| 35,786 | 8 | 0.060 | 1,181 | 1,439 | 0.04 | 1,034 | 0.369 |

The remaining columns of Table 3B are for comparative analysis between the rocket thrust against gravity and in the same direction as the gravity.

Solving (5.69) gives $\mu_f^{-g}$, which gives the orbital velocity $v_{ORBIT}(h)$ when initially stationary at the altitude h when the rocket thrust is against gravity as, $$v_{ORBIT}(h) = v_E \left[ \ln\left(\frac{1}{\mu_f^{-g}}\right) - \frac{(1-\mu_f^{-g})}{T2W} \right] \tag{5.76}$$

The third column of Table 3B gives the differences between the solutions of (5.75) and (5.76) as, $$\Delta\mu_f(h,T2W) = \mu_f^{+g} - \mu_f^{-g} \tag{5.77}$$

By substituting $\mu_f^{+g}$ for $\mu_f$ in (5.71) $h_B^{-g}(\mu_f, T2W)$ is obtained, which is the height from which the payload is launched if rocket thrust is opposite to gravitational force given at fourth column of Table 3B.

On the other hand, since the whole objective is to put a satellite into orbit, the final masses in both cases are equal and it is equal to the satellite mass or referred to as payload $m_{PAY}$ in earlier calculations. Therefore written as, $$\frac{1}{\mu_f^{-g}} - \frac{1}{\mu_f^{+g}} = \frac{m_0^{-g} - m_0^{+g}}{m_f} = \frac{m_0^{-g} - m_0^{+g}}{m_{PAY}} \quad (5.78)$$

Since most of the mass of a rocket is propellant (5.78) can be approximated as, $$\frac{m_0^{-g} - m_0^{+g}}{m_{PAY}} \cong \frac{m_{PROP}^{-g} - m_{PROP}^{+g}}{m_{PAY}} \quad (5.79)$$

Which gives the eighth (last) column in Table 3B. Having a large ratio shows how much propellant is saved for the same payload with rocket thrust in the same direction of gravitation versus against it.

Real calculations and trajectory optimizations are only possible with numerical solution of three-dimensional equation of motion, and the $r_h$ and related $s_f$ calculation is payload and orbital altitude dependent, but it is clearly shown in Table 3B that $s_f$ values can be even as low as 1.1.

It was earlier proven that the total energy of an object in a circular orbit at a radius $r_{ORBIT}$ is equal to the total energy of the same object, which is stationary at the radius of $r_0=2 \cdot r_{ORBIT}$. Then when the same object is launched to a smaller radius, $r_h$ then $2r_{ORBIT}$, as given in (1.2) and (5.74), it will have less gravitational potential energy and since it is stationary its total energy, compared to the total energy when orbiting at a radius of $r_{ORBIT}$.

FIG. 13I demonstrates the methodology employed for two different values of $s_f=1.5$ and 2 along with the related mass versus time plots of FIG. 13J and FIG. 13K. Similar graphical demonstration is given for 20,200 [km] (GPS) orbital launch in FIG. 13M with the related mass versus time plots FIG. 13N and FIG. 13O.

Modification of Tsiolkovsky's Rocket Equation for Inverse Square Law Gravitational Field.

If the launch altitude is in the order of, or larger than the Earth's radius, Tsiolkovsky's Rocket Equation for constant gravitational acceleration must be modified for the inverse square law gravitational field. In this work this modification is done by applying the energy conservation law for inverse square law gravitational fields which gives much better correlation to reality and numerical solution of the equations of motion. In this approach, the non-linearities in the equation relating the final and initial rocket masses to final velocity and altitude get more complex and solving it with Newton's method becomes more challenging, requiring more care and is explained in detail below.

The Inverse Square Law Gravitational Field Relation can be incorporated into the conservation of energy formulation for calculating a more accurate final altitude h. If the final altitude h, calculated by (5.61) is comparable to or larger than the radius of Earth $r_{EARTH}$, the potential energy expression for constant gravitational acceleration g becomes inaccurate. FIG. 2B clearly shows the ratio of the inverse square law calculated acceleration versus constant acceleration value on the surface of the Earth as a function of radius measured from the center of the Earth and at sea level. The marked altitude on the curve is $h_{BMAX}$, which shows that highest altitude that any rocket can reach during its burn phase giving 85% of the gravitation acceleration of the surface value, giving a much smaller h than the gravitational potential energy derived for the inverse square law gravitational field as shown in FIG. 2C and explained above. This problem can be fixed by replacing the potential energy with the formulation for the inverse square law gravitational field giving (6.1), $$\frac{1}{2}m_f v_B^2 - G\frac{m_f m_{EARTH}}{r_B} = \frac{1}{2}m_f v_{rhINV2}^2 - G\frac{m_f m_{EARTH}}{r_{hINV2}} \quad (6.1)$$

Subscripts "INV2" represent the "inverse square law gravitational field formulation" quantities, where $r_B$ and $r_{hINV2}$ are radiuses corresponding to the altitudes $h_B$ and $h_{INV2}$ given as, $$r_B = h_B + r_{EARTH} \text{ and } r_{hINV2} = h_{INV2} + r_{EARTH} \quad (6.2)$$

Since $r_{EARTH}$ is a constant, the following derivative relations are also valid, $$\frac{dr_B}{d\mu_f} = \frac{dh_B}{d\mu_f} \text{ and } \frac{dr_{hINV2}}{d\mu_f} = \frac{dh_{INV2}}{d\mu_f} \quad (6.3)$$

Solving 13D from (6.1), gives, $$r_{hINV2} = \frac{-2Gr_B m_{EARTH}}{-2Gm_{EARTH} + r_B(v_B^2 - v_{rhINV2}^2)} \quad (6.4)$$

Multiplying denominator and dominator of (6.4) with −1 gives, $$r_{hINV2} = 2Gm_{EARTH} \frac{r_B}{2Gm_{EARTH} - r_B(v_B^2 - v_{rhINV2}^2)} \quad (6.5)$$

Substituting $v_{r_{hINV2}}^2 = 0$ in (6.5), which is the case of interest gives, $$r_{hINV2} = 2Gm_{EARTH} \frac{r_B}{2gm_{EARTH} - r_B v_B^2} \quad (6.6)$$

Since a proper ($r_B$, $v_B$) combination can make the denominator of (6.6) zero, an infinite value for both $r_{hINV2}$ and $h_{INV2}$ is possible with a finite $v_B$. The equation gives the "finite" $v_B$. The equation which gives the finite $v_B$, resulting with an infinite value for both $r_{hINV2}$ and $h_{INV2}$ can be solved by solving, $$2Gm_{EARTH} - r_B v_B^2 = 0 \quad (6.7)$$

Giving, $$v_{BASY} = \sqrt{\frac{2Gm_{EARTH}}{r_B}} = v_{ESCAPE}(r_B, m_{EARTH}) \quad (6.8)$$

This corresponds to the escape velocity from a spherical boundary with a radius of $r_B$ enclosing the mass of $m_{EARTH}$ in it. The escape velocity from Earth vs. altitude is very clearly shown in FIG. 1D along with markings of the orbital altitudes given in Table 2. This means that the rocket reaches infinite radius or altitude if it has a velocity of $v_{BASY}$ at $r_B$ or at the altitude $h_B$. As can be seen this makes perfect physical sense for the defined escape velocity, which the solution of the rocket equation under constant g formulation does not give. Writing (6.8) in terms of the previously calculated altitude $h_B$ and velocity $v_B$ gives, $$h_{INV2} = 2Gm_{EARTH} \frac{h_B + r_{EARTH}}{2Gm_{EARTH} - r_B v_B^2} - r_{EARTH} \qquad (6.9)$$

The corresponding "coast height" $h_{CINV2}$ becomes, $$h_{CINV2} = h_{INV2} - h_B \qquad (6.10)$$

Figure 7A:
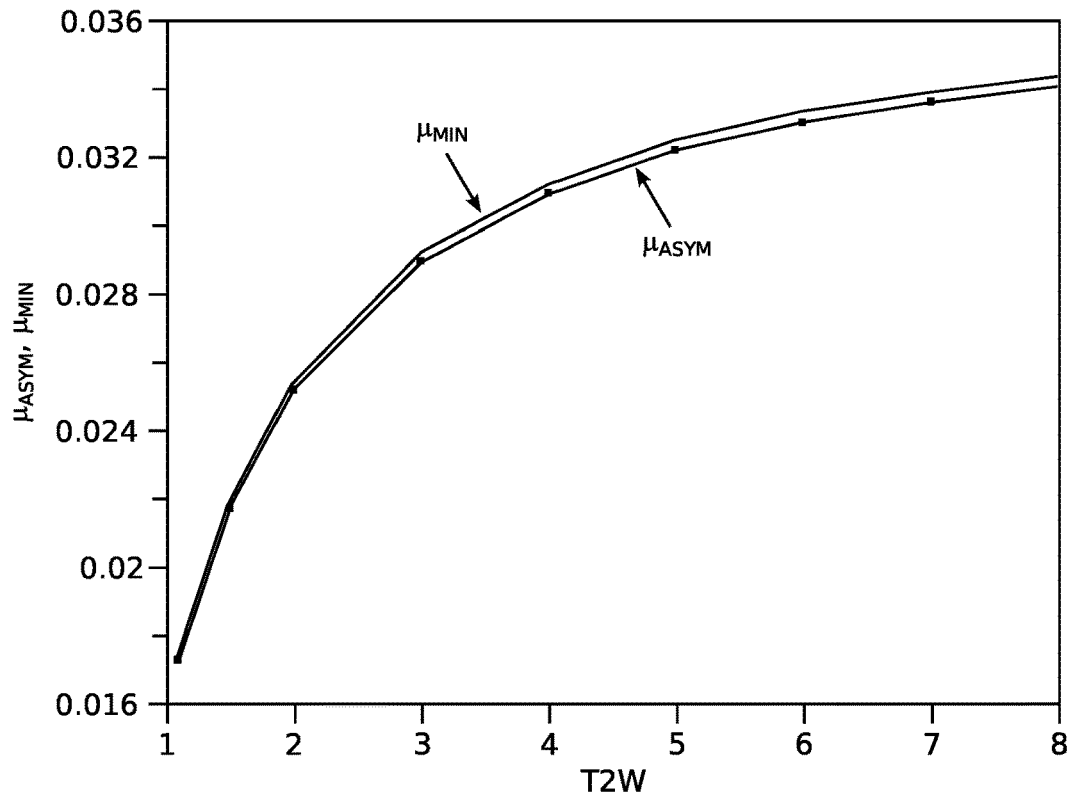
FIG. 7A depicts asymptote x intercept $\mu_{ASYM}(T2W)$ vs. T2W and $\mu_{MIN}(T2W)$ by solving the non-linear equation (6.7).

FIG. 7A depicts asymptote x intercept $\mu_{ASYM}$(T2W) vs. T2W and $\mu_{MIN}$(T2W) by solving the non-linear equation (6,7). As can be seen, the asymptotes for any T2W are very close to zero, in the range of $0.016 < \mu_f < 0.036$, and getting closer to zero with decreasing thrust-to-weight ratio T2W. As given by (6.6) $r_{hINV2}$ becomes $+\infty$ along with the altitude $h_{INV2}$ due to the linear relation given in relation (6.2), which causes plotting and interpolation to be very difficult, if not impossible for $\mu_f = \mu_{ASYM}$(T2W). To avoid this problem, $\mu_{MIN}$(T2W) is defined by a small $\delta$ value greater than the $\mu_{ASYM}$(T2W) with very large altitude values in the family of altitude vs $\mu_f$ curves in FIG. 7B through 7E.

Figure 7B:
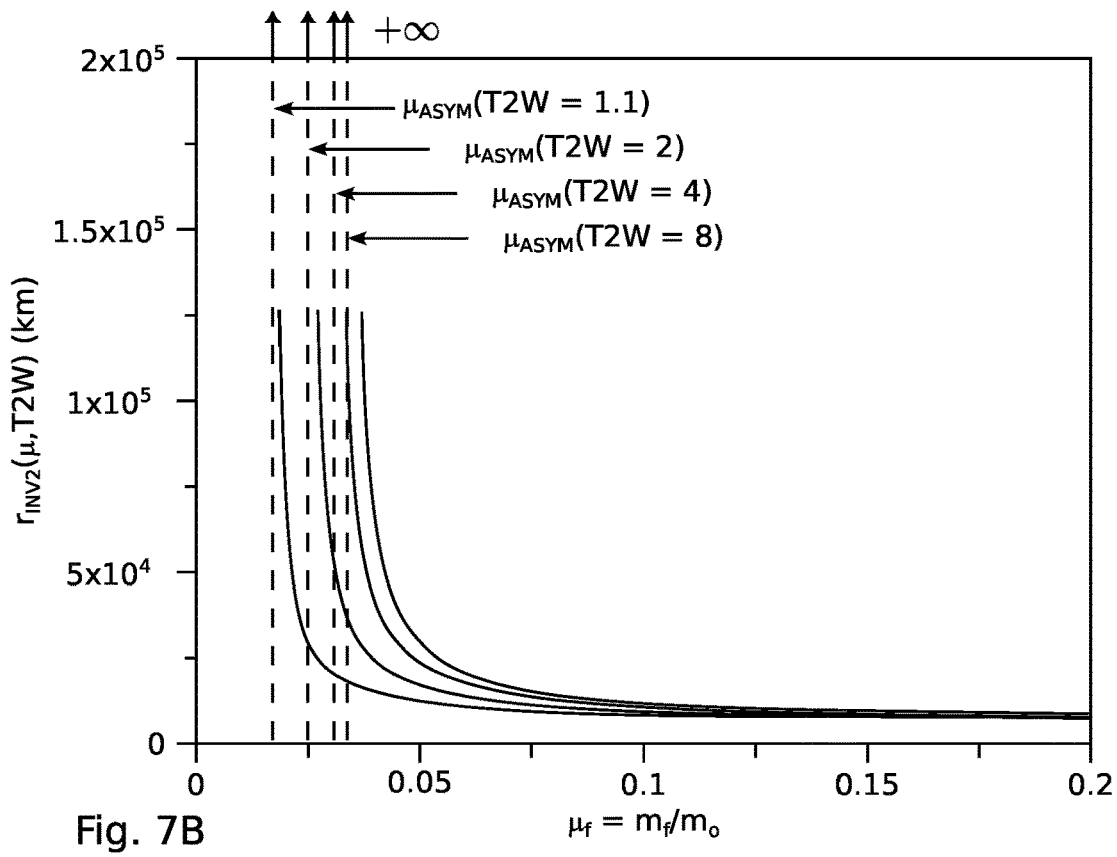
FIG. 7B depicts climb altitude $h_{INV2}(\mu_f, T2W)$ for the inverse square gravitational field with asymptotes where vertical axis is in logarithmic scale for thrust-to-weight ratio T2W=1.1 and 8.

FIG. 7B depicts climb altitude $h_{INV2}(\mu_f, T2W)$ for the inverse square gravitational field with asymptotes where vertical axis is in logarithmic scale for thrust-to-weight ratio T2W=1.1 and 8.

Figure 7C:
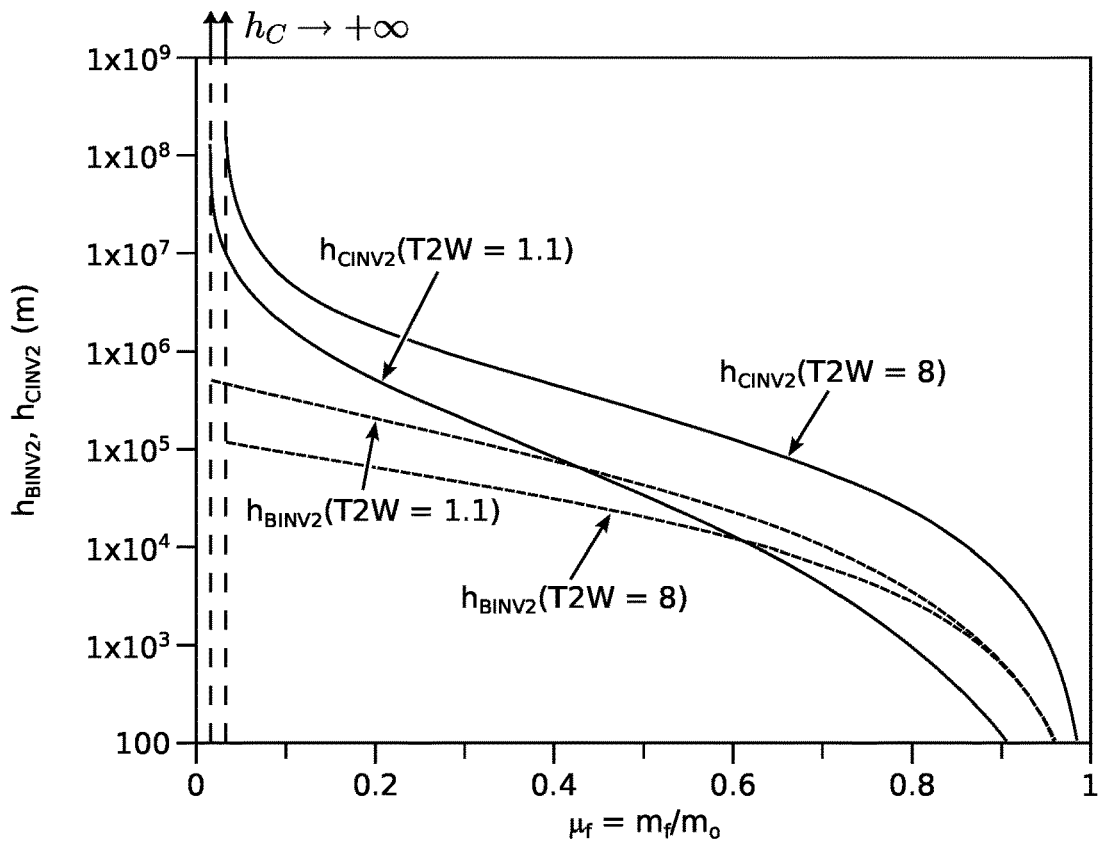
FIG. 7C depicts burn height $h_{BINV2}(\mu_f, T2W)$ and coast height $h_{CINV2}(\mu_f, T2W)$ at T2W for the inverse square gravitational field with asymptotes where the vertical axis is in logarithmic scale.

FIG. 7C depicts burn height $h_{BINV2}(\mu_f, T2W)$ and coast height $h_{CINV2}(\mu_f, T2W)$ at T2W for the inverse square gravitational field with asymptotes where the vertical axis is in logarithmic scale.

Figure 7D:
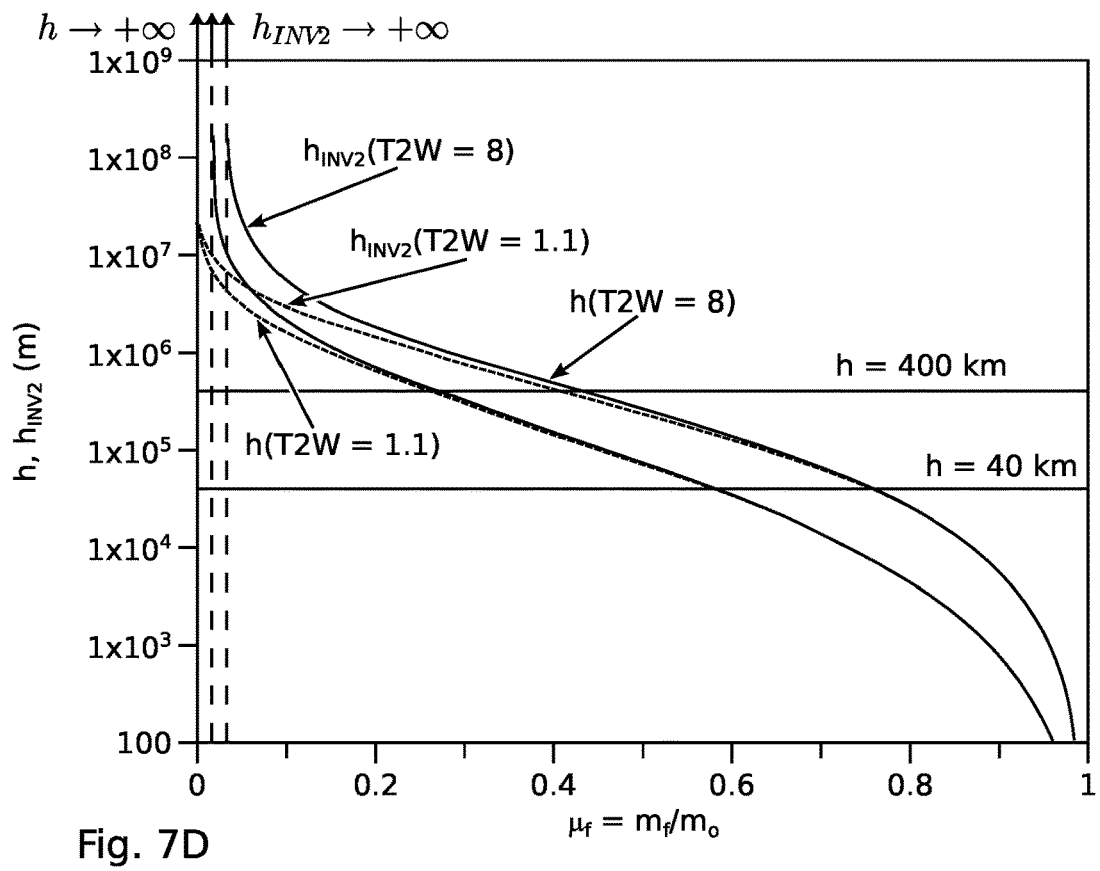
FIG. 7D depicts climb altitude $h_{INV2}(\mu_f, T2W)$ for the inverse square gravitational field with asymptotes and $h(\mu_f, T2W)$ for the constant gravitational acceleration of g=9.8 [m/s²] where the vertical axis is in logarithmic scale for thrust-to-weight ratio T2W=1.1 and 8.

FIG. 7D depicts climb altitude $h_{INV2}(\mu_f, T2W)$ for the inverse square gravitational field with asymptotes and $h(\mu_f, T2W)$ for the constant gravitational acceleration of g=9.8 [m/s²] where the vertical axis is in logarithmic scale for thrust-to-weight ratio T2W=1.1 and 8. Although the differences are self-explanatory, they can be better seen in logarithmic horizontal axes.

Figure 7E:
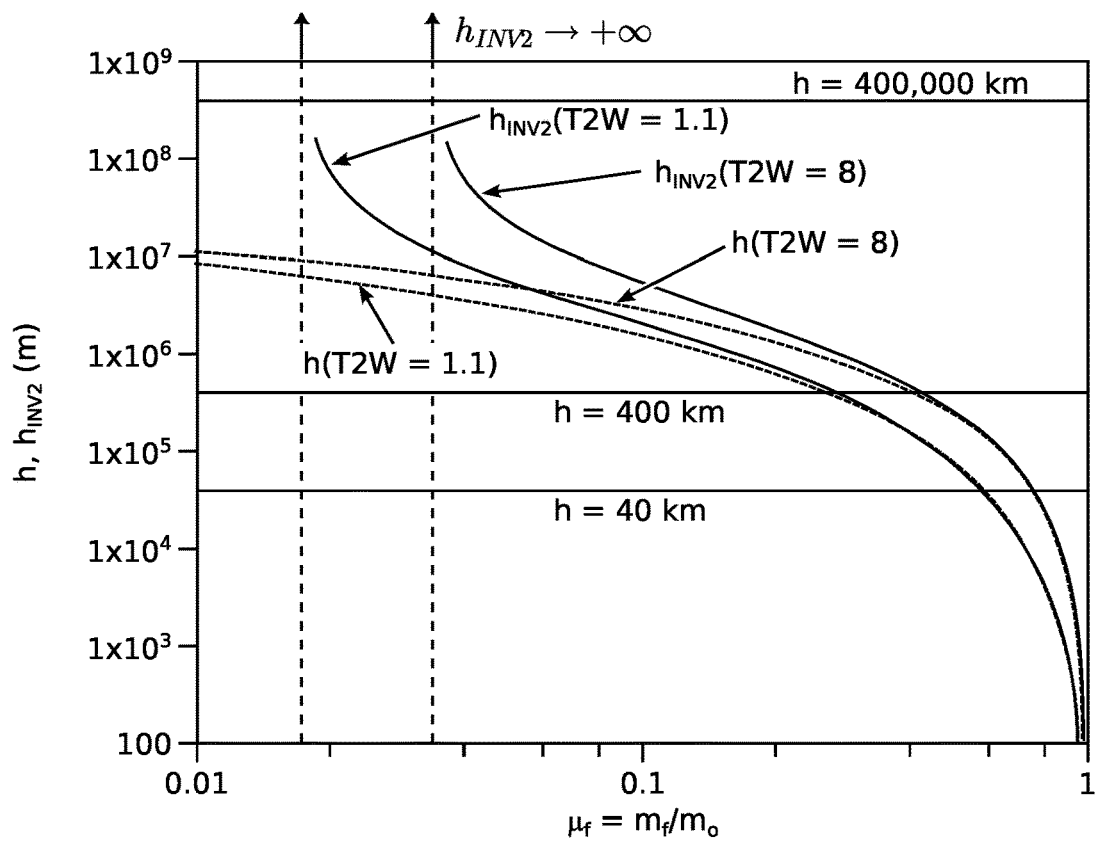
FIG. 7E depicts climb altitude $h_{INV2}(\mu_f, T2W)$ for the inverse square gravitational field with asymptotes and $h(\mu_f, T2W)$ for the constant gravitational acceleration of g=9.8 [m/s²] where the vertical and horizontal axes are in logarithmic scale for thrust-to-weight ratio T2W=1.1 and 8.

FIG. 7E depicts climb altitude $h_{INV2}(\mu_f, T2W)$ for the inverse square gravitational field with asymptotes and $h(\mu_f, T2W)$ for the constant gravitational acceleration of g=9.8 [m/s²] where the vertical and horizontal axes are in logarithmic scale for thrust-to-weight ratio T2W=1.1 and 8. Important to note is that the inverse square gravitational field assumption has to be used for solving pf for altitudes higher than 400 [km]. The constant gravitational acceleration assumption can be safely used for calculating pf as well as altitudes less than 400 [km].

Figure 7F:
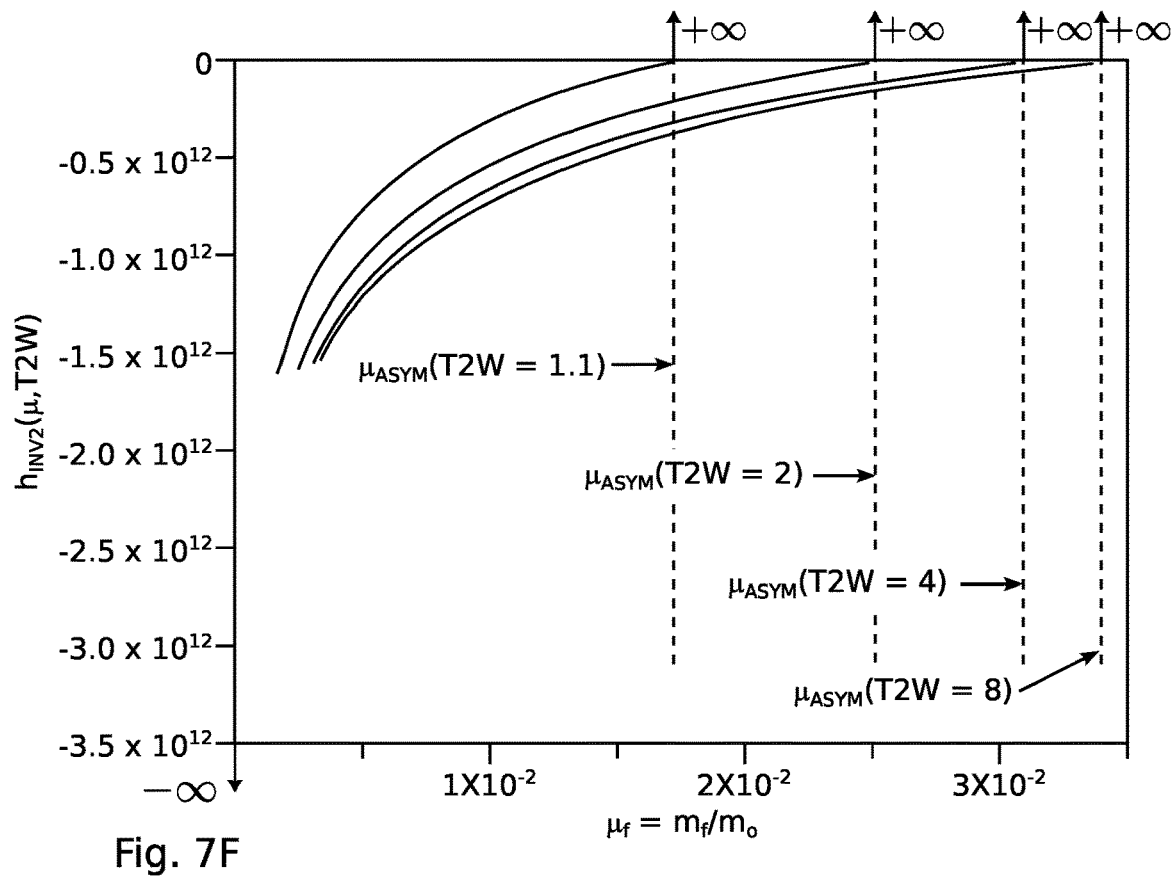
FIG. 7F depicts climb altitude $h_{INV2}(\mu_f, T2W)$ for the inverse square gravitational field with asymptotes for $\mu<\mu_{ASYM}(T2W)$ with thrust-to-weight ratio T2W=1.1, 2, 4, and 8.

FIG. 7F depicts climb altitude $h_{INV2}(\mu_f, T2W)$ for the inverse square gravitational field with asymptotes for $\mu < \mu_{ASYM}$(T2W) with thrust-to-weight ratio T2W=1.1, 2, 4, and 8.

As can be seen very clearly in FIG. 7F there are 2 asymptotes for each $\mu_{INV2}(\mu_f, T2W)$ curve. The first one is at $\mu_f=0$ and all the $h_{INV2}(\mu_f, T2W)$ functions approach $-\infty$, which is non-physical. The second asymptotes of every $h_{INV2}(\mu_f, T2W)$ curve has an asymptote where their x axes intercept, as shown in FIG. 7A, at $\mu_f = \mu_{ASYM}$(T2W), where the $h_{INV2}(\mu_f, T2W)$ functions approach $+\infty$. This asymptote brings also a "jump" type discontinuity where $h_{INV2}(\mu_f, T2W)$ jumps from $+\infty$ to zero when $\mu_f$ crosses the asymptote as can be seen clearly in FIG. 7E and FIG. 7F, This can be worded as in the interval of $0 \le \mu_f \le \mu_{ASYM}$(T2W) the $h_{INV2}(\mu_f, T2W)$ function becomes non-physical.

Figure 8:
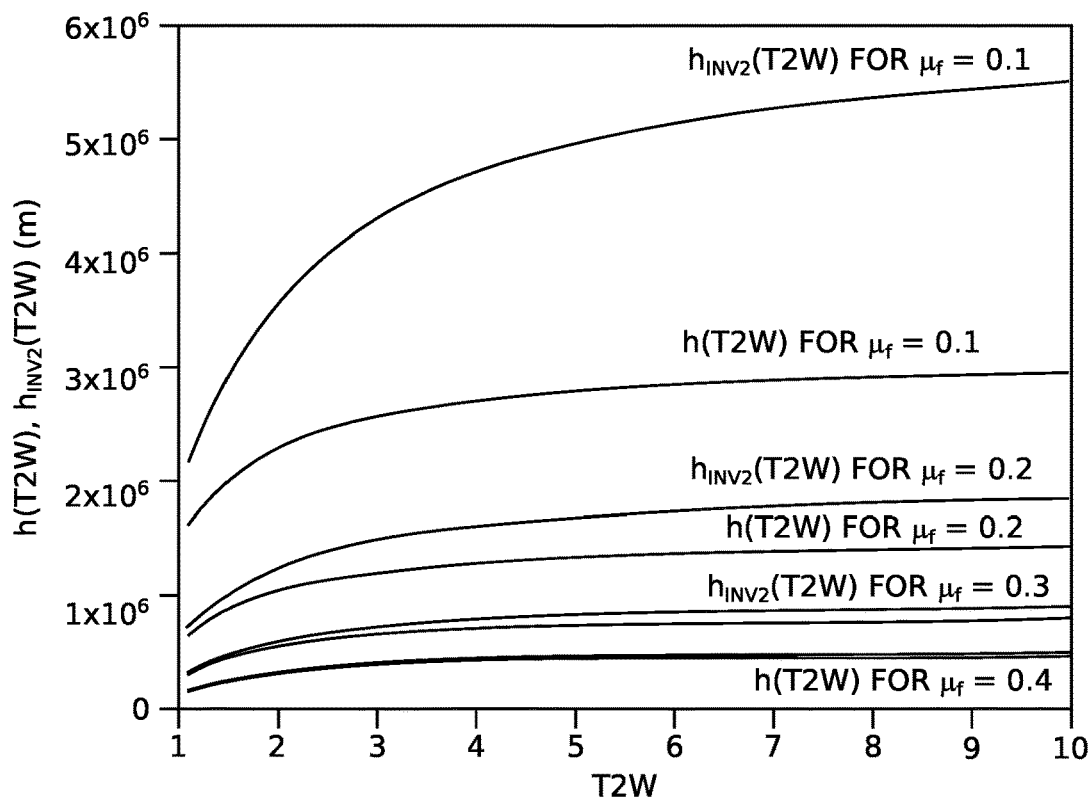
FIG. 8 depicts climb altitude $h_{INV2}(\mu_f, T2W)$ for the inverse square gravitational field and climb altitude $h(\mu_f, T2W)$ with the constant gravitational acceleration of g=9.8 [m/s²] vs. T2W, where $\mu_f$=0.1, 0.2, 0.3, and 0.4.

FIG. 8 depicts climb altitude $h_{INV2}(\mu_f, T2W)$ for the inverse square gravitational field and climb altitude $h(\mu_f, T2W)$ with the constant gravitational acceleration of g=9.8 [m/s²] vs. T2W, where $\mu_f=0.1, 0.2, 0.3,$ and $0.4$. At $\mu_f > 0.3$ the $h(\mu_f, T2W)$ and $h_{INV2}(\mu_f, T2W)$ curves become indistinguishable. FIG. 8 is another way of showing that the constant gravitational acceleration assumption can be safely used for calculating $\mu_f$ by simply looking at the calculated $\mu_f$ value. If $\mu_f > 0.3$, the constant gravitational acceleration assumption is accurate enough to use, with no need to employ the inverse square gravitational field formulation or to question the formulation used in the solution, both give very close results.

Introducing Propellant Tank to Propellant Mass Ratio k.

The propellant tank mass is related to the mass of the propellant that it stores, by introducing a parameter k as, $$k = \frac{m_{tank}}{m_{prop}} \qquad (7.1)$$

The initial mass $m_0$ of the rocket can be written as, $$m_0 = m_{prop}(1+k) + m_{RE} + m_{PAYLOAD} \qquad (7.2)$$

where $m_{prop}$, $m_{RE}$ and $m_{PAYLOAD}$ are the mass of the propellant, rocket engine and payload, and where the parameter k is called the "propellant tank-to-propellant mass ratio". Typical values of k should be a small number like 0.05 to 0.2, with a smaller ratio being more advantageous. The chemistry and the resulting k parameter for liquid and solid fuel rockets are different. Here the analysis for a very simplified formulation applicable of a liquid rocket having a propellant tank being made from only a single cylinder is presented. A similar approach for k parameter calculations for the solid rockets can also be derived.

In a liquid fuel rocket the $m_{prop}$ consists of oxidizer plus the fuel masses given as, $$m_{prop} = m_{fuel} + m_{oxi} \qquad (7.3)$$

which are typically stored in two different cylindrical tanks having two semi-spherical caps at the top and bottom. Due to the chemistry of burning the fuel with the oxidizer, their masses, densities, and their resulting volumes are not necessarily equal and can be calculated with their reaction chemistry. The simplest example uses hydrogen; $H_2$ as fuel and oxygen; $O_2$ for the oxidizer giving the chemical reaction of,

$$H_2 + \frac{1}{2}O_2 \rightarrow H_2O \qquad (7.4)$$

Applying stoichiometry analysis to the chemical reaction given at (7.4) shows that 2 kg of hydrogen reacting with 16 kg of oxygen (⅛ mass ratio) gives 18 kg of steam. This 18 kg of hot steam is ejected from the rocket nozzle with a velocity of $v_E$. Assuming each are stored in liquid form, hydrogen has a density of 71 kg/m³ at 20.28 K (−252.87° C.) and liquid oxygen has a density of 1,141 kg/m³ at 90.19 K (−297.33° C.). As can be seen liquid oxygen is denser than water and approximately 16 times denser than liquid $H_2$. The question becomes how to calculate the volumetric ratios of the liquid $H_2$ and $O_2$ satisfying the calculated ⅛ mass ratio. Using this example, 2 kg of hydrogen volume $V(H_2)=2/71=0.02817$ m³, reacts with an oxygen volume of $V(O_2)=16/1,141=0.01402$ m³. This shows that the $H_2$ tank must be volumetrically 2.009 times larger than the $O_2$ tank to satisfy the calculated ⅛ mass ratio.

In rocket design there are some other factors that are considered for maximizing thrust and cooling issues of the rocket engine. For $H_2/O_2$ rockets the highest impulse power, $I_{SP}$ is achieved when the $H_2/O_2$ mass ratio is ¼ (leaving half of the $H_2$ unburnt), not when it is ⅛ corresponding to full burn of $H_2$. In practice the mass ratio is kept as ⅙ for other reasons. As an example, the space shuttle liquid $O_2$ tank is 19,563 cubic feet (553.96 m³) and $H_2$ tank is 53,518 cubic feet (1,515.46 m³), having volumetric ratio of 2.7357. The full load oxygen and hydrogen mass that can be stored in these tanks are 632.068 and 107.597 tons, giving the ⅙ mass ratio, as given earlier. As can be seen, calculating optimal mass and volumetric propellant/oxidant ratios is not that simple.

In a liquid propellant rocket the fuel and oxidizer are stored in two separate tanks, with piping and some additional essential parts like turbo pumps, controls, etc. To simplify all the calculations, it is assumed that the oxidizer and propellant tanks are two cylinders with same radiuses and spherical caps both having a uniform skin thickness $t_{skin}$. Once the oxidizer and fuel masses and volumes for the mission are calculated as shown in the $H_2/O_2$ example above, calculating the parameter k simply becomes a trivial volume and mass calculation. The goal here is to quantify the significant dependency of the parameter k to the geometrical parameters of the rocket, like its height and radius under these assumptions. This can be achieved by doing the analysis for only one tank, named the propellant tank. The parameter k as given in (7.1) is defined as the mass ratio between the propellant tank and the propellant stored in it, k can be simply calculated by the propellant tank skin area $S_{skin}$, skin material density $P_{skin}$, propellant volume contained in the propellant tank, $V_{prop}$, and its density, $P_{prop}$. A good estimate of k can be given as, $$k \cong \frac{m_{skin}}{m_{prop}} \cong \frac{S_{skin} t_{skin}}{V_{prop}} \frac{\rho_{skin}}{\rho_{prop}} \quad (7.5)$$

Ignoring the masses of both end caps of the propellant tank gives k as, $$k \cong \frac{\pi r^2 - \pi(r - t_{skin})^2}{\pi(r - t_{skin})^2} \frac{\rho_{skin}}{\rho_{prop}} = \frac{\rho_{skin}}{\rho_{prop}} \frac{(2rt_{skin} + t_{skin}^2)}{(r - t_{skin})^2} \quad (7.6)$$

As can be seen in (7.6) k is a decreasing function of the rocket radius r, closer to a function inversely proportional to the radius r of the rocket. A better estimate of k can be obtained by adding the masses of the top and bottom caps of the propellant tank. Assuming the caps are semi-spherical and has the same skin thickness $t_{skin}$, the skin volume $V_{sksph}$ of the two semi-spherical shell regions on the top and the bottom of the propellant tank is, $$V_{sksph} = \frac{4}{3}\pi[r^3 - (r - t_{skin})^3] \quad (7.7)$$

The volume of the cylindrical shell region $V_{skcyl}$ with a height of $h_{cyl}$ and a skin thickness of $t_{skin}$ is, $$V_{skcyl} = \pi h_{cyl}[r^2 - t_{skin})^2] \quad (7.8)$$

The empty mass of the tank becomes, $$m_{tank} = P_{skin}(V_{sksph} + V_{skcyl}) \quad (7.9)$$

Assuming the propellant tank is filled completely prior to launch gives the internal volume of the propellant tank as, $$V_{int}(h) = \pi\left[h_{cyl}(r - t_{skin})^2 + \frac{3}{8}(r - t_{skin})^3\right] \quad (7.10)$$

The propellant mass $m_{prop}$ becomes, $$m_{prop} = p_{oxi}V_{int}(h_{oxi}) + P_{fuel}V_{int}(h_{fuel}) \quad (7.11)$$

Figure 11:
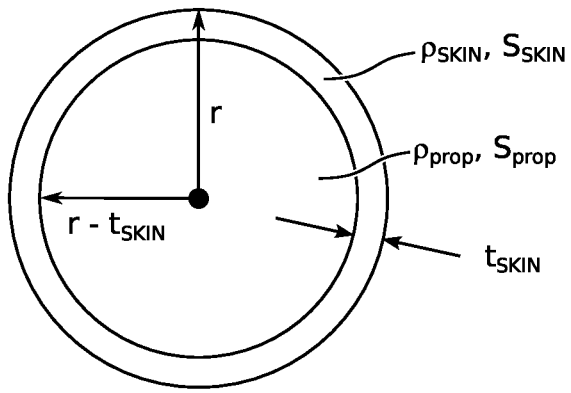
FIG. 11 depicts the skin of a propellant tank.

FIG. 11 depicts the skin of a propellant tank.

Figure 12:
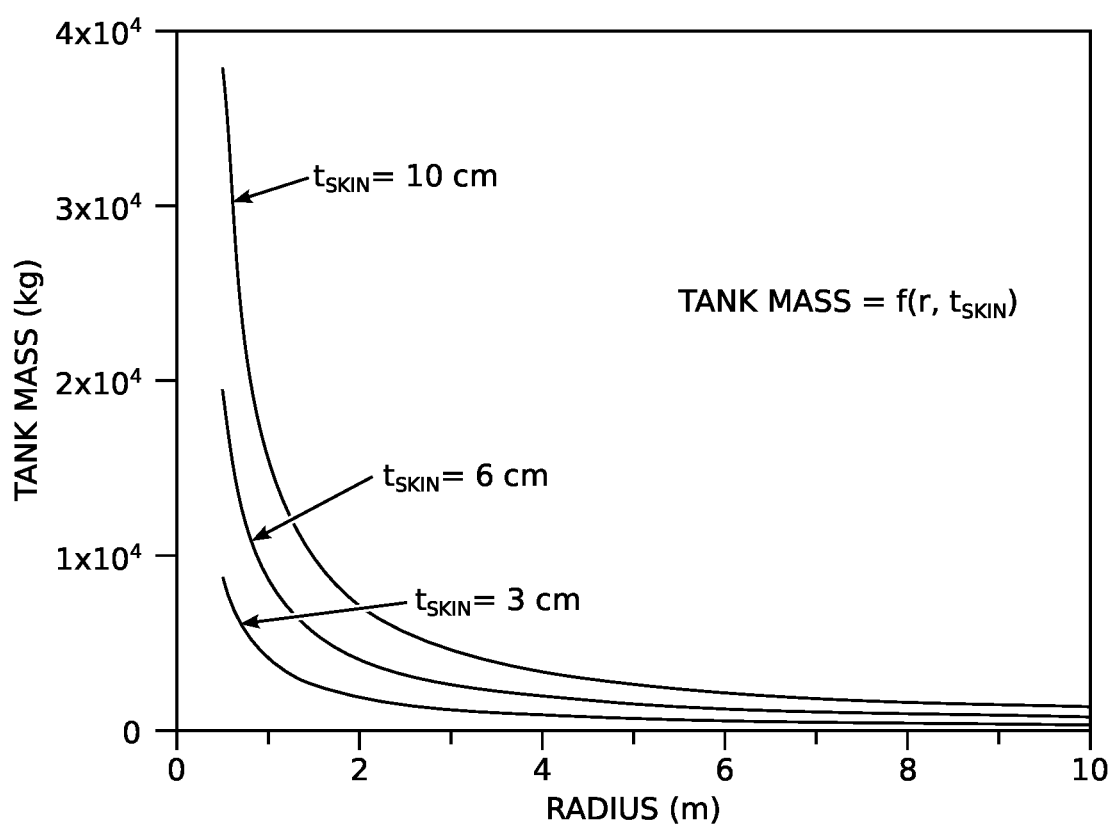
FIG. 12 depicts the mass of the propellant tank m=f (r, $t_{skin}$) for the skin thickness of $t_{skin}$=3, 6, and 10 cm carrying 20 tons of propellant mass.

FIG. 12 depicts the mass of the propellant tank m=f(r, $t_{skin}$) for the skin thickness of $t_{skin}$=3, 6, and 10 cm carrying 20 tons of propellant mass. It is clear from FIG. 12 that the mass of the propellant tank m is inversely proportional to the radius of the propellant tank for a desired volume or mass.

FIG. 13A depicts k=f(r, $t_{skin}$) for an aluminum skin thickness of $t_{skin}$=3, 6, and 10 cm when carrying 20 tons of propellant mass. It is clear from FIG. 13A that k is inversely proportional to the radius of the propellant tank for a desired volume or mass. Section 8 below describes how k determines the maximum altitude that a rocket can reach.

Thrust, $F_T$ and the Remaining Rocket Parameters Calculated from $\mu_f = m_f/m_0$ and $k = m_{tank}/m_{prop}$.

The introduction of the parameter k leads into very elegant solutions for all the rocket parameters and very interesting design relations. Propellant with a mass of $m_{prop}$ in a rocket is stored in a cylindrical tank with a mass of $m_{tank}$. Since most of the rocket mass is propellant mass, most of the volume of the rocket will also be the volume of the propellant tank. Since the density of the propellant is known, it is straightforward to calculate the cylindrical volume of the propellant tank for a given diameter. The mass of the tank can be calculated with a given skin thickness and density of the tank.

$$\mu_f = \frac{m_f}{m_0} = \frac{m_0 - m_{prop}}{m_0} = 1 - \frac{m_{prop}}{m_0} \quad (8.1)$$

Solving $m_{prop}$ from (8.1) gives, $$\frac{m_{prop}}{m_0} = 1 - \mu_f \quad (8.2)$$

The initial mass $m_0$ is related to the thrust $F_T$ given as, $$m_0 = \frac{F_T}{g \cdot T2W} \quad (8.3)$$

Solving $m_{prop}$ from (8.2) gives, $$m_{prop} = m_0(1 - \mu_f) \quad (8.4)$$

Resulting in, $$m_{prop} = \frac{F_T}{g \cdot T2W}(1 - \mu_f) \quad (8.5)$$

With the introduction of the parameter k, the propellant tank mass can be simply related to the propellant mass. Employing the parameter k the initial rocket mass $m_0$ becomes, $$m_0 = m_{prop}(1 + k) + m_{RE} + m_{PAY} \quad (8.6)$$

As can be seen $m_{prop}(1+k)$ term in (8.6) gives the sum of the propellant mass and the mass of the tank with which it is stored. In general, propellant mass also is the main structure of the rocket, everything is basically attached to it, which means that the parameter k determines a significant portion of the rocket mass as a function of the propellant mass which is in the rocket equation.

Another parameter in equation (8.6) is $m_{RE}$, which is the mass of the rocket engine that includes the mass of additional components such as pumps, electronics, guidance, etc. $m_{PAY}$ is the mass of the payload and associated additional mass related to its housing. Substituting (8.5) into (8.6) gives the thrust equation, $$\frac{F_T}{g \cdot T2W} = \frac{F_T}{g \cdot T2W}(1-\mu_f)(1+k) + m_{RE} + m_{PAY} \quad (8.7)$$

Both sides of the equation are equal to the total initial mass $m_0$ and becomes the thrust equation. The thrust $F_T$, required to put a payload $m_{PAY}$ into an altitude of h, equation (8.7) can be solved giving, $$F_T = \frac{g \cdot T2W(m_{RE} + m_{PAY})}{1-(1-\mu_f)(1+k)} \quad (8.8)$$

Relation (8.8) assumes that the rocket has a single rocket engine. Simplifying the denominator gives, $$F_T = \frac{g \cdot T2W(m_{RE} + m_{PAY})}{\mu_f(1+k) - k} \quad (8.9)$$

Since there is only one rocket engine and its thrust and mass are already specified as $F_T$ and $m_{RE}$, solving its thrust does not make much sense, as it is already known. Instead, one can calculate the payload $m_{PAY}$ that the rocket can put to an altitude h with that thrust, $$m_{PAY} = \frac{F_T[\mu_f(1+k) - k]}{g \cdot T2W} - m_{RE} \quad (8.10)$$

Since $F_T$, $m_{PAY} > 0$ and must be finite, the denominator of relation (8.9) puts some important restrictions between $\mu_f$ and k as, $$\mu_f > \frac{k}{(1+k)} \quad (8.11)$$

$$k < \frac{\mu_f}{(1-\mu_f)} \quad (8.12)$$

FIG. 13B depicts the plot of relation (8.12), which gives the minimum value of $k=k_{MAX}$ that needs to be satisfied to give a desired value of $\mu_f$. Since a given value of pf also gives the height $h_{INV2}(\mu_f, T2W)$ that the rocket reaches, a very important relationship exists between the height that the rocket can reach and the $k_{MAX}$ value, as shown in FIG. 13C.

FIG. 13C depicts the height $h_{INV2}(k_{MAX}, T2W)$ function, an important relationship between the height that the rocket can reach and the $k_{MAX}$ value that the rocket design must satisfy, graphically permitting the determination of $k_{MAX}$ for $h_{GIVEN}$ 400 km, 20,200 km, and 400,000 km. As can be seen, reaching a given altitude requires a minimum value of $k_{MAX}$ to be satisfied. The higher the desired altitude, the smaller the value of $k_{MAX}$ that needs to be satisfied. If $k \geq k_{MAX}$, the rocket cannot reach the given altitude, $h_{GIVEN}$ $h_{INV2}(k_{MAX}, T21W)$.

Relations (8.11) and (8.12) give the necessary conditions to be satisfied between them. The solution of the rocket equation for the rocket to reach the desired altitude h for a given T2W gives $\mu_f(h, T2W)$ and (8.12) gives the minimum value of k needed. If this number is not a realizable quantity, then the launch will not be successful, leaving a multi-stage rocket as the only option to employ for a smaller k, which is an original relationship derived herein. If k is already given, then (8.11) gives the maximum value of $\mu_f$ and moreover the maximum altitude the rocket can reach. Since FIG. 13A gives $k=f(r, t_{skin})$, and as shown in FIG. 13C there is a functional relation between $k_{MIN}$ and $h_{INV2}(k_{MIN}, T2W)$, the altitude that the rocket can reach, a functional relationship $h_{INV2}(MIN, T2W)$, the radius of the rocket can be derived which is of interest. In other words, to reach a desired altitude there is a minimum rocket radius $r_{MIN}$ that enables it, which is a function of burn chemistry, density of the oxidizer and fuel, their mix ratios, thickness of skin, its density, and machining. Ideally a value can be given to the denominator of (8.9) which satisfies (8.11) and (8.12).

FIG. 13D depicts the SpaceX Starship Super Heavy (loaded with 3,400 tons of propellant) and the ULA Atlas first stage (loaded with 284 tons of propellant) booster heights with a $t_{skin}$ thickness of 3 [cm] with respective diameters of 9 [m] and 3.81 [m]. The relationship between the booster radius and the booster height is shown in FIG. 13D for the SpaceX Starship Super Heavy and the ULA (United Launch Alliance) first stage of Atlas V for known parameters such as their actual propellant mass and tank parameters. Both curves in FIG. 13D show an excellent fit for rocket booster heights. For the SpaceX Super Heavy the curve gives 71 [m] of booster height with the actual diameter of 9 [m] loaded with 3,400,000 [kg] of propellant mass. For ULA's first stage of Atlas V the curve gives 32.5 [m] of booster height at the actual diameter of 3.81 [m] loaded with 284,089 [kg] of propellant mass.

FIG. 13E depicts $h_{INV2}(r, T2W)$, where r is the rocket diameter of the SpaceX Starship Super Heavy loaded with 3,400 Tons of propellant having $t_{SKIN}=3$ [cm]. FIG. 13E shows the relationship between the SpaceX Starship Super Heavy maximum altitude as a function of its radius loaded with 3,400,000 [kg] of propellant mass and same tank parameters for T2W=1.1, 2, 4, and 8. It is clear that having a larger diameter gives a lower k, resulting in a higher maximum altitude that can be reached. The lowest k can be obtained with a spherical tank geometry giving the smallest area enclosing a given propellant volume.

If the single rocket engine cannot give the desired thrust $F_T$, then several rocket engines must be deployed. For this case the thrust relation (8.9) must be modified. Assuming all the rocket engines have the same mass $m_{PRE}$ (mass Per Rocket Engine) and they all generate the same thrust per engine $F_{TPRE}$, the number of rocket engines $n_{RE}$ can be calculated from the calculated $F_T$. The equivalent rocket engine mass $m_{RE}$ and the total thrust in (8.6) and (8.7) become related to the number of rocket engines that gives the necessity of including this effect. As an example, for cases where the needed thrust $F_T$ is larger than $F_{TPRE}$, the number of rocket engines $n_{RE}$ that is needed becomes, $$n_{RE} = \frac{F_T}{F_{TPRE}} \geq 1 \qquad (8.13)$$

where, $F_{TPRE}$ is the thrust per rocket engine. There can only be an integer number of rocket engines and this number also has to be greater than 1. The number $n_{RE}$ as calculated by relation (8.13) does not necessarily give an integer number. It can even be a number smaller than 1 if the calculated thrust $F_T$ is less than the selected rocket engine thrust $F_{TPRE}$. Therefore, $n_{RE}$ is named the "engine thrust scaling factor" to represent its non-integer value. The engine thrust scaling factor $n_{RE}$ is used to calculate the total equivalent rocket engine mass to match the needed thrust $F_T$. Using $F_{TPRE}$, the corresponding equivalent total rocket engine mass $m_{RE}$, which appears in the $F_T$ thrust relation (8.9) becomes, $$m_{RE} = n_{RE} \cdot m_{PRE} = \frac{F_T}{F_{TPRE}} m_{PRE} \qquad (8.14)$$

A more widely used rocket engine parameter instead of mass per rocket engine $m_{PRE}$ is the thrust-to-weight ratio of the rocket engine $T2W_{PRE}$, a number like 100 to 200, a much larger number than any jet engine. As an example, the jet engine with the highest thrust-to-weight ratio is 8 for the GE J85 powering many airplanes like the F-5 and T-38, giving 13.1 [kN] with a mass of 140 kg (afterburner versions give 22 [kN] with a mass of 230 [kg]). The F-1 rocket engine that powered the Saturn-5 had a thrust-to-weight ratio of 94. This is an important parameter in making the rocket engine selection. Using the $T2W_{PRE}$ parameter the mass per rocket engine can be calculated as, $$m_{PRE} = \frac{F_{TPRE}}{g \cdot T2W_{PRE}} \qquad (8.15)$$

Substituting (8.15) in (8.14) gives, $$m_{RE} = \frac{F_T}{F_{TPRE}} \cdot \frac{F_{TPRE}}{g \cdot T2W_{PRE}} = \frac{F_T}{g \cdot T2W_{PRE}} \qquad (8.16)$$

Substituting (8.16) in (8.7) gives another term with $F_T$ dependency on the right-hand side as, $$\frac{F_T}{g \cdot T2W} = \frac{F_T}{g \cdot T2W}(1 - \mu_f)(1 + k) + \frac{F_T}{g \cdot T2W_{PRE}} + m_{PAY} \qquad (8.17)$$

Arranging (8.16) gives, $$\frac{F_T}{g \cdot T2W}\left[1 - (1 - \mu_f)(1 + k) - \frac{T2W}{T2W_{PRE}}\right] = m_{PAY} \qquad (8.18)$$

As can be seen the thrust equation (8.9) incorporates another parameter involving the ratio between the rocket engine thrust-to-weight number and the rocket thrust-to-weight number. Since rocket mass is larger than the rocket engine mass, and the only thrust in the rocket is given by the rocket engine, this ratio is always given as less than 1 as, $$\frac{T2W}{T2W_{PRE}} < 1 \text{ or } T2W < T2W_{PRE} \qquad (8.19)$$

Solving thrust $F_T$ from the modified thrust equation (8.18) gives, $$F_T = \frac{g \cdot T2W}{\mu_f(1+k) - k - \frac{T2W}{T2W_{PRE}}} m_{PAY} \qquad (8.20)$$

To have $F_T > 0$ and a bounded value for it, the $\mu_f$, k relations derived at (8.11) and (8.12) must be modified as, $$\mu_f > \frac{k + \frac{T2W}{T2W_{PRE}}}{(1+k)} \text{ where } 0 < \mu_{MIN} < \mu_f < 1 \qquad (8.21)$$

and, $$k < \frac{\mu_f - \frac{T2W}{T2W_{PRE}}}{(1 - \mu_f)} \qquad (8.22)$$

For k>0, relation (8.22) enforces, $$\frac{T2W}{T2W_{PRE}} < \mu_f \qquad (8.23)$$

Since $0 < \mu_{MIN} < \mu_f < 1$, it also enforces, $$T2W \ll T2W_{PRE} \qquad (8.24)$$

A condition far "stronger" than the relation given in (8.18), since pf is generally much smaller than 1 for any orbital altitude, can be seen in FIG. 6A, FIG. 7E, FIG. 8, and FIGS. 9A-10B. T2W is a user defined parameter entered into the modified rocket equation, where the best value for the mission is searched. On the other hand, $T2W_{PRE}$ is a given, and just depends on the rocket engine that is selected, not a user defined parameter, the larger the better along with other parameters for selecting the rocket engine. In general, the larger the $T2W_{PRE}$ number, the smaller the ratio is in (8.23) for any given T2W.

As can be seen that the ratio (8.23) also determines the denominator in the thrust relation. Besides satisfying relation (8.22) for k, the numerical value of the denominator D is something which can be optimized for the minimum thrust needed for the mission. The denominator of equation (8.20) can be re-written with the denominator D represented explicitly as, $$F_\tau = \frac{g \cdot T2W}{D} m_{PAY} \qquad (8.25)$$

Where D is, $$\mu_f(1+k) - k - \frac{T2W}{T2W_{PRE}} = D \quad (8.26)$$

Solving k from (8.26) gives, $$k = \frac{\mu_f - D - \frac{T2W}{T2W_{PRE}}}{(1-\mu_f)} \quad (8.27)$$

Since k>0, the upper bound of D becomes, $$0 < D < \left(\mu_f - \frac{T2W}{T2W_{PRE}}\right) < 1 \quad (8.28)$$

As can be seen the denominator D is always less than 1 and relation (8.28) gives an upper bound to T2W as, $$T2W_{MAX} < \mu_f T2W_{PRE} \quad (8.29)$$

As can be seen the inequalities and relations given by (8.22)-(8.29) are very powerful relations. Once μ is solved, the equations give what k and T2W can be used with very simple relations. Setting all the parameters as a function of the calculated value of μ and satisfying (8.27)-(8.29) becomes a simple task. A simple example can demonstrate it as, $$\frac{T2W}{T2W_{PRE}} = 0.25\mu_f \text{ and } D = 0.5\mu_f \quad (8.30)$$

Resulting k becomes, $$k = \frac{\mu_f - 0.5 \cdot \mu_f - 0.25 \cdot \mu_f}{(1-\mu_f)} = \frac{0.25}{(1-\mu_f)}\mu_f \quad (8.31)$$

If this is not realizable, k then defines the need for multi-stage rockets and aids a very easy method of figuring each stage constraint. As can be seen in (8.30) for a realizable k defining a set of targeted $\mu_f$ for each stage becomes a trivial task. Relation (8.29) is thus the key starting point for the rocket design.

To this point the theoretical and engineering aspects of rockets have been explained in a mathematical framework. At this point it is useful to examine actual technical data of some well-known rockets for comparison the calculations that have been made, derived, and formulated.

Historically, the most important rocket is probably the German V-2 of the World War II. The first successful V-2 launch was on $3^{rd}$ of October, 1942 reaching an altitude of 84.5 km. It burned 55 [kg/s] alcohol with 25% water mixture and 68 [kg/s] of Liquid OXygen, LOX. Total burn time was 65 second and it carried a fuel mass was of 3,810 [kg] (%75 Ethanol, %25 Water) and 4,910 [kg] LOX as oxidizer. Its maximum range was 320 [km], reaching 88 [km] altitude, 206 [km] if launched vertically. It carried a 910-1,000 [kg] Amatol high explosive warhead, and more than 3,000 of them were launched.

Space launches are expensive undertakings. An Ariane cost per launch ranges 139,000,000-185,000,000 Euros, depending on the payload and launch orbit.

Table 4B gives some of the dimensional information for well-known rocket boosters.

TABLE 4B specifications for well-known rockets

| Rocket | Engine | Diameter | Height | Dry Mass | Propellant Mass | Burn Time |
|---|---|---|---|---|---|---|
| TITAN II GLV (Gemini Launch Veichle) | LR-87-AJ-1 | 3 m | 33 m | 150 Ton | | 156 s |
| Atlas V First Stage | Enorgamash RD-180 | 3.8 m | 32.5 m | 333 Ton | 284 Ton | 255 s |
| Saturn V First Stage | 5 X F-1 | 10.1 | 42.1 m | 130 Ton | 2,290 Ton | 168 s |
| Space Shuttle SLWT (Super Light Tank) | 3 X Rocketdyne RS-25 + 2 X Thiokol/Pratt-Withney SRB | 8.4 m | 46.9 m | 26.5 Ton | 760 Ton | 510 s |
| Ariene-5 First Stage | Vulcain-2 | 5.4 m | 46-52 m | 777 Ton | | |
| Falcon V1.1 | Merlin | 3.7 m | 68.4 m | 506 Ton | | 180 |
| SpaceX Starship Heavy | Raptor | 9 m | 71 m | 200 Ton | 3,400 Ton | Failed Launch |
| Soyuz First Stage | 4 RD-107 4 X 813 kN | 2.68 | 19.6 | 3,784 kg | 39.2 Ton | 118 s |

Quadratic Convergence Property of Newton's Method for the Solution of the Tsiolkovsky's Rocket Equation in Gravitational Potential and all Related Applications Since Newton's method is used for solving non-linear Tsiolkovsky's Rocket Equation derived for both gravitational field representations and followed by solving non-linear trajectory equations, always having a convergent solution for all these tasks is important. This is handled by applying Kantorovich's theorem to find an initial approximation to the solution which guarantees the quadratic convergence of Newton's method.

No rocket launches are ever completely vertical for reasons of safety reasons, they all have curved trajectories, and analytical solution of the rocket equation is only possible for a vertical flight trajectory in or opposing direction of gravitational force. In orbital launches, including the atmospheric air drag is not as important as the curved trajectory, but becomes very important in re-entry phase, therefore for both applications the numerical methods to solve the complete equation of motion are needed. This work uses specifically designed computer programs for rocket design and its trajectory calculations named "Rocket Designer" and "Orbital Launch" respectively, which are not included herein. In this work equations of motions are solved employing Runge-Kutta method with variable mass formulation to handle the rocket propulsion with an initial approximations obtained from the rocket equation and the use of Kantorovich's theorem derived initial approximations for all the non-linear equation solutions using Newton's method.

The computer program outputs of "Orbital Launch" and "Rocket Designer" are presented and compared to some existing rockets. The "Orbital Launch" program, as its name suggests, can simulate the any orbital launch solving the equation of motion in 3 dimensions using the Runge-Kutta [14-19, 27] method with any given launch parameters in an inverse square gravitational field.

b. Newton's Method of Solving Non-Linear Equations and Kantorovich's Theorem for Guaranteeing Quadratic Convergence.

As can be seen in FIG. 4A-FIG. 9A all the functions generated by the rocket equation for constant acceleration or for the inverse square gravitational field modification made in this work are non-linear functions in $\mu_f$. The bulk of the engineering problem in rocketry is to design a rocket that can reach a given altitude or an orbit with desired orbital parameters and a given payload. This requires the solution of several non-linear equations. The task is to solve the non-linear equations $h_{GIVEN} - h(\mu_f, T2W) = 0$ for the constant acceleration assumption, or $h_{GIVEN} - h_{INV2}(\mu_f, T2W) = 0$ for the inverse square gravitational field assumption for a given T2W. Since the rocket design requires optimization, this task may be done many times.

Conventionally, the solutions are accomplished by graphical methods as explained above. The graphical solution method can be implemented into a computer program by generating n equally spaced sample points in the interval of $\mu_{MIN}$ and $\mu_{MAX}$ and calculating $h(\mu_f, T2W)$ or $h_{INV2}(\mu_f, T2W)$ functions at each sample point k, where $1 \leq k \leq n$. Then the interval is found within $h_{GIVEN}$ resides given as, $h[\mu_f(k), T2W] \leq h_{GIVEN} \, h[\mu_f(k+1), T2W]$ for constant acceleration assumption or $h_{INV2}[\mu_f(k), T2W] \leq h_{GIVEN} \leq h_{INV2}[\mu_f(k+1), T21W]$ if the inverse square gravitational field assumption is employed. The only condition that needs to be satisfied is $h(\mu MIN, T2W) \, h_{GIVEN} \, h(\mu_{MAX}, T2W)$ for constant acceleration assumption or $h_{INV2}(\mu_{MIN}, T2W) \geq h_{GIVEN} \geq h_{INV2}(\mu_{MAX}, T2W)$ if the inverse square gravitational field assumption is employed. For constant acceleration assumption $\mu_{MIN}$ and $\mu_{MAX}$ are $\mu_{MIN} = \delta$ and $\mu_{MAX} = 1$, and for the inverse square gravitational field assumption $\mu_{MIN} = \mu_{ASYM}(T2W) + \delta$ and $\mu_{MAX} = 1$ where $\delta$ is a small enough value to satisfy the given simple conditions as explained above, as well as in Section 6.

Once the interval k, where $1 \leq k \leq n$, and where $h_{GIVEN}$ resides is found, linear interpolation, quadratic, or a cubic spline fit can be performed to get a better approximation of the solution. In this work Newton's method is employed, which gives quadratic convergence if certain conditions are satisfied following the interpolation.

Newton's method is the most widely used non-linear equation solution method and it requires an initial approximation. Also known as Newton-Raphson method, it is based on Taylor's expansion of a non-linear function around an initial approximation. Newton used the method to solve a third order equation, a single non-linear equation, like in this work. Over the years Newton's method was generalized for systems of equations as well. If the initial approximation meets certain criteria, it will converge quadratically, if not it can have a slow rate of convergence, or in some cases, it can even diverge. Like in any iterative method a good initial approximation can eliminate problems related to convergence.

Since every non-linear problem is unique, before going into Newton's method it is necessary to go over the initial approximation methodology employed for the solution of the non-linear equations faced in this work. The methodology is based on a computer program adaptation of the geometrical method of solving non-linear equations. The computer algorithm for solving the equation geometrically $h_{GIVEN} - h(\mu_f, T2W) = 0$ is as follows:

c. Find $\mu_{MIN}$ and $\mu_{MAX}$ where $h(\mu_{MIN}, T2W) > h_{GIVEN}$ and $h(\mu_{MAX}, T2W) < h_{GIVEN}$. This is done by solving the asymptote equation (6.7) with Newton's method to get $\mu_{ASYM}(T2W)$, which is the x intercept of the asymptote along with an arbitrarily defined small enough $\delta$.

ii) Equally divide the region starting from $\mu_{MIN}$ to $\mu_{MAX}$ with n sample points, having $\mu_f(1) = \mu_{MIN}$ and $\mu_f(n) = \mu_{MAX}$. Since for $h(\mu_f, T2W)$ the asymptote for this curve is at $\mu_f = 0$, which $h(\mu_f, T2W) \to +\infty$ for $\mu_f = 0$. This makes it clear that $\mu_{MIN} > 0$. Simply a small enough $\delta$ can be found that gives $h(\mu_{MIN}, T2W) \geq h_{GIVEN}$, which is an important condition to satisfy. Since there is no computational value issue in calculation of $\mu_f = 1$, establishing a value for $\mu_{MAX}$ is more straightforward, therefore setting $\mu_{MAX} = 1$ does not create a computational issue.

iii) Calculate $h(\mu_f, T2W)$ at each sampling point, having $h(1) = h[\mu_f(1), T2W]$ and $h(n) = h[\mu_f(n), T2W]$.

iv) Find the interval k, where $h_{GIVEN}$ resides with $h[\mu_f(k), T2W] \leq h_{GIVEN} \, h[\mu_f(k+1), T2W]$.

v) Apply linear interpolation to calculate the initial approximation of $\mu_f$ at $h_{GIVEN}$ noted as).

The algorithm for solving the equation $h_{GIVEN} - h_{INV2}(\mu_f, T2W) = 0$.

The only difference from the earlier algorithm given is in equally dividing the region starting from $\mu_{MIN}$ to $\mu_{MAX}$ with n sample points, having $\mu_f(1) = \mu_{MIN}$ and $\mu_f(n) = \mu_{MAX}$. The importance of finding a $\mu_{MIN}$, just a small $\delta$ larger then $\mu_{ASYM}(T2W)$ giving $h_{INV2}(\mu_{MIN}, T2W) > h_{GIVEN}$, has been pointed out above in the explanation of FIG. 7F, indicating that the $h_{INV2}(\mu_{MIN}, T2W)$ function becomes non-physical for the interval $0 \leq \mu_f \leq \mu_{ASYM}(T2W)$.

As can be seen having a larger number of sampling points gives a more accurate initial approximation at any point.

Figure 9A:
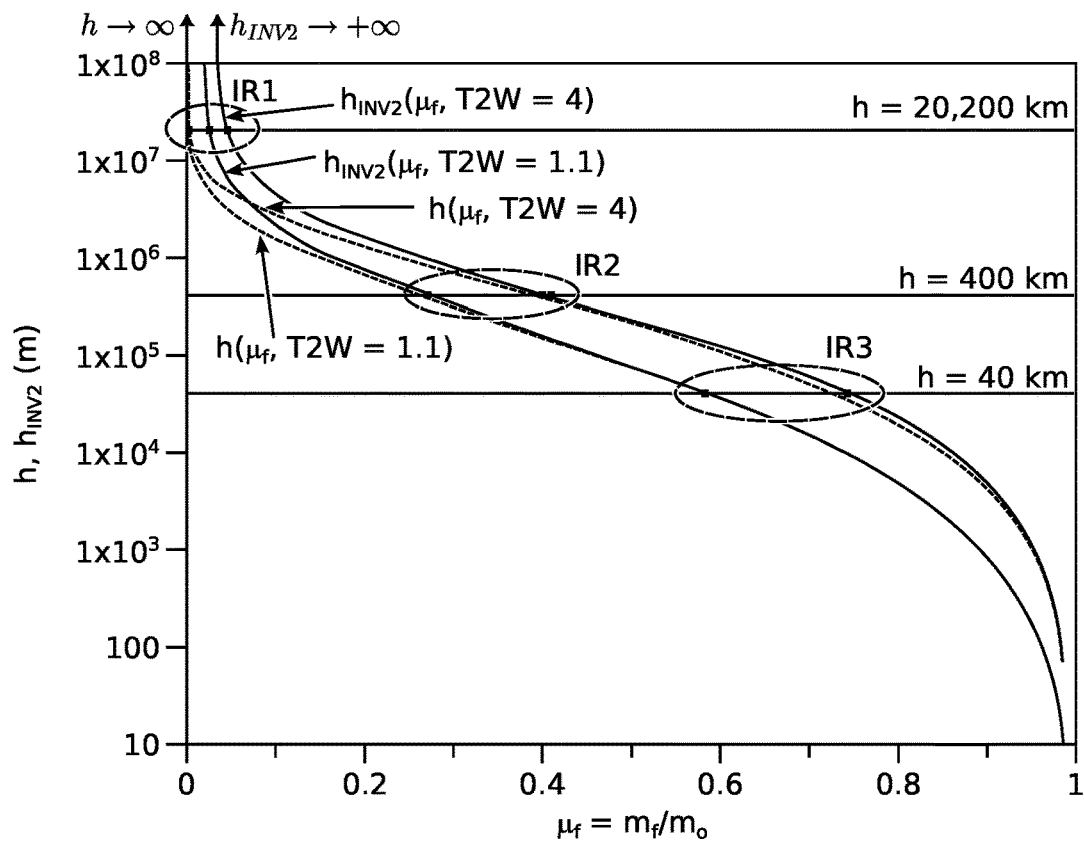
FIG. 9A depicts climb altitude $h_{INV2}(\mu_f, T2W)$ and inverse square gravitational field $h(\mu_f, T2W)$ functions for T2W=1.1 and 4 constructed over 400 uniformly spaced discrete sampling points.

FIG. 9A depicts climb altitude $h_{INV2}(\mu_f, T2W)$ and inverse square gravitational field $h(\mu_f, T2W)$ functions for T2W=1.1 and 4 constructed over 400 uniformly spaced discrete sampling points. The horizontal lines represent $h_{GIVEN}$ 40, 400, and 20,200 km altitudes, where the intersection points of these lines with the functions becomes the geometric solution to $h_{GIVEN} - h_{INV2}(\mu_f, T2W) = 0$ and $h_{GIVEN} - h(\mu_f, T2W) = 0$. At $\mu_f > 0.3$, the $h(\mu_f, T2W)$ and $h_{INV2}(\mu_f, T2W)$ curves become indistinguishable. The Intersection Regions between the functions and $h_{GIVEN}$ lines are circled as IR 1, IR 2, and IR 3.

Figure 9B:
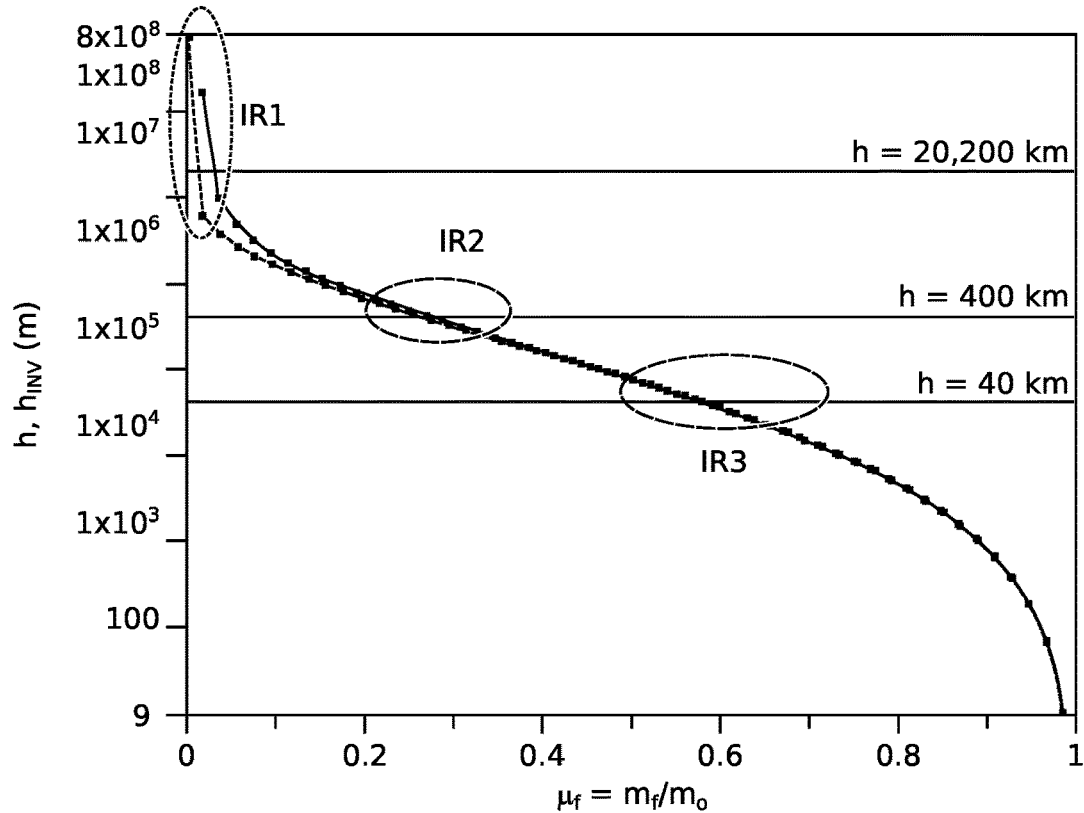
FIG. 9B depicts the functions plotted in FIG. 9A constructed with 40 discrete sampling points marking the curves to show a numerical algorithm for implementing the geometrical solution method in a computer program based on interpolation between the discrete sampling points.

FIG. 9B depicts the functions plotted in FIG. 9A constructed with 40 discrete sampling points marking the curves to show a numerical algorithm for implementing the geometrical solution method in a computer program based on interpolation between the discrete sampling points.

Figure 9C:
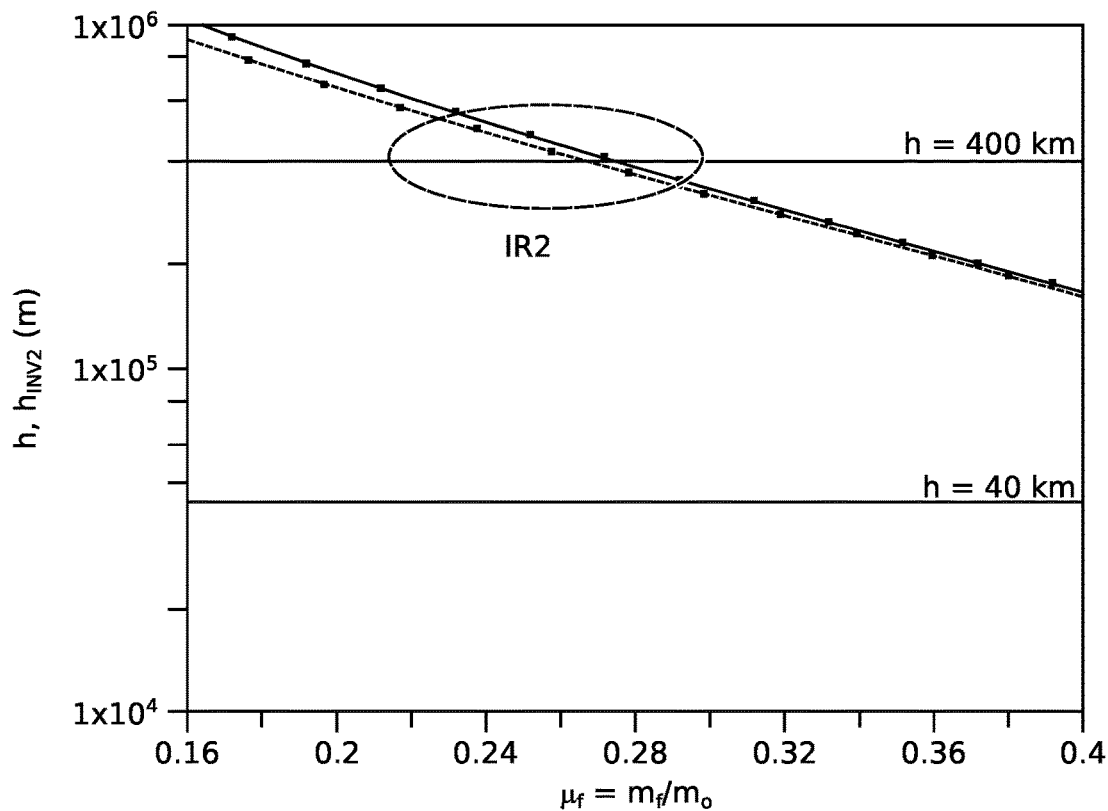
FIG. 9C depicts a detailed view of the IR 2 region showing the discrete sampling points in the neighborhood of intersection with $h_{GIVEN}$=40 km of the $h_{INV2}(\mu_f, T2W=1.1)$ and $h(\mu_f, T2W=1.1)$ functions.
Figure 10A:
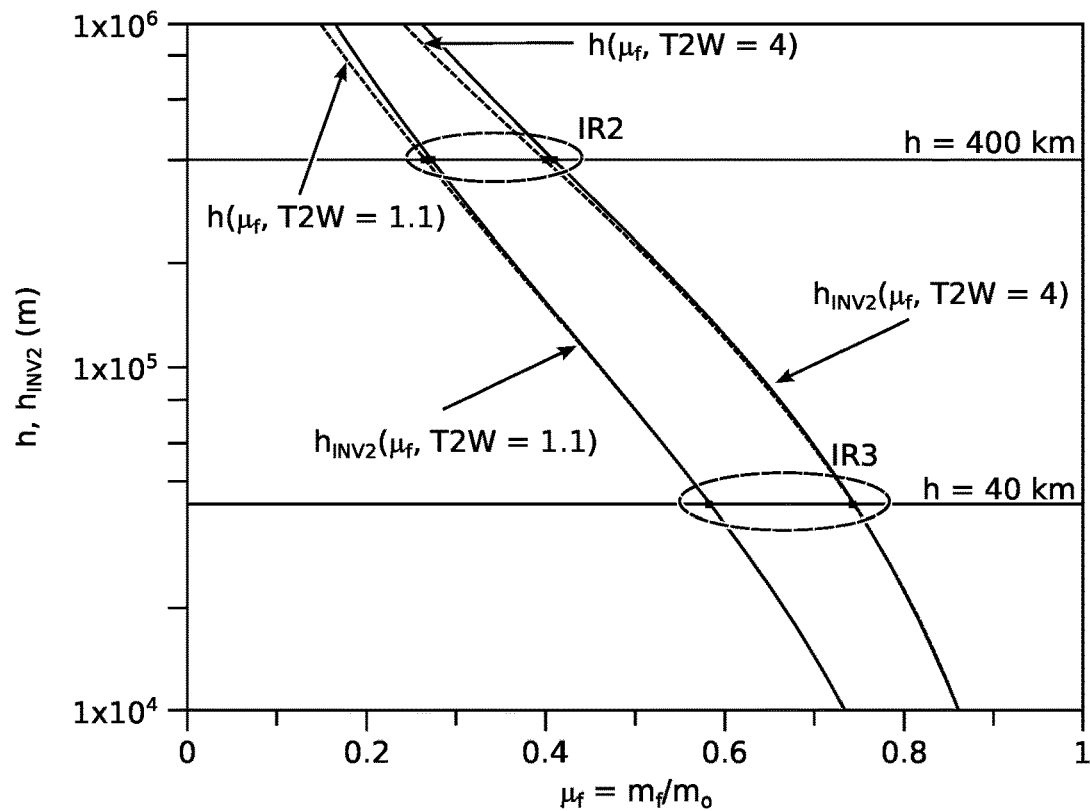
FIG. 10A depicts a detailed view of the IR 1 and IR 2 regions showing discrete sampling points in the neighborhood of intersection between $h_{GIVEN}$=40 km and 400 km for the $h_{INV2}(\mu_f, T2W=1.1)$ and $h(\mu_f, T2W=1.1)$ functions.

FIG. 9C depicts a detailed view of the IR 2 region showing the discrete sampling points in the neighborhood of intersection with $h_{GIVEN} = 40$ km of the $h_{INV2}(\mu_f, T2W=1.1)$ and $h(\mu_f, T2W=1.1)$ functions. FIG. 10A depicts a detailed view of the IR 1 and IR 2 regions showing discrete sampling points in the neighborhood of intersection between $h_{GIVEN} = 40$ km and 400 km for the $h_{INV2}(\mu_f, T2W=1.1)$ and $h(\mu_f, T2W=1.1)$ functions.

Figure 10B:
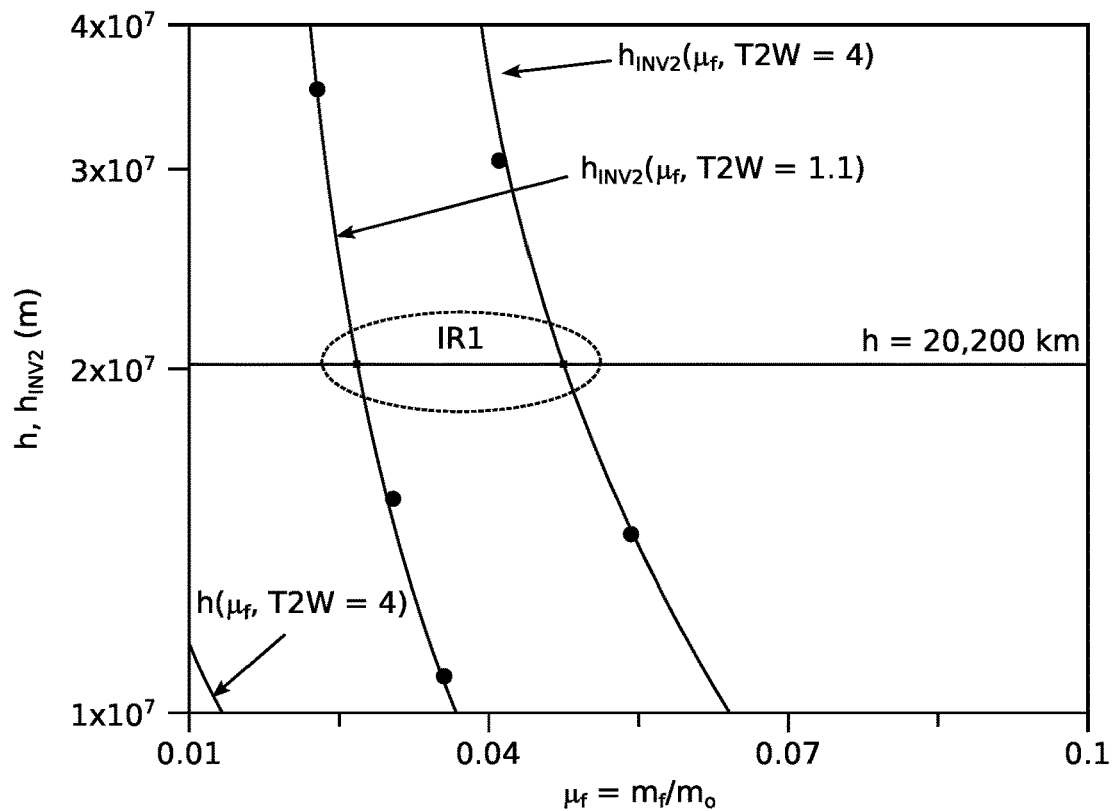
FIG. 10B depicts a detailed view showing discrete sampling points in the neighborhood of the intersection region JR 1 between $h_{GIVEN}$=20,200 km with the $h_{INV2}(\mu_f, T2W=1.1)$ and $h_{INV2}(\mu_f, T2W=4)$ functions.

FIG. 10B depicts a detailed view showing discrete sampling points in the neighborhood of the intersection region IR 1 between $h_{GIVEN} = 20{,}200$ km with the $h_{INV2}(\mu_f, T2W=1.1)$ and $h_{INV2}(\mu_f, T2W=4)$ functions. In the left lower corner, a small portion of the $h(\mu_f, T2W=4)$ function is in the view. The question of finding simple sufficient conditions for the convergence of Newton's method to a solution of a non-linear system was considered a difficult problem of numerical analysis until L. V. Kantorovich published a theorem in 1937 which guarantees the convergence of Newton's method under very general circumstances, without even assuming the existence of a solution [26-30]. Before getting into Kantorovich theorem, it is useful to start with the Newton's method, to prevent any confusion due to the notation [25, 27-30].

In Newton's method for systems of non-linear equations, let the n equations, $$\phi_i(y_1, y_2, \ldots y_n) = 0 \tag{9.1}$$

For the n unknowns $y_1, y_2, \ldots y_n$ are written in vector form as, $$\Phi(Y) = 0 \tag{9.2}$$

Let $A(Y) = \alpha_{i,j}$ denote the matrix with elements, $$a_{i,j} = \frac{\partial \Phi_i(Y)}{\partial y_j} \quad i,j = 1, 2 \ldots n \tag{9.3}$$

If the vector $Y = Y^{(0)}$ is an initial approximation to a solution of the system (9.2) and if the matrix $A[Y^{(0)}]$ is nonsingular, one may hope that the vector, $$Y^{(1)} = Y^{(0)} - (A[Y^{(0)}])^{-1} \Phi[Y^{(0)}] \tag{9.4}$$

Obtained by linearizing the system (9.2) at $Y = Y^{(0)}$ is a better approximation to the solution. If the matrices $A[Y^{(\nu)}]$ involved continue to be nonsingular, one may hope to obtain a sequence of successively better approximations $Y^{(\nu)}$, ($\nu = 1, 2, 3, \ldots$) by the algorithm:

$$Y^{(\nu+1)} = Y^{(\nu)} - A[Y^{(\nu)}]^{-1} \Phi[Y^{(\nu)}] \quad \nu = 1,2,3 \tag{9.5}$$

The vector and matrix norms used in Kantorovich's theorem and throughout are defined as follows: Let V be a vector and $$|V| = \text{Max} |v_i| \text{ where } 1 \le i \le n \tag{9.6}$$

and A be a matrix, $$|A| = \text{Max} \sum_{j=1}^{n} |a_{i,j}| 1 \le i \le n \tag{9.7}$$

In Kantorovich's theorem, assume that the following conditions are satisfied: (i) For $Y = Y^{(0)}$, the initial approximation, the matrix $A(Y^{(0)})$ has an inverse $\Gamma_0 = A(Y^{(0)})^{-1}$ and an estimate of its norm, $$|A^{-1}| = |\Gamma_0| B_0 \tag{9.8}$$

(ii) The vector $Y^{(0)}$ approximately satisfies the system of equations (9.2) in the sense that $$|\Gamma_0 \cdot \Phi(Y^{(0)})| \le \eta_0 \tag{9.9}$$

(iii) In the region defined by inequality (9.12) the vector $\Phi(Y)$ is twice continuously differentiable with respect to components of Y and satisfies $$\sum_{j,k=1}^{n} \left| \frac{\partial^2 \Phi_i}{\partial y_i \partial y_j} \right| \le K \text{ where } i = 1, 2, \ldots, n \tag{9.10}$$

(iv) The constants $\eta_0$, $B_0$, and K introduced above satisfy the inequality, $$h_0 = \eta_0 \cdot B_0 \cdot K \le \frac{1}{2} \tag{9.11}$$

Then the system of equations (9.2) has a solution Y* which is in the cube, $$|Y - Y^{(0)}| \le N(h_0) \cdot \eta_0 = \frac{1 - \sqrt{1 - 2h_0}}{h_0} \tag{9.12}$$

Moreover, successive approximations of $Y^\nu$ defined by (9.5) exist and converge to Y and the rate of convergence may be estimated by the inequality, $$|Y^\nu - Y^*| \le \frac{1}{2^\nu - 1} (2h_0)^{2^\nu - 1} \cdot \eta_0 \tag{9.13}$$

From the application point of view, the most difficult problem is to evaluate the $B_0$ parameter in (9.8) for large systems. $\eta_0$ is the correction vector's maximum magnitude norm for the first iteration and can be calculated very easily whenever Newton's method is applied. K is not a difficult parameter to evaluate, because typically each equation is not a function of a large number of unknowns in any discrete variable method. Therefore, $B_0$ is the parameter that makes the Kantorovich's theorem difficult to apply for large systems of non-linear equations.

Kantorovich's theorem can be applied to a single non-linear equation. Since we are only interested in finding sufficient condition for quadratic convergence for a single non-linear equation, the Kantorovich's theorem can be applied with no difficulty. Let the only non-linear equation that needs to be solved be represented as, $$y(x) = 0 \tag{9.14}$$

where it's first derivative with respect to x is, $$f(x) = \frac{dy}{dx} \tag{9.15}$$

The second derivative of (9.14) with respect to x is, $$g(x) = \frac{d^2y}{dx^2} \tag{9.16}$$

Let $x^{(0)}$ be the initial approximation to the solution and $$|\Gamma_0| = \frac{1}{|f(x^{(0)})|} \leq B_0 \tag{9.17}$$

Similarly, (9.18) becomes the first correction in Newton's method given as, $$\frac{|y(x^{(0)})|}{|f(x^{(0)})|} \leq \eta_0 \tag{9.18}$$

Finally (9.10) takes the form of, $$g(x^{(0)}) = \left|\frac{d^2y}{dx^2}\right| \leq K \text{ at } x = x^{(0)} \tag{9.19}$$

Resulting in the Kantorovich's quadratic convergence criterion for a single non-linear equation becoming, $$h_0 = \eta_0 \cdot B_0 \cdot K = \frac{|y(x^{(0)})|}{|f(x^{(0)})|} \frac{1}{|f(x^{(0)})|} g(x^{(0)}) \leq \frac{1}{2} \tag{9.20}$$

d. Application of the Kantorovich Quadratic Convergence Criteria to the Solution for the Rocket Equation Related Problems As explained in detail above there are three non-linear equations that need to be solved in the rocket related problems. The first one is finding the asymptote x intercept for the inverse square gravitational field formulation given in this work for the rocket equation. This is represented as $\mu_{ASY}(T2W)$, which is the solution of (6.7) explicitly given by (6.8), and which can be written in short with the introduction of a constant $\beta$, where $\beta = 2Gm_{EARTH}$, giving $\beta - r_B(\mu_f) v_B^2(\mu_f) = 0$.

The second non-linear equation is the $h_{GIVEN} - h(\mu_f, T2W) = 0$ equation for constant gravitational acceleration and the third one is $h_{GIVEN} - h_{INV2}(\mu_f, T2W) = 0$, the inverse square gravitational field formulation given in this work for the rocket equation.

The goal is to find an initial approximation of the solution for every non-linear equation encountered in this work which is being solved to satisfy Kantorovich's quadratic convergence criterion.

Finding an initial approximation which satisfies the Kantorovich Quadratic Convergence Criterion for solving $\mu_{ASY}$(T2W) from $$\beta - r_B(\mu_f) v_B^2(\mu_f) = 0 \tag{9.21}$$

The solution of (9.21) corresponds to escape velocity from earth at an altitude of $h_B$. Even at $\mu_f = 0$ $h_B$, as can be seen in FIG. 5A and FIG. 5B, which gives the maximum possible value of $h_B$ for any T2W, it is small compared to the earth radius $r_{EARTH}$. Therefore, the initial approximation of $v_B$ can be closely approximated with escape velocity from the Earth as, $$v_B^{(0)} \cong \sqrt{\frac{2Gm_{EARTH}}{r_{EARTH}}} \tag{9.22}$$

Relation (5.40) which gives the $v_B$ can also be approximated as, $$v_B^{(0)} = v_E\left[\ln\left(\frac{1}{\mu_f}\right) - \frac{(1-\mu_f)}{T2W}\right] \cong v_E \ln\left(\frac{1}{\mu_f}\right) \tag{9.23}$$

for small $\mu_f \ll 1$ as it should be close to zero, where the asymptotes are located which gives an analytically available initial approximation for $\mu_f^{(0)}$ as, $$\mu_f^{(0)} \cong e^{-\frac{v_B^{(0)}}{v_E}} \tag{9.24}$$

Using (9.24) as initial approximation for solving (9.21) satisfies Kantorovich quadratic convergence criterion for solving $\mu_{ASY}$(T2W) for any T2W.

For the other two equations the region starting from $\mu_{MIN}$ to $\mu_{MAX}$ with n sample points, having $\mu_f(1) = \mu_{MIN}$ and $\mu_f(n) = \mu_{MAX}$ is used to find the interval where the solution resides, as it is explained above. The solution is approximated by linear interpolation in the interval and the $h_0 = \eta_0 \cdot B_0 \cdot K$ value is calculated. If $h_0 > 0.5$ the interval is halved until $h_0 \leq 0.5$, before going into Newton's method.

Figure 10C:
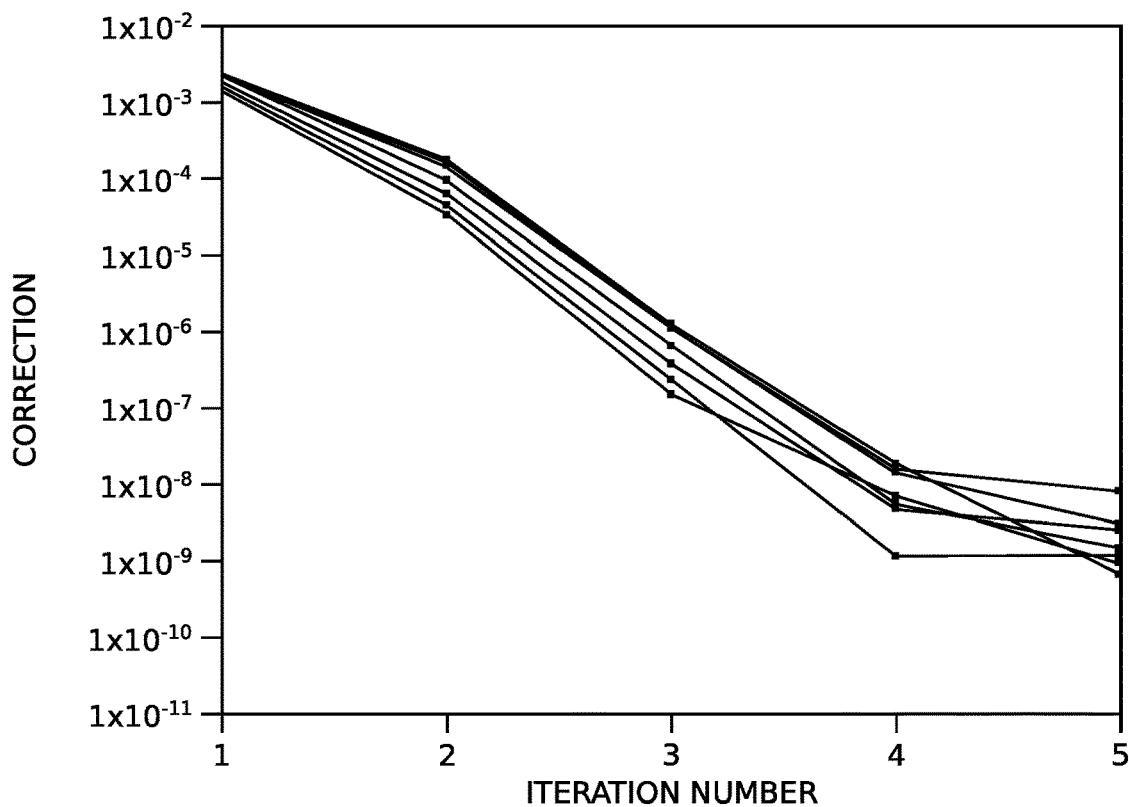
FIG. 10C shows the convergence properties of Newton's method employed in solving rocket equations.

FIG. 10C shows the convergence properties of Newton's method employed in solving rocket equations. As can be seen, the magnitude of the correction terms reduces quadratically with increasing iterations. These very small correction numbers, or in other words, the accuracy in the solution cannot be achieved with interpolation, cubic spline fits, or any other interpolation or search methods. This level of accuracy may potentially be seen as academic, as derived from mathematics. Basically, employing Kantorovich theorem, since the initial approximation to the solution satisfies the quadratic convergence criterion of Newton's method, the solution is obtained in 3-4 iterations.

Since Newton's method requires only the first derivatives of the related non-linear functions and Kantorovich criterion also needs their second derivatives, they both must be calculated at any given if between $\mu_{MIN}$ to $\mu_{MAX}$ for this method to be applied. Analytical derivation of the first and second derivatives can be very cumbersome as can be seen in Sections 10-12. A discrete value representation of the first and second derivatives becomes a lot simpler way of evaluating this method as $$\frac{dy}{dx} = \frac{y_{k+1} - y_{k-1}}{h_k} \tag{9.25}$$

$$\frac{d^2y}{dx^2} = \frac{y_{k+1} - 2y_k + y_{k-1}}{h_k^2} \tag{9.26}$$

where k represents the interval, and y and h are the function values at the sampling points k, k−1, and k+1 and the uniform spacing between the adjacent sampling points respectively [22-30].

e. Fast Algorithm for Approximating the Propellant Mass and Rocket Design Parameters for an Orbital Launch in "Rocket Designer"

Solving Tsiolkovsky's Rocket Equation derived for both gravitational field representations gives the propellant mass and the initial thrust needed with a given thrust to weight ratio at the pad to launch a space craft to a given altitude for a vertical launch. The orbital launch trajectory is never vertical, it is curved and therefore the solution of the Tsiolkovsky's Rocket Equation is more an approximation.

Since relation (1.1) states that the energy of an orbiting spacecraft at a radius $r_{ORBIT}$ is equal to the spacecraft launched to $r_0 = 2 \cdot r_{ORBIT}$, solving Tsiolkovsky's Rocket Equation for $r_0$ will give the "minimum" propellant mass and thrust needed to put the spacecraft into orbit with better accuracy compared to prior approximations.

FIG. 13F to FIG. 13O give $4^{th}$ order Runge-Kutta numerical solutions of the equation of motion results for various launch conditions to illustrate the disclosed method with real and popular examples. In FIGS. 13F, 13H, 13L and 13M the rocket parameters like thrust, total and propellant mass, are calculated from very primitive physical and design parameters like given exhaust gas velocity $v_E$, T2W ratios and for k=0.01 launching a payload of 1,000 [kg] using Tsiolkovsky's Rocket Equation for inverse square law modification explained in this disclosure. As can be seen, even for launch altitudes many times larger than Earth's radius, reaching 50,000 [km] Tsiolkovsky's Rocket Equation with inverse square law modification gives excellent match with Runge-Kutta numerical simulations.

FIG. 13F and FIG. 13H depicts a strait launch of the payload to a given altitude, not an orbital launch!

FIG. 13G depicts propellant and total mass as a function of time for launching 1,000 [kg] of payload to 40 [km] altitude for T2W=1.1 and 4, k=0.01. As can be seen, since the burn rate is constant in all simulations showing the propellant and total mass versus time plots decreases linearly with time and is a function of T2W. In all other propellant and total mass as a function of time plots, the x axes of the plots are in logarithmic scale to make comparison between cases easier.

The Analytical Calculation of the First Derivatives of the Functions Derived in the Rocket Equation Under Constant Acceleration Inverse Square Law Gravitational Field.

There are four functions of interest namely $v_B(\mu_f)$, $h_B(\mu_f)$, $h_C(\mu_f)$ and $h(\mu_f)$ that all are functions of $\mu_f$ and that need to be differentiated with respect to $\mu_f$ in applying Newton's method for the solution. The $v_B(\mu_f)$ relation given in (5.40) has two terms in the square bracket with each a function of $\mu_f$. The first term in the bracket of the $v_B$ expression given at (5.40) is, $$\ln\left(\frac{1}{\mu_f}\right) \tag{10.1}$$

Applying the basic differentiation rule of, $$\frac{d}{d\mu_f}[\ln(u)] = \frac{1}{u}\frac{du}{d\mu_f} \tag{10.2}$$

to (10.1) with the following variable transformation, $$u = \frac{1}{\mu_f} \tag{10.3}$$

Along, $$\frac{du}{d\mu_f} = -\frac{1}{\mu_f^2} \tag{10.4}$$

Resulting in, $$\frac{d}{d\mu_f}\left[\ln\left(\frac{1}{\mu_f}\right)\right] = \mu_f\left(-\frac{1}{\mu_f^2}\right) = -\frac{1}{\mu_f} \tag{10.5}$$

The differentiation of the second term in the bracket given in (5.40) is straightforward and need not be shown, resulting in the final differentiation being, $$\frac{dv_B}{d\mu_f} = v_E\left(\frac{1}{T2W} - \frac{1}{\mu_f}\right) \tag{10.6}$$

As can be seen there are four terms in the bracket of (5.59) that give $h_B$. All four terms must be differentiated with respect to p and summed up. The first and third terms in the bracket of (5.59) are 1 and $-\mu_f$, and their derivatives with respect to p are 0 and −1 respectively. The second term in the bracket of (5.59) can be differentiated by "differentiation of a product" rule giving, $$\frac{d}{d\mu_f}\left[\mu_f\ln\left(\frac{1}{\mu_f}\right)\right] = \ln\left(\frac{1}{\mu_f}\right) - \mu_f\left(-\frac{1}{\mu_f}\right) \tag{10.7}$$

Giving, $$\frac{d}{d\mu_f}\left[\mu_f\ln\left(\frac{1}{\mu_f}\right)\right] = \ln\left(\frac{1}{\mu_f}\right) + 1 \tag{10.8}$$

The last term in (5.57) can be differentiated with respect to $\mu_f$ as, $$\frac{d}{d\mu_f}\left[\frac{1}{2}\frac{(1-\mu_f)^2}{T2W}\right] = -\frac{(1-\mu_f)}{T2W} \tag{10.9}$$

Finally, the sum of the four differentials gives, $$\frac{dh_B}{d\mu_f} = \frac{v_e^2}{g \cdot T2W}\left[\frac{(1-\mu_f)}{T2W} - \ln\left(\frac{1}{\mu_f}\right)\right] \tag{10.10}$$

Differentiation of $h_C$ as given in (5.65) is straightforward giving, $$\frac{dh_C}{d\mu_f} = \frac{v_E}{g} v_B \frac{dv_B}{d\mu_f} = v_B \frac{v_e^2}{g}\left(\frac{1}{T2W} - \frac{1}{\mu_f}\right) \quad (10.11)$$

Finally, differentiation of h as given in (5.66) can be written as the sums of (10.10) and (10.11) giving, $$\frac{dh}{d\mu_f} = \frac{dh_B}{d\mu_f} + \frac{dh_C}{d\mu_f} \quad (10.12)$$

Derivatives for the inverse square law height $h_{INV}$ and radius $r_{hINV}$ with respect to $\mu_f$ are more complex, but still analytically available.

The Analytical Calculation of the First Derivatives of the Functions Derived in the Rocket Equation Under the Inverse Square Law Gravitational Field.

Next, the first derivatives of the functions derived in the rocket equation under inverse square law gravitational field can be found. Re-writing (6.6) in short form and showing the explicit if dependency is, $$r_{hINV}(\mu_f) = \beta \frac{r_B(\mu_f)}{\beta - r_B(\mu_f)v_B^2(\mu_f)} \quad (11.1)$$

Where $\beta$ is, $$\beta = 2Gm_{EARTH} \quad (11.2)$$

The expression $r_{hINV}(\mu_f)$ in (11.1) is a function of 2 variables, where both variables are functions of $\mu_f$, explicitly given at (4.40) and (4.59), where the relation between $r_B$ and $h_B$ is given in (5.52).

$$r_{hINV}(\mu_f) = f(r_B, v_B) \text{ where } r_B(\mu_f) \text{ and } v_B(\mu_f) \quad (11.3)$$

Using the Leibnitz's chain rule for 2 variables $r_B$ and $v_B$ greatly reduces the complexity of differentiation with respect to $\mu_f$, compared to explicitly writing the $r_{hINV}(\mu_f)$ by substituting the open forms $r_B(\mu_f)$ and $v_B(\mu_f)$ in (11.3) and differentiating it. Leibnitz's chain rule for 2 variables $r_B$ and $v_B$ can be written as, $$\frac{dr_{hINV}}{d\mu_f} = \frac{\partial r_{hINV}}{\partial r_B}\frac{dr_B}{d\mu_f} + \frac{\partial r_{hINV}}{\partial v_B}\frac{dv_B}{d\mu_f} \quad (11.4)$$

Since derivatives of $v_B$ and $h_B$ with respect to $\mu_f$ are already given at (10.6) and (10.10), and the derivative of $h_B$ is equal to the derivative of $r_B$ with respect to $\mu_f$ as given in (6.3), the partial derivatives at (11.4) can be calculated with standard differentiation rules for divisional functions.

The dominator of (11.1) and its derivative with respect to $r_B$ are, $$dom = \beta r_B \quad (11.5)$$

$$\frac{\partial dom}{\partial r_B} = \beta \quad (11.6)$$

the denominator of (11.1) P and its derivative with respect to $r_B$ are, $$P = \beta - r_B v_B^2 \quad (11.7)$$

$$\frac{\partial P}{\partial r_B} = -v_B^2 \quad (11.8)$$

Using the standard differentiation rule for a division gives, $$\frac{\partial r_{hINV}}{\partial r_B} = \frac{\frac{\partial dom}{\partial r_B}P - \frac{\partial P}{\partial r_B}dom}{P^2} \quad (11.9)$$

Explicitly (11.9) is, $$\frac{\partial r_{hINV}}{\partial r_B} = \frac{\beta(\beta - r_B v_B^2) + \beta r_B v_B^2}{(\beta - r_B v_B^2)^2} \quad (11.10)$$

Finally resulting in, $$\frac{\partial r_{hINV}}{\partial r_B} = \frac{\beta^2}{(\beta - r_B v_B^2)^2} = \frac{\beta^2}{P^2} \quad (11.11)$$

Similarly, derivatives of the dominator and denominator with respect to $v_B$ are, $$\frac{\partial dom}{\partial v_B} = 0 \quad (11.12)$$

$$\frac{\partial P}{\partial v_B} = -2r_B v_B \quad (11.13)$$

$$\frac{\partial r_{hINV}}{\partial v_B} = \frac{2r_B v_B}{P^2} \quad (11.14)$$

Explicitly (11.14) becomes, $$\frac{\partial r_{hINV}}{\partial v_B} = \frac{2r_B v_B}{(\beta - r_B v_B^2)^2} = \frac{2r_B v_B}{P^2} \quad (11.15)$$

Applying the chain rule (11.4) explicitly gives, $$\frac{dr_{hINV}}{d\mu_f} = \frac{1}{P^2}\left(\beta^2 \frac{dr_B}{d\mu_f} + 2r_B v_B \frac{dv_B}{d\mu_f}\right) \quad (11.16)$$

where the derivatives of $v_B$ and $h_B$ are given in (10.6) and (10.10) respectively and substituting the relation (6.3) in (11.16) gives, $$\frac{dr_{hINV}}{d\mu_f} = \frac{1}{P^2}\left(\beta^2 \frac{dh_B}{d\mu_f} + 2r_B v_B \frac{dv_B}{d\mu_f}\right) \quad (11.17)$$

where every term in (11.18) is an explicitly derived function of $\mu_f$.

f. The Analytical Calculation of the First Derivative Needed for Solving the Asymptote Location $\mu_{ASY}$ in the Rocket Equation Under the Inverse Square Law Gravitational Field.

For solving the $\mu_{ASY}$, where the asymptote is located, on the horizontal axes of $r_B(\mu_f)$ curve giving $r_{hINV} \rightarrow \infty$, the denominator of (11.17) noted as $P^2$ must be equated to zero, giving the equation to be solved as, $$\beta - r_B(\mu_{ASY}) v_B{}^2(\mu_{ASY}) = 0 \quad (11.18)$$

To apply Newton's method to solve (11.18) needed is the first derivative of, $$P(\mu_f) = \beta - r_B(\mu_f) v_B{}^2(\mu_f) \quad (11.19)$$

and must be evaluated with respect to $\mu^f$. Applying Leibnitz's chain rule for 2 variables, this time the function to be differentiated with respect to $\mu_f$ is represented as $P(r_B, v_B)$, $$P(r_B, v_B) \text{ where } r_B(\mu_f) \text{ and } v_B(\mu_f) \quad (11.20)$$

$$\frac{\partial P}{\partial r_B} = -v_B^2 \quad (11.21)$$

and $$\frac{\partial P}{\partial v_B} = -2v_B r_B \quad (11.22)$$

Giving Leibnitz's chain rule for 2 variables as, $$\frac{dP}{d\mu_f} = \frac{\partial P}{\partial r_B}\frac{dr_B}{d\mu_f} + \frac{\partial P}{\partial v_B}\frac{dv_B}{d\mu_f} \quad (11.23)$$

where the derivatives of $r_B$ and $v_B$ are given in (10.6) and (10.10) respectively.

Substituting the calculated partial derivatives in (11.23) becomes explicitly, $$\frac{dP}{d\mu_f} = -v_B^2 \frac{dr_B}{d\mu_f} - 2v_B r_B \frac{dv_B}{d\mu_f} \quad (11.24)$$

Again, substituting the relation (5.3) in (11.24) gives'

$$\frac{dP}{d\mu_f} = -v_B^2 \frac{dh_B}{d\mu_f} - 2v_B r_B \frac{dv_B}{d\mu_f} \quad (11.25)$$

where every function and derivative in (11.25) is an explicitly derived function of $\mu_f$.

The Analytical Calculation of the Second Derivatives of the Functions Derived in the Rocket Equation Under Constant Acceleration and the Inverse Square Law Gravitational Field.

The second derivatives are important for applying the Kantorovich's theorem which guarantees the quadratic convergence of the Newton's method if it is met [26-28].

$$\frac{d^2 h_B}{d\mu_f^2} = \frac{v_e^2}{g \cdot T2W}\left(\frac{1}{\mu_f} - \frac{1}{T2W}\right) \quad (12.1)$$

$$\frac{d^2 h_C}{d\mu_f^2} = \frac{v_e^2}{g}\left[\frac{dv_B}{d\mu_f}\left(\frac{1}{T2W} - \frac{1}{\mu_f}\right) + \frac{v_B}{\mu_f^2}\right] \quad (12.2)$$

$$\frac{d^2 h}{d\mu_f^2} = \frac{d^2 h_B}{d\mu_f^2} + \frac{d^2 h_C}{d\mu_f^2} \quad (12.3)$$

$$\frac{d^2 v_B}{d\mu_f^2} = \frac{v_E}{\mu_f^2} \quad (12.4)$$

The second derivative is needed for solving the asymptote location $\mu_{ASY}$ in the rocket equation under the inverse square law gravitational field. Differentiating (11.25) with respect to $\mu_f$, $$\frac{\partial^2 P}{\partial \mu_f^2} = \frac{\partial}{\partial \mu_f}\left(-v_B^2 \frac{dh_B}{d\mu_f} - 2v_B r_B \frac{dv_B}{d\mu_f}\right) \quad (12.5)$$

$$\frac{\partial^2 P}{\partial \mu_f^2} = \frac{\partial}{\partial \mu_f}(A + B) = \frac{\partial A}{\partial \mu_f} + \frac{\partial B}{\partial \mu_f} \quad (12.6)$$

$$A = -v_B^2 \frac{dh_B}{d\mu_f} \quad B = -2r_B v_B \frac{dv_B}{d\mu_f} \quad (12.7)$$

$$\frac{\partial A}{\partial \mu_f} = -2v_B \frac{dv_B}{d\mu_f}\frac{dh_B}{d\mu_f} - v_B^2 \frac{d^2 h_B}{d\mu_f^2} \quad (12.8)$$

$$\frac{\partial B}{\partial \mu_f} = -2v_B \frac{dr_B}{d\mu_f}\frac{dv_B}{d\mu_f} - 2r_B \frac{dv_B}{d\mu_f}\frac{dv_B}{d\mu_f} - 2v_B r_B \frac{d^2 v_B}{d\mu_f^2} \quad (12.9)$$

$$\frac{\partial B}{\partial \mu_f} = -2v_B \frac{dh_B}{d\mu_f}\frac{dv_B}{d\mu_f} - 2r_B \frac{dv_B}{d\mu_f}\frac{dv_B}{d\mu_f} - 2v_B r_B \frac{d^2 v_B}{d\mu_f^2} \quad (12.10)$$

where every function and derivative in (12.8) and (12.10) is an explicitly derived function of pf previous to calculating (12.6).

$$\frac{\partial^2 P}{\partial \mu_f^2} = \frac{\partial A}{\partial \mu_f} + \frac{\partial B}{\partial \mu_f} \quad (12.11)$$

The open form of the second derivative of (11.18) with respect to $\mu_f$ can be written as, $$\frac{\partial^2 r_{hINV}}{\partial \mu_f^2} = \frac{\partial}{\partial \mu_f}\left[\frac{1}{P^2}\left(\beta^2 \frac{dh_B}{d\mu_f} + 2r_B v_B \frac{dv_B}{d\mu_f}\right)\right] \quad (12.12)$$

Symbolically (12.12) can be written as, $$\frac{\partial^2 r_{hINV}}{\partial \mu_f^2} = \left(\frac{\partial Q}{\partial \mu_f} + \frac{\partial R}{\partial \mu_f}\right) \quad (12.13)$$

where $\alpha(r_B, v_B)$ and $\beta$ are constants, $$Q = \beta^2 \left(\frac{1}{P^2}\frac{dh_B}{d\mu_f}\right) \quad (12.14)$$

$$\frac{\partial Q}{\partial \mu_f} = \beta^2 \left(-\frac{2}{P^3}\frac{dP}{d\mu_f}\frac{dh_B}{d\mu_f} + \frac{1}{P^2}\frac{d^2 h_B}{d\mu_f^2}\right) \quad (12.15)$$

The derivative of P with respect to $\mu_f$ in (12.15) is already given in (11.25) as, $$\frac{\partial P}{\partial \mu_f} = -v_B^2 \frac{dh_B}{d\mu_f} - 2v_B r_B \frac{dv_B}{d\mu_f} \quad (12.16)$$

Making it readily available.

$$R = 2 \frac{\partial}{\partial \mu_f}\left(\frac{1}{P^2} r_B v_B \frac{dv_B}{d\mu_f}\right) \quad (12.17)$$

The differentiation in the parenthesis in (12.17) has 4 terms as multipliers which are all functions of $\mu_f$, therefore splitting it as, $$Z = r_B v_B \frac{dv_B}{d\mu_f} \quad (12.18)$$

$$\frac{\partial R}{\partial \mu_f} = 2\left(-\frac{2}{P^3}\frac{dP}{d\mu_f}Z + \frac{1}{P^2}\frac{\partial Z}{\partial \mu_f}\right) \quad (12.19)$$

$$\frac{\partial Z}{\partial \mu_f} = v_B \frac{\partial r_B}{\partial \mu_f}\frac{dv_B}{d\mu_f} + r_B \frac{\partial v_B}{\partial \mu_f}\frac{dv_B}{d\mu_f} + r_B v_B \frac{d^2 v_B}{d\mu_f^2} \quad (12.20)$$

$$\frac{\partial Z}{\partial \mu_f} = v_B \frac{\partial h_B}{\partial \mu_f}\frac{dv_B}{d\mu_f} + r_B \frac{\partial v_B}{\partial \mu_f}\frac{dv_B}{d\mu_f} + r_B v_B \frac{d^2 v_B}{d\mu_f^2} \quad (12.21)$$

All the needed terms in (12.13) are given and the second derivative of $r_{hINV}$ can be calculated summing up (12.15) and (12.19).

Rocket Assisted Descent "Orbital Descent" Program

The rocket assisted descent is controlled by 4 parameters. Before going into the parameters, it is useful to re-write the descent algorithm given in (1.1) as, $$r_h = s_f r_{ORBIT} \text{ where } 1.1 \leq s_f < 2 \quad (13.1)$$

The spacecraft or satellite is launched to a radius of $r_h$ defined by the scaling factor $s_f$, giving (13.1) always greater than $r_{ORBIT}$. There are an infinite number of trajectories for rocket assisted descent from a radius of $r_h = s_f r_{ORBIT}$ to $r_{ORBIT}$ having the satellite velocity vector magnitude equal to the orbital velocity $v_{ORBIT}$ and at the same time being tangent to the desired orbital trajectory.

The rocket assisted descent is controlled by thrust of the descent rocket $F_D$ (see FIGS. 20A-20C), the descent direction of the thrust referenced to radial direction $\alpha_{FD}$, burn time of the descent thruster $T_{BD}$, and radius rd at which descent rocket is fired. As an example, the spacecraft or satellite can first descend straight down from $r_h$ to a certain radius rd (FIG. 20B or 20C) satisfying, $$r_d > r_{ORBIT} \quad (13.2)$$

During this straight descent towards earth the spacecraft or satellite, referred to herein as a payload, picks up speed only in radial direction towards the earth. Then, the rocket fires at a given direction referenced to radial direction symbolized as $\alpha_F$ with a thrust of $F_D$ and descent burn time $T_{BD}$, such that after a distance it falls on the orbital trajectory with orbital velocity $v_{ORBIT}$ is also tangent to the desired orbital trajectory. Finding the most energy efficient set of 4 variables for a set of scaling factor $s_f$, is the challenging mathematical problem which is solved by the program Orbital Descent.

Figure 15:
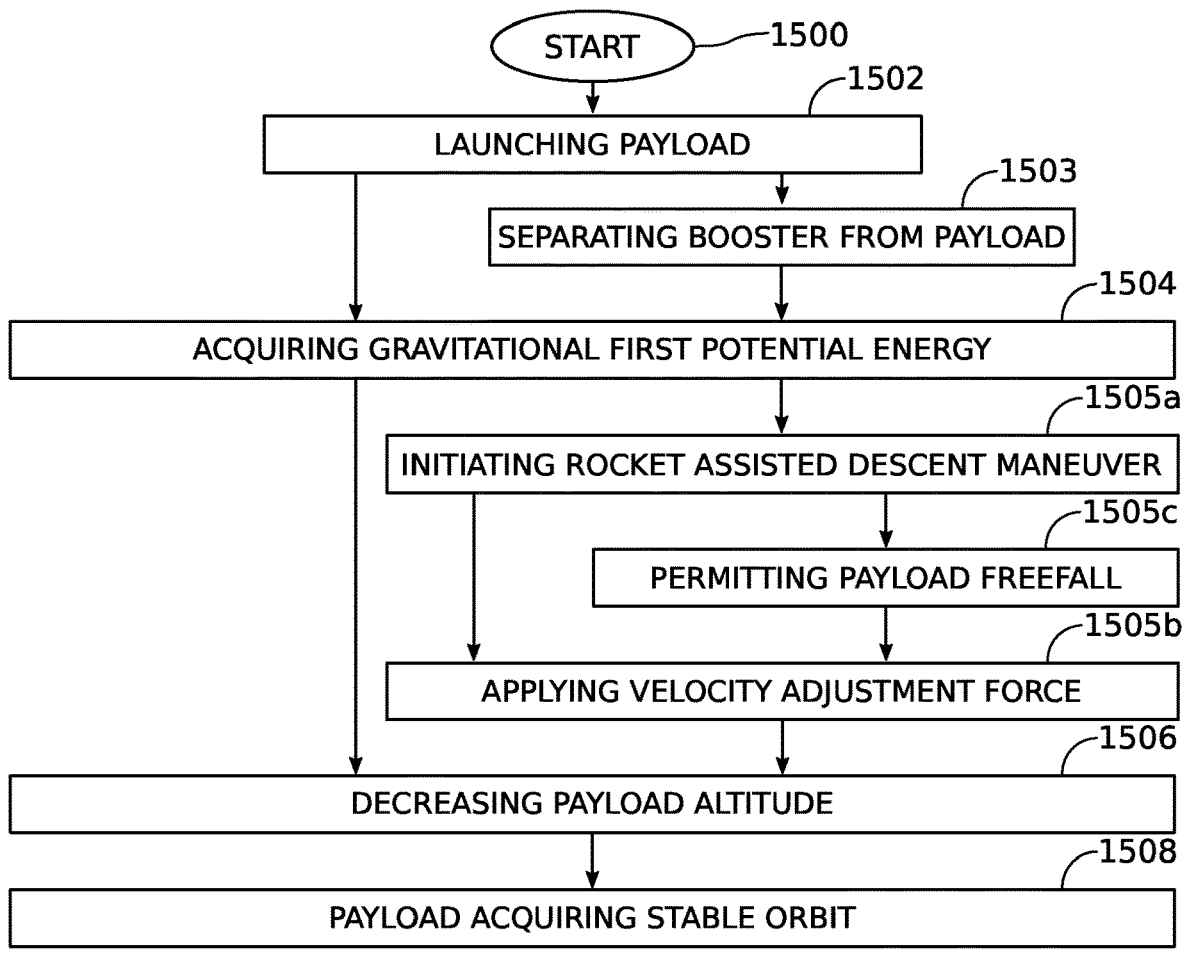
FIG. 15 is a flowchart illustrating a method for efficient orbital launch trajectories.

FIG. 15 is a flowchart illustrating a method for efficient orbital launch trajectories. The method is supported by the explanations and drawings described above. In some aspects, some the methods steps may be performed of the depicted order, or performed simultaneous with other steps. The method begins at Step 1500.

Figure 14:
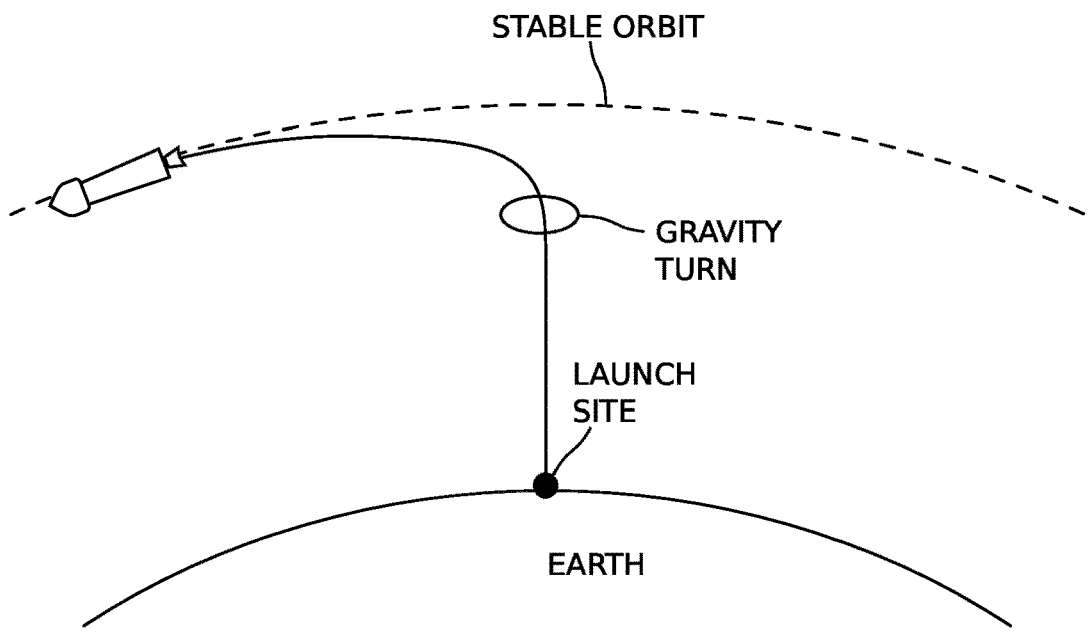
FIG. 14 depicts a rocket being launched into orbit using a conventional pitchover or gravity turn maneuver (prior art).

Step 1502 launches a payload as high as to a first radius ($r_0$) altitude, with respect to the center of the Earth, which is associated with a first altitude defined with respect to sea level. One advantage to this method is that the velocity needed to acquire the first radius altitude is not limited to a specific range of values. Unlike conventional launch methods that typically require hypersonic speeds to acquire a stable orbit (see FIG. 14), the rocket in the method described herein can be launched at the lowest velocity needed to acquire the initial (e.g., first) radius, which reduces wear-and-tear and minimizes failed launches. In Step 1504 the payload attains a gravitational first potential energy at the first radius ($r_0$). In Step 1506 the payload altitude decreases in response to a gravitational pull of the Earth. In Step 1508 the payload attains a stable orbit around the Earth to a second radius ($r_{ORBIT}$), with respect to the center of the Earth, which is associated with a second altitude defined with respect to sea level. As used herein, the term "payload" is defined as the object (e.g., spacecraft, satellite, or satellite with attached rocket) that ultimately attains the stable orbit at the second radius altitude.

Figure 16:
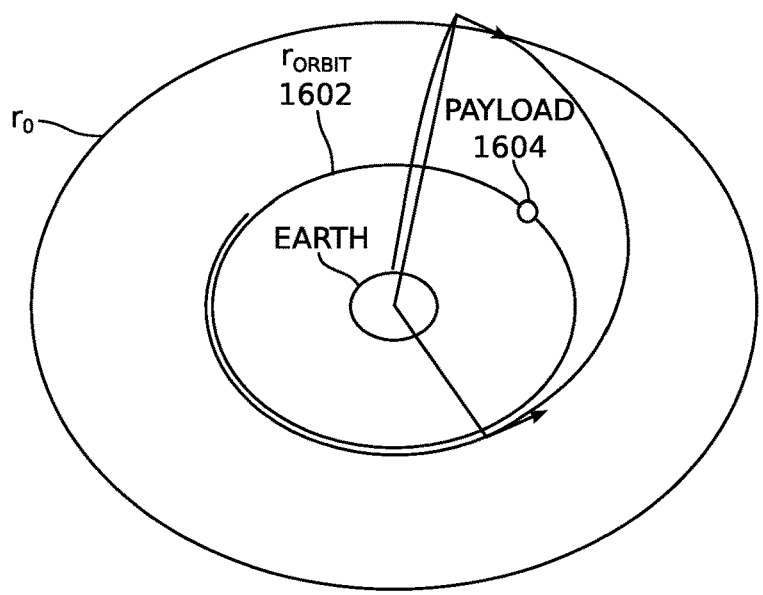
FIG. 16 is a drawing depicting the relationship between the first radius ($r_0$), second radius ($r_{ORBIT}$), the payload, and the Earth.

FIG. 16 is a drawing depicting the relationship between the first radius ($r_0$) 1600, second radius ($r_{ORBIT}$) 1602, the payload 1604, and the Earth 1606. In one aspect the payload is launched in Step 1502 to a first radius twice as high as the second radius, where the payload acquires a gravitational first potential energy. Then, in Step 1508 the payload acquires a total energy that is equal to the sum of its second potential energy and its kinetic energy (orbital velocity), which is also equal to the gravitational first potential energy.

Figure 17:
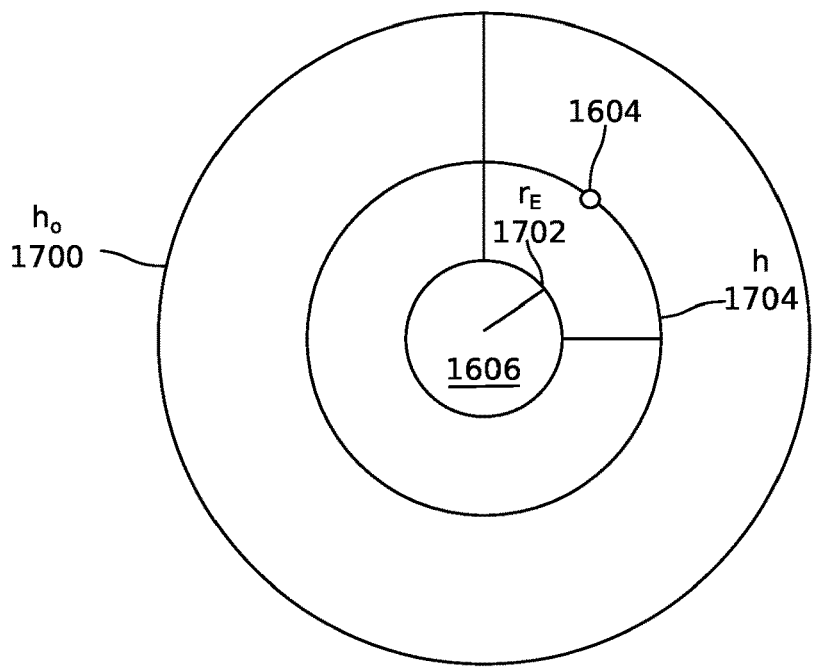
FIG. 17 is a diagram depicting the relationships shown in FIG. 16, as referenced to Earth's sea level.

FIG. 17 is a diagram depicting the relationships shown in FIG. 16, as referenced to Earth's sea level, with the relationship expressed as:

$$h_0 = 2 \cdot (r_E + h) - r_E = r_E + 2h;$$

where $h_0$ is the first altitude associated with the first radius, defined with respect to sea level of Earth;

where $r_E$ is the Earth's radius; and, where h is the second altitude associated with the second radius, defined with respect to sea level.

Although the launches shown in the figures are depicted as vertical, practically that cannot be done for safety reasons. So even in the best case, Step 1502 may include launching the payload at a non-zero angle of attack with a kinetic energy that is greater than the gravitational first potential energy attained when the payload attains the first radius.

Figure 18:
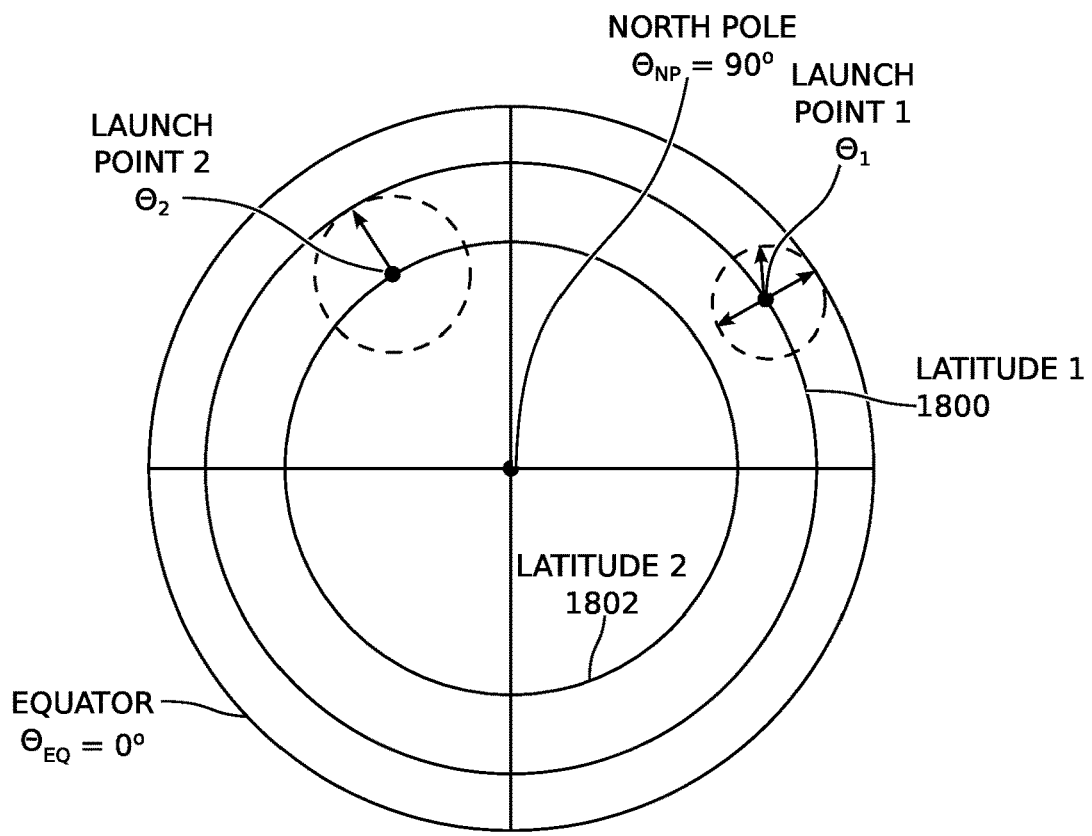
FIG. 18 is a plan view of the Earth centered on the polar axis.

FIG. 18 is a plan view of the Earth centered on the polar axis. Attaining the stable orbit in Step 1508 includes potentially attaining a stable orbit at any orbital inclination angle in the range between 0 and 360 degrees. Exemplary inclination angles of $\theta_1$ and $\theta_2$ are shown in the figure. Further, launching the payload in Step 1502 includes potentially launching the payload from any latitude on a surface of the Earth in the range between 90 and −90 degrees. Launch point 1 at Latitude 1 1800 and launch point 2 at latitude 2 1802 are shown.

In more detail, the payload attaining the gravitational first potential energy at the first radius in Step 1502 includes the gravitational first potential energy being expressed as:

$$-G\frac{mM}{r_0};$$

where G is Newton's gravitational constant;
where m is the mass of the payload; and
where M is the mass of the Earth.

Similarly, attaining the stable orbit for the payload in Step 1508 includes the second potential energy being expressed as:

$$-\frac{GmM}{r_{ORBIT}}.$$

As a result, if the first radius is twice the height of the second radius, the payload's total energy being equal to the gravitational first potential energy in Step 1508 includes the relationship being expressed as:

$$-G\frac{mM}{r_0} = \frac{1}{2}mv_{ORBIT}^2 - \frac{GmM}{r_{ORBIT}},$$

where $v_{ORBIT}$ is the velocity of the payload in the stable orbit.

In another variation, Step 1502 launches the payload with a booster rocket using a first kinetic energy. Step 1503 separates the booster rocket from the payload at the first radius altitude. Then, the payload attaining the gravitational first potential energy of the payload at the first radius altitude additionally in Step 1504 includes the gravitation potential energy of the booster rocket being distinguishable from the payload's gravitational first potential energy.

In one aspect subsequent to the payload attaining the first radius, Step 1505a initiates a rocket (payload) assisted descent maneuver. In a conventional gravity turn the rocket applies force, in the form of thrust, at least partially against the force of gravity. In contrast, in a rocket assisted descent maneuver as defined herein, the payload applies no force to counter the force of gravity, but rather, relies upon the force of gravity to send the payload into a stable lower altitude orbit. Thus, decreasing the payload altitude in response to the gravitation pull of the Earth in Step 1506 may include decreasing the payload altitude at a first angle of descent tangential to the stable orbit. The rocket assisted descent maneuver can be assisted by gimbaling the rocket engines, using auxiliary directional thrusters, or the use of adjustable aerodynamic surfaces (in an atmosphere). In one aspect, subsequent to the payload attaining the first radius, the performance of the rocket assisted descent maneuver may be accompanied with a payload roll maneuver as part of Step 1505b. Then, decreasing the payload altitude at the first angle of descent in Step 1506 includes the first angle of descent being a first angle of orbital inclination attained in response to the roll maneuver.

Figure 19:
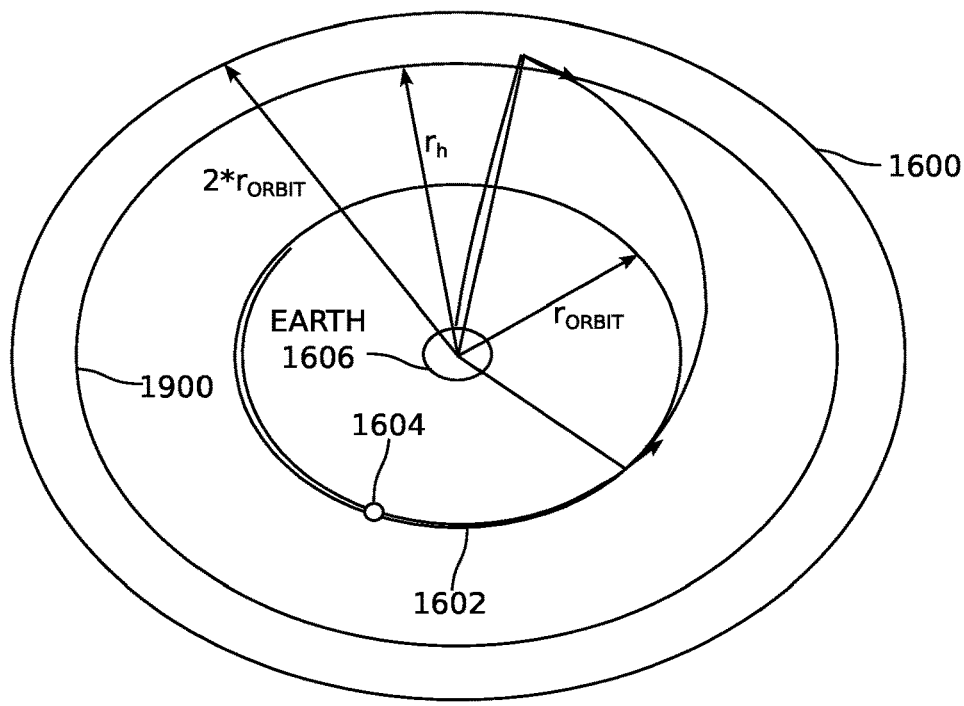
FIG. 19 is a diagram the relationship between ($r_0$=2·$r_{ORBIT}$), second radius ($r_{ORBIT}$), the payload, the Earth, and ($r_h$) 1900.

FIG. 19 is a diagram the relationship between ($r_0 = 2r_{ORBIT}$) 1600, second radius ($r_{ORBIT}$) 1602, the payload 1604, the Earth 1606, and ($r_h$) 1900.

Figure 20A:
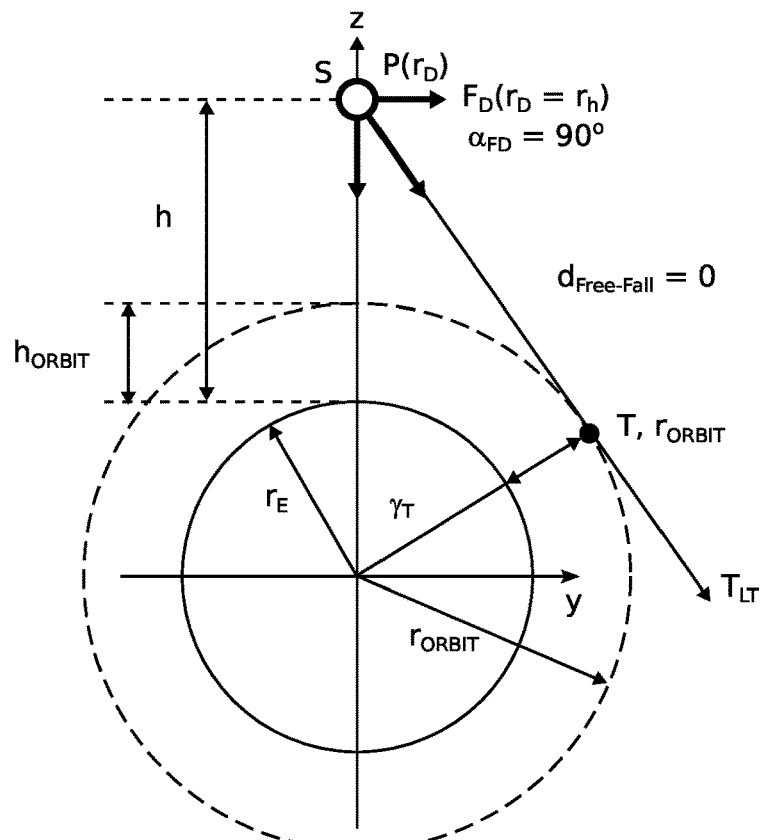
FIGS. 20A through 20C are drawings depicting a velocity adjustment applied to the payload during or after the rocket assisted descent maneuver.
Figure 20B:
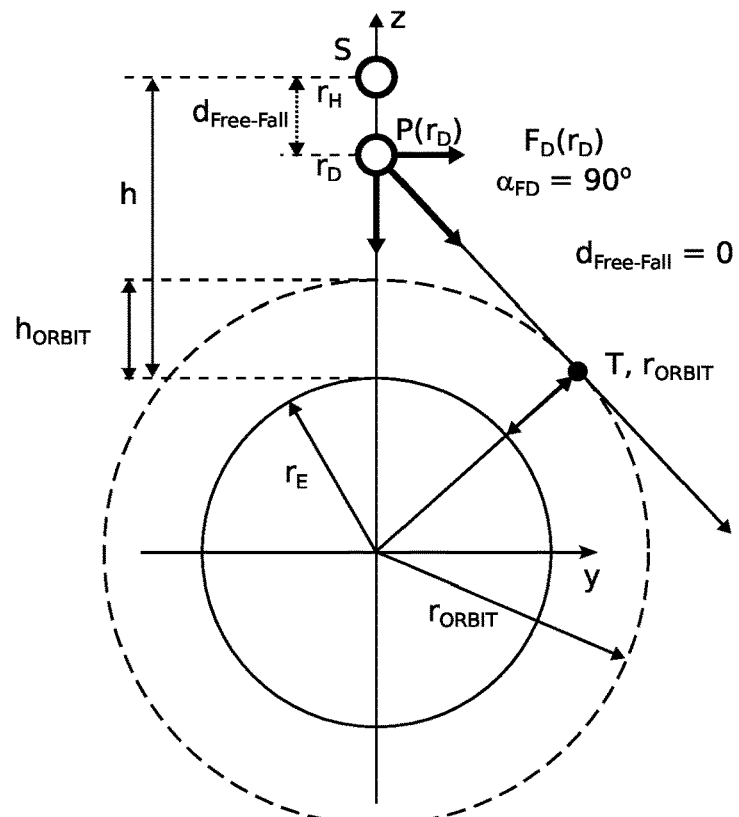
Figure 20C:
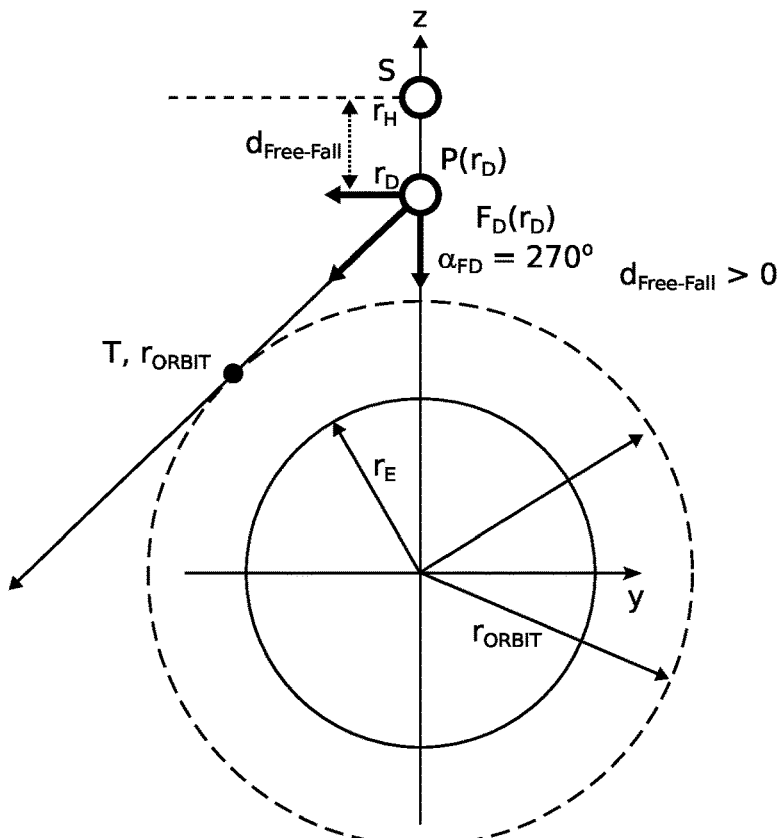

FIGS. 20A through 20C are drawings depicting a velocity adjustment applied to the payload during or after the rocket assisted descent maneuver. In some aspects, launching the payload as high as the first radius altitude includes launching the payload to a third, typically lesser, radius ($r_h$) altitude, where $r_h = s_f r_{ORBIT}$ where $1.1 < s_f < 2$; and, Subsequent to the rocket assisted descent maneuver in Step 1505a, Step 1505b applies a velocity adjustment force to the payload. So that decreasing the payload altitude at a first angle of descent in Step 1506 includes modifying a descending velocity of the payload in response to the velocity adjustment force. Note that when $s_f = 2$, then $r_h = r_0$. At the third radius the payload has a total energy equal to its gravitational potential energy. Then, applying the velocity adjustment force to the payload in Step 1505b includes the applied velocity adjustment force also being responsive to the gravitation potential energy at the third radius. That is, the velocity force needed to attain a stable orbit is a calculation dependent upon the altitude at which the rocket assisted descent maneuver is performed.

In FIG. 20A the rocket assisted descent maneuver occurs at the point S at the third radius altitude. The velocity adjustment force is also applied at point S. Therefore, at point S the payload is subject to the force of gravity, as well as a force $F_D$ orthogonal to the force of gravity in this example.

FIGS. 20B and 20C depict the application of the velocity adjustment force after the payload is permitted to free-fall (only under the force of gravity). In this aspect, subsequent to the rocket assisted descent maneuver, Step 1505c permits the payload to fall, under only the force of gravity, to a fourth radius altitude $r_D$ higher than the second radius altitude. Then, applying the velocity adjustment force to the payload in Step 1505b includes applying the velocity adjustment force when the payload reaches the fourth radius. FIG. 20C is essentially the same as FIG. 20B, showing a descent along a different inclination angle. The method is not limited to a particular range of inclination angles, as suffered by conventional launch methods. It should be understood that when third radius is a relatively great distance from the second radius, the velocity adjustment may be in the retro direction (against the direction of payload travel) on account of the payload's gravitational potential. On the other hand, if the third radius is relatively close to the second radius, the velocity adjustment force is more likely to be in the direction of payload travel, as shown in the figures.

Figure 21:
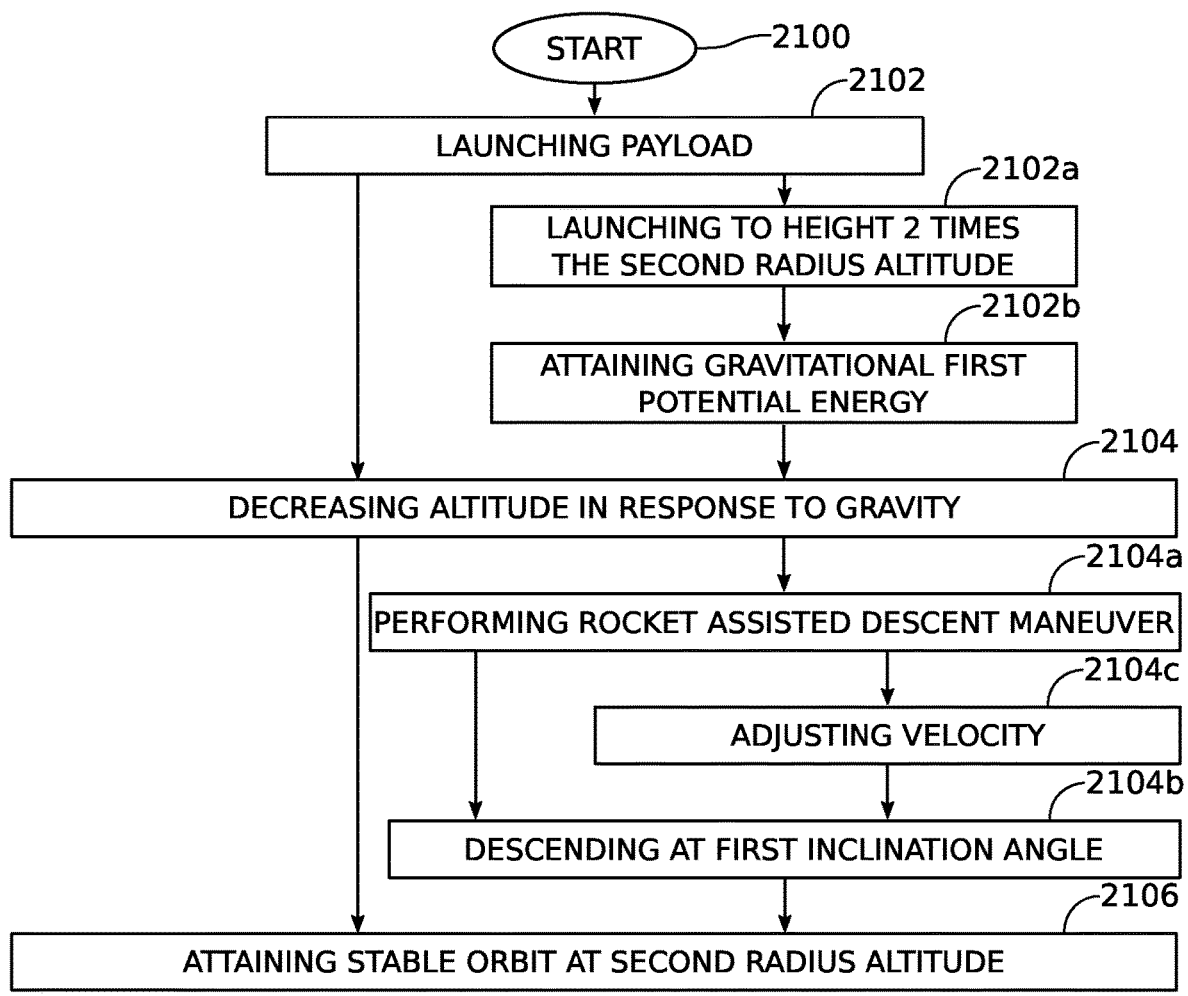
FIG. 21 is a flowchart illustrating a method for minimizing the energy required for an orbital launch.

FIG. 21 is a flowchart illustrating a method for minimizing the energy required for an orbital launch. The method begins at Step 2100. Step 2102 launches a payload to at least a first radius, with respect to the center of the Earth, higher than a desired stable orbit at a second radius, defined with respect to the center of the Earth. In some aspects the payload can be launched to a radius that is even greater than the first radius. Advantageously, Step 2102 may launch the payload from any latitude on a surface of the Earth in the range between 90 and −90 degrees. Subsequent to the payload attaining the first altitude, in Step 2104 the altitude of payload decreases in response to the gravitational pull of the Earth. Then, in Step 2106 the payload attains a stable orbit around the Earth at the second radius. In one aspect, decreasing the altitude of the payload in Step 2104 includes decreasing the altitude of the payload at a first inclination angle. Then, in Step 2106 the stable orbit is attained at the first inclination angle. The orbital inclination angle may be any inclination angle between zero and 360 degrees.

In one aspect, launching the payload in Step 2102 includes substeps. Step 2102a launches to a first radius 2 times the height of the second radius, and in Step 2102b the payload attains a gravitational first potential energy at the first radius. Then, attaining the stable orbit in Step 2106 includes the payload having a total energy that is the sum of the second potential energy at the second radius and the kinetic energy of the payload in the stable orbit. The payload total energy is also equal to the gravitational first potential energy.

In Step 2102*b*, where the payload attains the gravitational first potential energy at the first radius, the first gravitational potential energy may be expressed as:

$$-G\frac{mM}{r_0};$$

where G is Newton's gravitational constant;
where m is the mass of the payload;
where M is the mass of the Earth; and,
$r_0$ is a first radius.

Similarly, attaining the stable orbit in Step 2106 includes the second potential energy being expressed as:

$$-\frac{GmM}{r_{ORBIT}};$$

where $r_{ORBIT}$ is a second radius.

As a result, if the first radius is twice the height of the second radius, the payload total energy at the second radius altitude in Step 2106 includes the relationship being expressed as:

$$-G\frac{mM}{r_0} = \frac{1}{2}mv_{ORBIT}^2 - \frac{GmM}{r_{ORBIT}},$$

where $v_{ORBIT}$ is the velocity of the payload in the stable orbit.

In one aspect, decreasing the altitude of payload in response to the gravitational pull of the Earth in Step 2104 includes the following substeps. Step 2104*a* performs a rocket (or payload) assisted descent maneuver. Step 2104*b* causes the payload to descend along a first angle of descent tangential to the stable orbit.

In another aspect, launching the payload in Step 2102 includes launching the payload to a third radius ($r_h$), where $r_h = s_f r_{ORBIT}$ where $1.1 \leq s_f \leq 2$; and, Subsequent to the rocket assisted descent maneuver in Step 2104*a*, Step 2104*c* applies a velocity adjustment force to the payload. Then, decreasing the payload altitude at a first angle of descent in Step 2104*b* includes the first angle of descent being responsive to the velocity adjustment force and the gravitational potential energy of the payload at the third radius $r_h$. Step 2104*c* may also include a roll maneuver.

Figure 22:
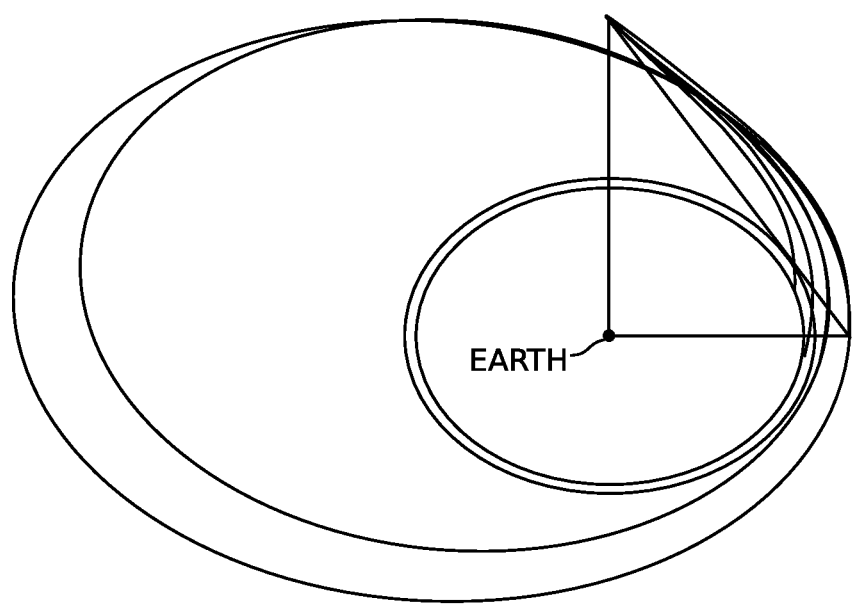
FIG. 22 is a diagram depicting a variety of exemplary stable orbits that can be obtained using the disclosed method.

FIG. 22 is a diagram depicting a variety of exemplary stable orbits that can be obtained using the disclosed method. Shown are both circular and elliptical orbits. The orbits are created by controlling the angle of descent created during rocket assisted descent maneuvers, as well as making adjustments to the velocity during descent.

Methods have been provided for the efficient launch of orbital satellites and spacecraft. Examples of particular method steps and hardware units have been presented to illustrate the invention. However, the invention is not limited to merely these examples. Other variations and embodiments of the invention will occur to those skilled in the art.

REFERENCES ON ROCKET EQUATION AND SPACE

"Lecture L14—Variable Mass Systems: The Rocket Engine", J. Peraire, S. Widnal, 16.07 Dynamics, Fall 2008, Version 2.0.
"Lecture 14.2. The Rocket Equation", https://web.mit.edu/16.unified/www/SPRING/propulsion/notes/node103.html
"Tsiolkovsky Rocket Equation", https://en.wikipedia.org/wiki/Tsiolkovsky_rocket_equation.
4. *"Free Fall"*, https://en.wikipedia.org/wiki/Free_fall
5. "From Moon-Fall to Motions Under Inverse Square Laws", S. K. Foong, European *Journal of Physics*, 2008, Vol 29, Number 5, pp. 987-1003.
6. Everydayastraunat.com, Tim Dodd
7. *"Rocket Factory"*, Smarter everyday you tube program by, Destin Sandlin with Tory Bruno, CEO of ULA (United Launch Alliance), https://www.youtube.com/watch?v=DQaPOIQLEUo
8. "Launch Azimuth, Orbital Inclination, Launch Site Latitude Rocket Trajectories 6", Alfanso Gonzales, https://www.youtube.com/watch?v=UIXiK41yl_w
9. Lecture 14: *"Orbits and Escape Velocity"* 8.01 Classical Mechanics, Fall 1999, Walter Lewin https://www.youtube.com/watch?v=CW353dqcbtA
10. *"Gravity Turn"*, https://en.wikipedia.org/wiki/Gravity_turn
11. ULA's Transformation and Vision for the Future of Space Launch", Tory Bruno, CEO of ULA, https://www.youtube.com/watch?v=6fpvvd6K6LY

REFERENCES ON GUIDANCE AND EQUATION OF MOTION

12., *"Solar Timer Using GPS Technology"*, O. E. Akcasu and Ibrahim Akcay, U.S. Pat. No. 9,551,980 B2, Jan. 24, 2017.
"Method and Apparatus for Controlling Electrical Power Usage Based on exact Sun Elevation Angle and Measured Geographical Location", Osman E. Akcasu, USPTO 9,949,339 B2, Apr. 17, 2018.
"Vehicle for Aerial Delivery of Fire Retardant", O. E. Akcasu, U.S. Pat. No. 7,975,774 B2, Jul. 12, 2011.
"System for Aerial Delivery of Fire Retardant", O. E. Akcasu, U.S. Pat. No. 8,165,731 B2, Apr. 24, 2012.
"System for Aerial Delivery of Fire Retardant", O. E. Akcasu, European Union Patent Number EP 2,163,279, Feb. 25, 2013.
"Vehicle for Aerial Delivery of Fire Retardant", O. E. Akcasu, European Union Patent Number EP 2,163,844 B1, Aug. 12, 2015.
"Rocket or Artillery Launched Smart Reconnaissance Pod", O. E. Akcasu, Ibrahim Onur Uslu and Yusuf Leblebici, U.S. Pat. No. 9,234,728 B2, Jan. 12, 2016.
"Rocket or Artillery Launched Smart Reconnaissance Pod", O. E. Akcasu, Ibrahim Onur Uslu and Yusuf Leblebici, European Patent EP 2 871 438 B1, Nov. 4, 2018.
"JPL and the Space Age: Hunt for Space Rocks", https://www.youtube.com/watch?v=1wNzTyu36WA

REFERENCES ON MATH AND PHYSICS IN GENERAL

"Gravitational Potential Energy", https://en.wikipedia.org/wiki/Gravitational_energy "Capacitor with High Aspect Ratio Silicon Cores", O. E. Akcasu, U.S. Pat. No. 10,510,828 B2, Dec. 17, 2019.

"The Feynman Lectures on Physics", Richard P. Feynman, Robert B. Leighton, Matthew L. and Sands, Copyright 1963, 1989 California Institute of Technology, ISBN 0-201-51003-0, Vol. II, pp. 7.9.

"Mathematical Handbook of Formulas and Tables," Murray R. Spiegel, Schaum's Outline Series, Copyright 1952 by McGraw-Hill, Inc.

"Handbook of Mathematical Functions," Edited by Milton Abramowitz and Irene A. Stegun, Dover Publications, Inc., New York, 1972, Library of Congress Catalog Card Number: 65-12253.

"Handbook of Chemistry and Physics," $66^{th}$ Edition, 1985-1986, Copyright CRC Chemical Rubber Publishing Company, ISBN-0-8493-0466-0.

"Applied Numerical Analysis," C. F. Gerald, Addison-Wesley Publishing Co., 1980, ISBN 0-201-02696-1.

"Functional Analysis and Applied Mathematics", L. V. Kantorovich, Usepkhi Mat. Nauk., Vol. 3, pp. 89-185, 1948.

"Discrete Variable Methods in Ordinary Differential Equations", P. Henrici, Wiley, New York, 1962.

"Convergence Properties of Newton's Method for the Solution of Semiconductor Carrier Transport Equations and Hybrid Solution Techniques for Multidimensional Simulation of VLSI Devices", O. E. Akcasu, *Solid-State Electron.* Vol. 27, pp. 319-328, April 1984.

"Brachistochrone Curve", https://en.wikipedia.org/wiki/Brachistochrone_curve

"Brachistochrone Curve" https://www.youtube.com/watch?v=3HXCv4dmR7A

"Brachistochrone Curve" https://www.youtube.com/watch?v=zYOAUG8PxyM&t=2s

I claim:

1. A method for efficient orbital launch trajectories, the method comprising:
    launching a payload as high as a first radius height ($r_0$), defined with respect to the center of the Earth, associated with a first altitude, defined with respect to sea level;
    the payload attaining a gravitational first potential energy at the first radius height;
    decreasing the payload height in response to a gravitational pull of the Earth; and,
    the payload attaining a stable orbit around the Earth at a second radius height ($r_{ORBIT}$), defined with respect to the center of the Earth, associated with a second altitude, defined with respect to sea level.

2. The method of claim 1 wherein launching the payload includes launching the payload to a first radius height equal to 2 times the height of the second radius height.

3. The method of claim 2 wherein the payload attaining the stable orbit includes the payload having a total energy that is the sum of a gravitational second potential energy and kinetic energy, with the payload total energy being equal to the gravitational first potential energy.

4. The method of claim 1 wherein the payload attaining the stable orbit includes attaining a stable orbit at any orbital inclination angle in the range between 0 and 360 degrees.

5. The method of claim 1 wherein launching the payload includes launching the payload from any latitude on a surface of the Earth in the range between 90 and −90 degrees.

6. The method of claim 3 wherein the payload attaining the gravitational first potential energy at the first radius height includes the gravitational first potential energy being expressed as:

$$-G\frac{mM}{r_0};$$

where G is Newton's gravitational constant;
where m is the mass of the payload; and
where H is the mass of the Earth.

7. The method of claim 6 wherein attaining the stable orbit includes the gravitational second potential energy being expressed as:

$$-\frac{GmM}{r_{ORBIT}}.$$

8. The method of claim 7 wherein the payload attaining the stable orbit and having the total energy equal to the gravitational first potential energy includes the relationship being expressed as:

$$-G\frac{mM}{r_0} = \frac{1}{2}mv_{ORBIT}^2 - \frac{GmM}{r_{ORBIT}};$$

where $v_{ORBIT}$ is the velocity of the payload in the stable orbit.

9. The method of claim 8 further comprising:
    subsequent to the payload attaining the first radius height, initiating a rocket (payload) assisted descent maneuver;
    wherein decreasing the payload height in response to the gravitational pull of the Earth includes decreasing the payload height at a first angle of descent tangential to the stable orbit.

10. The method of claim 9 further comprising:
    subsequent to the payload attaining the first radius height, performing a payload roll maneuver; and,
    wherein decreasing the payload height at the first angle of descent includes the first angle of descent being in a first angle of orbital inclination responsive to the roll maneuver.

11. The method of claim 9 wherein launching the payload as high as the first radius height includes launching the payload to a third radius height ($r_h$) defined with respect to the center of the Earth, where $r_h = s_f r_{ORBIT}$ where $1.1 < s_f < 2$;

the method further comprising:
    subsequent to the rocket assisted descent maneuver, applying a velocity adjustment force to the payload; and,
    wherein decreasing the payload height at the first angle of descent includes modifying a descending velocity of the payload in response to the velocity adjustment force.

12. The method of claim 11 wherein the payload attaining the third radius height includes the payload having a total energy at the third radius height equal to its gravitational potential energy; and, wherein applying the velocity adjustment force to the payload includes the applied velocity adjustment force being responsive to the gravitation potential energy at the third radius height.

13. The method of claim 12 further comprising:

subsequent to the rocket assisted descent maneuver, permitting the payload to fall, under only the force of gravity, to a fourth radius height, defined with respect to the center of the Earth, higher than the second radius height; and, wherein applying a velocity adjustment force to the payload includes applying the velocity adjustment force as the payload approaches the fourth radius height.

14. A method for efficient orbital launch trajectories, the method comprising:

launching a payload from a surface of the Earth;

the payload attaining a first radius height ($r_0$), defined with respect to the center of the Earth;

the payload attaining a gravitational first potential energy at the first radius height;

decreasing the payload height in response to the gravitational first potential energy;

performing a payload roll maneuver;

creating a first angle of descent responsive to the roll maneuver; and, the payload attaining a stable orbit around the Earth at a second radius height ($r_{ORBIT}$), defined with respect to the center of the Earth.

15. The method of claim 14 wherein the payload attaining the first radius height includes creating a relationship between the first radius height and second radius height expressed as:

$r_0 = s_f r_{ORBIT}$ where $1.1 \leq s_f \leq 2$.

16. The method of claim 5 wherein the payload gravitational first potential energy at the first radius height is expressed as:

$$-G\frac{mM}{r_0} = \frac{1}{2}mv_{ORBIT}^2 - \frac{GmM}{r_{ORBIT}};$$

where $s_f = 2$;

where $v_{ORBIT}$ is the velocity of the payload in the stable orbit;

where G is Newton's gravitational constant;

where m is the mass of the payload; and where M is the mass of the Earth.

17. A method for obtaining efficient orbital launch trajectories, the method comprising:

for a payload, identifying a first radius height ($r_0$) with respect to the center of the Earth;

identifying a second radius height ($r_{ORBIT}$) with respect to the center of the Earth, less than the first radius height;

identifying a first height difference between the first radius height and the second radius height;

launching the payload to the first radius height from a surface of the Earth;

using an Orbital Descent software program, identifying a direction $\alpha_F$, thrust $F_D$, and descent burn time $T_{BD}$ from the first radius height;

decreasing the payload height in response to the first height difference, direction $\alpha_F$, thrust $F_D$, and descent burn time $T_{BD}$; and, the payload obtaining a stable orbital velocity at the second radius height.

18. The method of claim 17 wherein the first height difference is expressed with a scaling factor S, where:

$r_0 = s_f r_{ORBIT}$ where $1.1 \leq s_f \leq 2$.

19. The method of claim 18 further comprising:

the payload attaining a gravitational first potential energy at the first radius height expressed as:

$$-G\frac{mM}{r_0} = \frac{1}{2}mv_{ORBIT}^2 - \frac{GmM}{r_{ORBIT}},$$

where $s_f = 2$;

where $v_{ORBIT}$ is the velocity of the payload in the stable orbit;

where G is Newton's gravitational constant;

where m is the mass of the payload; and where M is the mass of the Earth.

* * * * *

UNITED STATES PATENT AND TRADEMARK OFFICE
CERTIFICATE OF CORRECTION

Page 1 of 1

PATENT NO.         : 12,172,774 B1
APPLICATION NO.    : 18/443863
DATED              : December 24, 2024
INVENTOR(S)        : Osman Ersed Akcasu It is certified that error appears in the above-identified patent and that said Letters Patent is hereby corrected as shown below:

On the Title Page

Item (73) The correct Assignee name is "Akcasu Hypersonics, LLC".

In the Specification

In Line 5 of Column 5, the formula should read "$h_0 = 2(r_{EARTH} + h_{ORBIT}) - r_{EARTH} = r_{EARTH} + 2h_{ORBIT}$".
In Line 64 of Column 7, the exponent of the term "$h_g$", second occurrence, should be "-g".
At Line 8 of Column 14 and Line 17 of Column 30. The exponent in the well-known formula for the Universal Gravitational Constant (G) should be "-11".
In Line 51 of Column 27, the left side of formula (5.4) should read "$m(t)dv$".
In Line 42 of Column 31, in the term "$\Delta v(+g)$", should be "$\Delta v(\mp g)$".
In Line 30 of Column 38, the exponent of the term "$h_B$" should be "-g".
In Line 39 of Column 38, the exponent of the term "$v_B$", second occurrence, should be "-g".
In Line 43 of Column 38, the exponent of the term "$h_B$", second occurrence, should be "-g".
In Line 67 of Column 45 (formula (7.9)), the letter before "$_{skin}$" should be "p".
In Line 5 of Column 46 (formula (7.11)), the letter before "$_{OXI}$" should be "p" and the letter before "$_{fuel}$", first occurrence, should be "p".
In Line 63 of Column 55, the final term in formula (9.5) should be "$v = 1,2,3 ...$".
In Line 67 of Column 55, the final term in formula (9.6) should be "$1 \leq i \leq n$".
In Line 13 of Column 56, the right side of formula (9.8) should be "$|\Gamma_0| \leq B_0$".
In Line 18 of Column 56, in formula (9.9), the term "$\Gamma$" should be "$\Gamma_0$.

In the Claims

Claim 6: Line 16 of Column 72 should read "where M is the mass of the Earth".
Claim 16: Line 36 of Column 73 should read "16. The method of claim 15 wherein the payload gravita-".
Claim 18: At Line 26 of Column 74 the "S" following the word "factor" should be "$S_f$".

Signed and Sealed this
First Day of April, 2025

Coke Morgan Stewart
*Acting Director of the United States Patent and Trademark Office*